United States Patent
Martinez et al.

(10) Patent No.: US 8,068,514 B2
(45) Date of Patent: Nov. 29, 2011

(54) EFFICIENT BANDWIDTH UTILIZATION WHEN STREAMING DATA OVER MULTIPLE NETWORK INTERFACES

(75) Inventors: Martin Martinez, Ladera Ranch, CA (US); Eric Riggert, Lake Forest, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 334 days.

(21) Appl. No.: 12/471,319

(22) Filed: May 22, 2009

(65) Prior Publication Data

US 2010/0296521 A1 Nov. 25, 2010

(51) Int. Cl.
*H04J 3/22* (2006.01)
(52) U.S. Cl. ...................................................... 370/468
(58) Field of Classification Search .................. None
See application file for complete search history.

(56) References Cited

U.S. PATENT DOCUMENTS

| | | | |
|---|---|---|---|
| 4,885,557 A | 12/1989 | Barczys | |
| 5,572,227 A | 11/1996 | Pal et al. | |
| 6,028,841 A | 2/2000 | Lyon et al. | |
| 6,072,432 A | 6/2000 | Powell et al. | |
| 6,078,033 A | 6/2000 | Bowers et al. | |
| 6,186,185 B1 | 2/2001 | Khokar | |
| 6,212,200 B1 | 4/2001 | Iizuka et al. | |
| 6,295,598 B1 | 9/2001 | Bertoni et al. | |
| 6,388,528 B1 | 5/2002 | Buer et al. | |
| 6,431,222 B1 | 8/2002 | Khokar | |
| 6,564,262 B1 | 5/2003 | Chaddha | |
| 6,728,775 B1 | 4/2004 | Chaddha | |
| 7,065,048 B1 | 6/2006 | Levy et al. | |
| 7,346,000 B1 | 3/2008 | Srinivasan et al. | |
| 7,417,992 B2 | 8/2008 | Krishnan | |
| 7,426,181 B1 | 9/2008 | Feroz et al. | |
| 2003/0091061 A1* | 5/2003 | Oliver et al. | 370/463 |
| 2005/0289618 A1 | 12/2005 | Hardin | |
| 2008/0062966 A1* | 3/2008 | den Hartog et al. | 370/352 |
| 2008/0304472 A1* | 12/2008 | Gourlay et al. | 370/352 |
| 2008/0304519 A1* | 12/2008 | Koenen et al. | 370/477 |
| 2009/0019505 A1* | 1/2009 | Gopalakrishnan et al. | 725/109 |
| 2010/0082791 A1* | 4/2010 | Liu et al. | 709/223 |
| 2010/0284275 A1* | 11/2010 | Martinez et al. | 370/231 |
| 2010/0287274 A1* | 11/2010 | Martinez et al. | 709/224 |
| 2010/0287296 A1* | 11/2010 | Riggert et al. | 709/231 |

OTHER PUBLICATIONS

W. Storz, et al., Transmitting Time-Critical Data Over Heterogeneous Subnetworks Using Standardized Protocols, 1997, pp. 243-249.
Chris Foley, Dynamic Bandwidth Throttling, Xcellenet, Inc.

* cited by examiner

*Primary Examiner* — Min Jung
(74) *Attorney, Agent, or Firm* — Fitzpatrick, Cella, Harper & Scinto

(57) ABSTRACT

Adjusting utilization of network bandwidth by a non-time critical data stream being sent from a sending endpoint to a receiving endpoint, wherein both of the sending endpoint and the receiving endpoint each have multiple physical interfaces connecting the sending endpoint and the receiving endpoint to multiple networks. The non-time critical data stream is split and sent over multiple physical interfaces. A determination is made as to whether at least one of the multiple physical interfaces of the sending endpoint is sending or receiving a time critical or a near-time critical data stream, and a notification is received by the sending endpoint in a case that at least one of the multiple physical interfaces of the receiving endpoint is sending or receiving a time critical or a near-time critical data stream. The network bandwidth utilization of at least one of the multiple physical interfaces of the sending endpoint is then adjusted in accordance with the determination and/or the notification.

25 Claims, 36 Drawing Sheets

| | FIG. 6F | FIG. 6J | FIG. 6N |
|---|---|---|---|
| | FIG. 6E | FIG. 6I | FIG. 6M |
| FIG. 6B | FIG. 6D | FIG. 6H | FIG. 6L |
| FIG. 6A | FIG. 6C | FIG. 6G | FIG. 6K |

FIG. 6

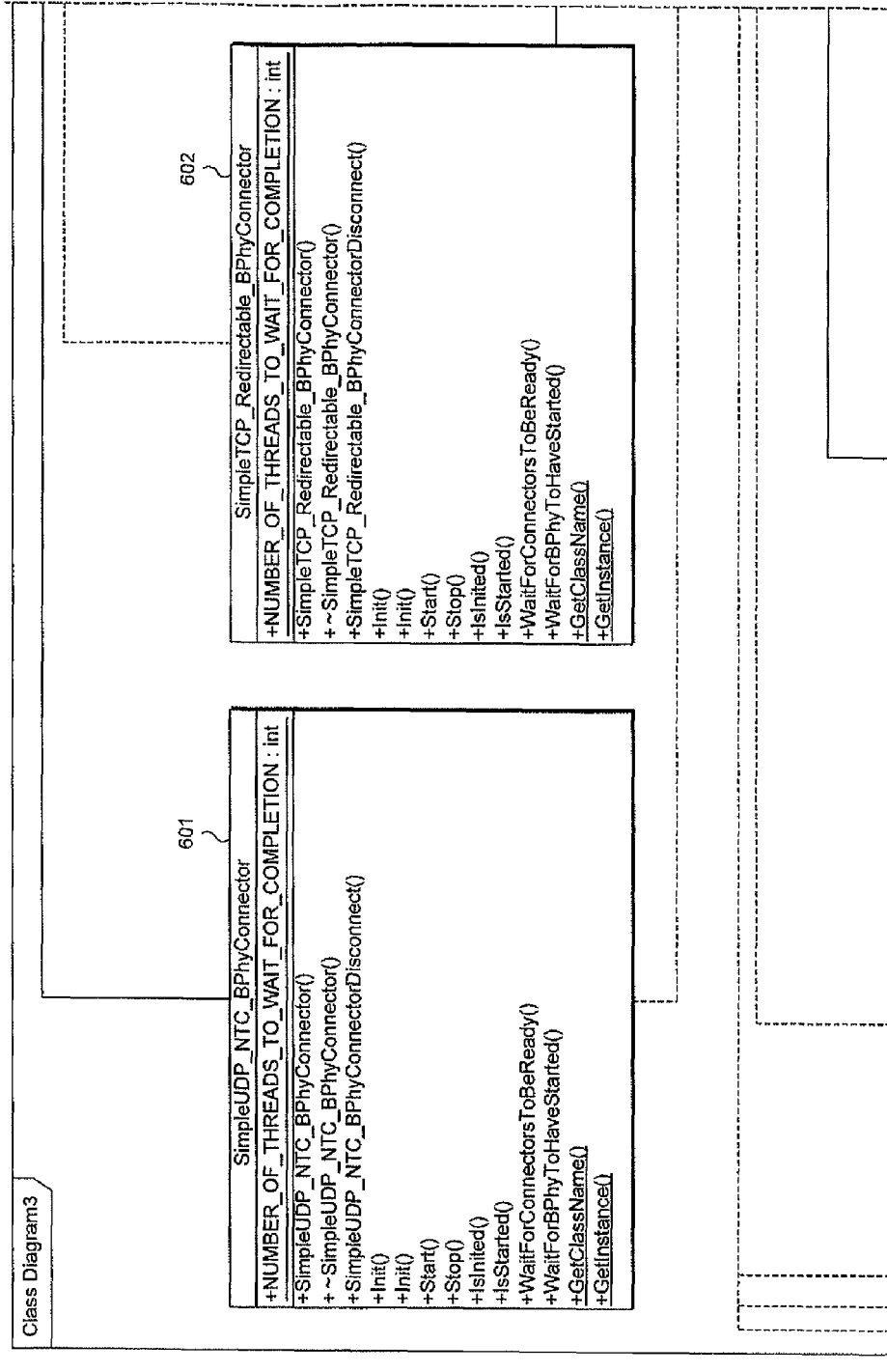

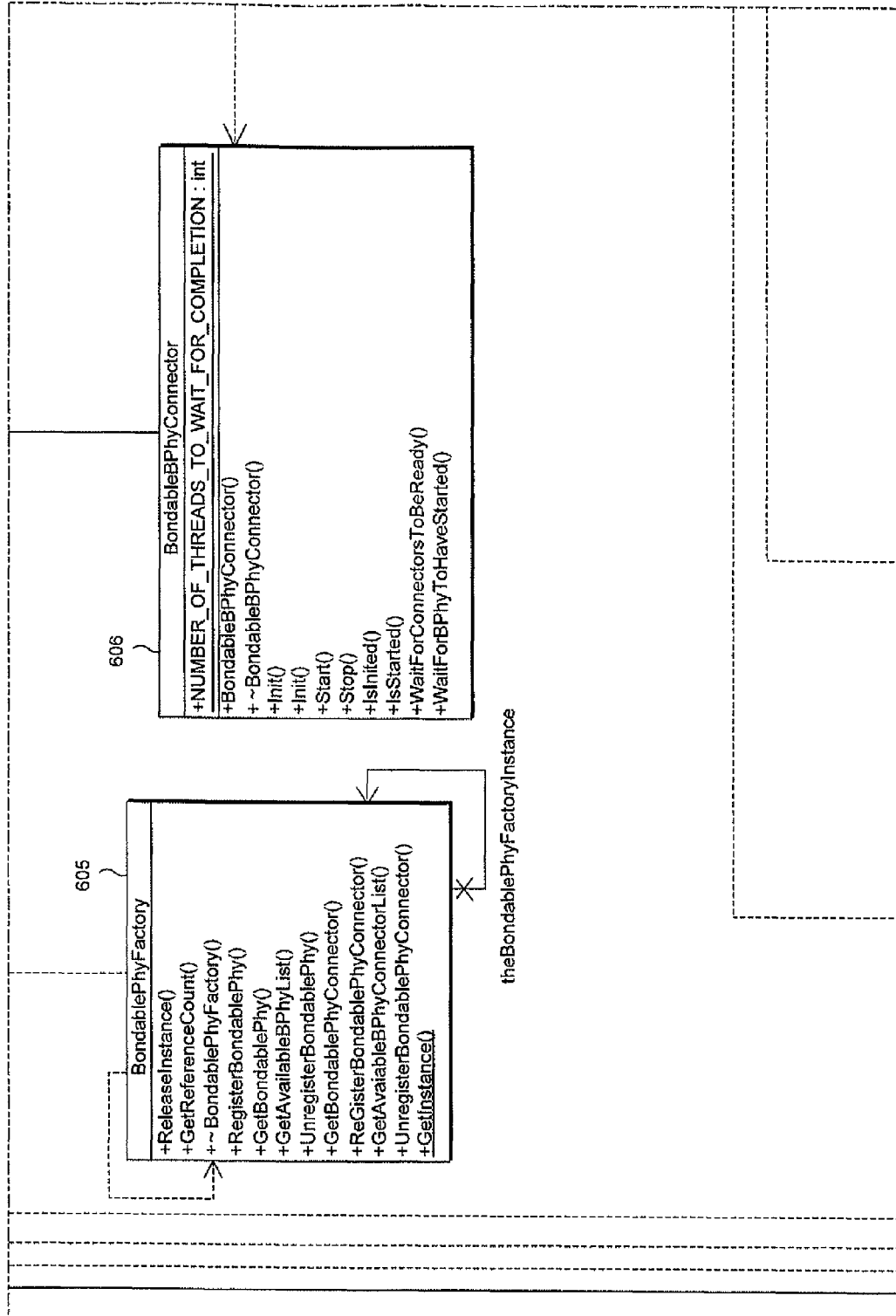

EFFICIENT BANDWIDTH UTILIZATION WHEN STREAMING DATA OVER MULTIPLE NETWORK INTERFACES

BACKGROUND

1. Field

The present disclosure generally relates to streaming of data, and more specifically relates to network streaming of data from a sending endpoint to a receiving endpoint.

2. Description of the Related Art

In the field of data streaming in a network, there is a problem in that data streaming from a sending endpoint to a recipient endpoint may be detrimentally affected by limited network bandwidth, collisions in data transmission, and latency, which in turn affect the delivery quality of the streamed data. In the future, network bandwidth will invariably increase; however, recent history has shown that the quantity of data information that needs to be sent over networks grows much faster than the then-current delivery infrastructure. As the quantity of data information continues to increase (e.g., High Definition video streaming), an already overburdened system may provide less than adequate data delivery and/or playback quality, or may fail outright.

SUMMARY OF THE INVENTION

One solution to this problem is available in a situation where the architecture of the network is such that the sender and the recipient both have multiple physical connections to the network, and/or in situations where there are multiple networks that connect the sender and recipient, and both the sender and recipient each have one or more physical connections to each network. For example, the sender and recipient might be connected over four separate networks, namely, an Ethernet network, a MoCA (Multimedia over Coax Alliance) network, an Ethernet network over powerline, and a wireless network. For each network, both sender and recipient each have one or more physical connections to each network, such as twisted pair cable connecting to the Ethernet network, coaxial cable connecting to the MoCA network, powerlines connecting to the Ethernet network over powerline, and one or more radio antennas connecting to the wireless network.

With such an architecture, multiple data streams are split over multiple physical interfaces which connect the endpoints of the network, instead of streaming data over only one of the possible physical interfaces. Each of the data streams sent over the multiple physical interfaces is categorized into three categories: a time critical (TC) category, a near-time critical (nearTC) category, and a non-time critical (nonTC) category. An example of a data stream in the time critical (TC) category is an interactive data stream such as a video conference stream. An example of a data stream in the near-time critical (nearTC) category is a stream that carries a High Definition (HD) video content. An example of a data stream in the non-time critical (nonTC) category is a file transfer data stream.

Within this architecture, a large non-time critical data stream such as a file transfer data stream, which uses a large portion of network bandwidth, may disrupt a time critical data stream or a near-time critical data stream, such as a video conference or an HD video, respectively. The disruption of the time critical data stream or the near-time critical data stream by the file data transfer stream may prevent or disturb a viewer from viewing the HD video or participating in the video conference.

In the present disclosure, the foregoing problem is addressed by adjusting utilization of network bandwidth used by a non-time critical data stream being sent from a sending endpoint to a receiving endpoint, wherein both of the sending endpoint and the receiving endpoint each have multiple physical interfaces connecting the sending endpoint and the receiving endpoint to multiple networks, respectively. The non-time critical data stream is split into sub-streams and sent over multiple physical interfaces. While sending and receiving the non-time critical data stream, the sending endpoint and receiving endpoint determine if multiple physical interfaces of the sending endpoint and/or the receiving endpoint are also sending or receiving a time-critical data stream or a near-time critical data stream. If either of the sending endpoint or the receiving endpoint determine that their multiple physical interfaces are also sending or receiving a time critical data stream or a near-time critical data stream, the sending endpoint adjusts the network bandwidth utilization of its multiple physical interfaces, so as to maintain a good streaming quality of the time critical or a near-time critical data stream(s).

According to one aspect of the disclosure, the sending endpoint determines if at least one of the multiple physical interfaces of the sending endpoint is also sending or receiving a time critical data stream or a near-time critical data stream. The receiving endpoint likewise determines if at least one of the multiple physical interfaces of the receiving endpoint is also sending or receiving a time critical data stream or a near-time critical data stream. The sending endpoint is then notified in a case where at least one of the multiple physical interfaces of the receiving endpoint is determined to be sending or receiving a time critical data stream or a near-time critical data stream. The network bandwidth utilization of at least one of the multiple physical interfaces of the sending endpoint is then adjusted in accordance with the first determination and/or the notification of the second determination.

By virtue of the foregoing arrangement, it is ordinarily possible to ensure that a non-time critical data stream will not substantially affect its interaction with an endpoint which is currently sending or receiving a time critical data stream or a near-time critical data stream. More specifically, because a sending endpoint and a receiving endpoint of a non-time critical data stream each determine if their multiple physical interfaces are also sending or receiving a time critical data stream or a near-time critical data stream, and the network bandwidth utilization of at least one of the multiple physical interfaces is adjusted in accordance with the determinations, the time critical data streams or a near-time critical data streams are proactively allowed a sufficient amount of network bandwidth so that the quality of delivery of the time critical and a near-time critical data streams is substantially maintained or even improved. In this regard, the sending endpoint and receiving endpoint of the non-time critical data stream are acting as "good citizens" in the network by proactively adjusting how much network bandwidth each of the multiple physical interfaces of each endpoint utilizes when sending a non-time critical data stream.

In yet another aspect, if at least one of the multiple physical interfaces of the sending endpoint is determined to also be sending or receiving a time critical data stream or a near-time critical data stream, or if at least one of the multiple physical interfaces of the receiving endpoint is determined to also be sending or receiving a time critical data stream or a near-time critical data stream, the network bandwidth utilization of the multiple physical interfaces of the sending endpoint is reduced. More specifically, when adjusting the network bandwidth utilization of at least one of the multiple physical interfaces of the sending endpoint, the network bandwidth utilization of the multiple physical interfaces of the sending endpoint sending the non-time critical data stream is reduced. The reduction of network bandwidth utilization is in proportion to an amount of network bandwidth sufficient for the multiple physical interfaces of the sending endpoint and the receiving endpoint to send and/or receive, respectively, a time critical data stream or a near-time critical data stream. Because the network bandwidth utilization of the multiple physical interfaces sending a non-time critical data stream is reduced in proportion to an amount of network bandwidth sufficient for the multiple physical interfaces sending and/or receiving a time critical data stream or a near-time critical data stream, a more precise reduction in network bandwidth utilization is obtained, tailored more precisely to the time-critical nature of the current network interactions, than when compared with brute-force, undifferentiated reductions in the network bandwidth utilization of the multiple physical interfaces. Therefore, the sending endpoint and the receiving endpoint are accurately reducing the network bandwidth utilized in streaming a non-time critical data stream, so as to proactively allow a time-critical or a near-time critical data stream the sufficient amount of network bandwidth.

In another aspect, in a case where the multiple physical interfaces of the sending endpoint are determined to no longer be sending or receiving a time critical or a near-time critical data stream, and/or where the multiple physical interfaces of the receiving endpoint are determined to no longer be sending or receiving a time critical or a near-time critical data stream, the network bandwidth utilization of each of the multiple physical interfaces of the sending endpoint is increased in proportion to an amount that each of such physical interfaces was reduced. Because the network bandwidth utilization of the multiple physical interfaces sending a non-time critical data stream is increased when a time critical data stream or a near-time critical data stream is no longer being sent or received by the sending endpoint or the receiving endpoint, the non-time critical data stream, such as a data file transfer, can be sent more efficiently as compared to a configuration which sets the multiple physical interfaces of the sending endpoint that are sending the non-time critical data stream to a reduced network bandwidth utilization state.

In yet another aspect, if at least one of the multiple physical interfaces of the sending endpoint is determined to also be sending or receiving a time critical data stream or a near-time critical data stream, or if at least one of the multiple physical interfaces of the receiving endpoint is determined to also be sending or receiving a time critical data stream or a near-time critical data stream, the network bandwidth utilization of the multiple physical interfaces of the sending endpoint is reduced. More specifically, when adjusting the network bandwidth utilization of at least one of the multiple physical interfaces of the sending endpoint, the network bandwidth utilization of the multiple physical interfaces of the sending endpoint sending the non-time critical data stream is reduced. In addition, the network bandwidth utilization of the remaining multiple physical interfaces of the sending endpoint is increased in equal proportion to the reduction of the network bandwidth utilization of the multiple physical interfaces of the sending endpoint sending the non-time critical data stream.

In a further aspect, in a case where the multiple physical interfaces of the sending endpoint are determined to no longer be sending or receiving a time critical data stream or a near-time critical data stream, and where the multiple physical interfaces of the receiving endpoint are determined to no longer be sending or receiving a time critical data stream or a near-time critical data stream, the network bandwidth utilization of each of the multiple physical interfaces of the sending endpoint is increased. The increase in network bandwidth utilization is in proportion to an amount that each of such physical interfaces was reduced. In addition, the network bandwidth utilization of each of the multiple physical interfaces of the sending endpoint is reduced in proportion to an amount that each of such physical interfaces was increased.

In an additional aspect, if at least one of the multiple physical interfaces of the sending endpoint is determined to also be sending or receiving a time critical data stream or a near-time critical data stream, or if at least one of the multiple physical interfaces of the receiving endpoint is determined to also be sending or receiving a time critical data stream or a near-time critical data stream, the network bandwidth utilization of the multiple physical interfaces of the sending endpoint is reduced. More specifically, when adjusting the network bandwidth utilization of at least one of the multiple physical interfaces of the sending endpoint, the network bandwidth utilization of the multiple physical interfaces of the sending endpoint sending the non-time critical data stream is reduced. The network bandwidth utilization of the multiple physical interfaces of the sending endpoint is reduced in order of multiple physical interfaces sending a non-time critical data stream, a near-time critical data stream, and a time critical data stream. For example, in a case where a non-time critical data stream shares a physical interface with a time critical data stream or a near-time critical data stream and thus, when reducing the network bandwidth utilization of one of the multiple physical interfaces sending the non-time critical data stream, the network bandwidth utilization of one of the multiple physical interfaces sending a time critical data stream or a near-time critical data stream will also be reduced.

According to another aspect, in a case where the multiple physical interfaces of the sending endpoint are determined to no longer be sending or receiving a time critical data stream or a near-time critical data stream, and where the multiple physical interfaces of the receiving endpoint are determined to no longer be sending or receiving a time critical data stream or a near-time critical data stream, the network bandwidth utilization of the multiple physical interfaces of the sending endpoint is increased in proportion to an amount that each of such physical interfaces was reduced.

In yet another aspect, in a case where none of the multiple physical interfaces of the sending endpoint and none of the multiple physical interfaces of the receiving endpoint are determined to be sending or receiving a time critical data stream or a near-time critical data stream, a measurement is made of network performance for data sent between multiple physical interfaces of the sending endpoint and multiple physical interfaces of the receiving endpoint. The network bandwidth utilization of at least one of the multiple physical interfaces of the sending endpoint is then adjusted in accordance with the measured network performance. The network performance measured can be network congestion and/or latency. Because the sending endpoint and the receiving endpoint of a non-time critical data stream are measuring network performance, it is ordinarily possible to ensure that the non-time critical data stream will not indirectly affect other endpoints on the network which are currently sending or receiving a time critical data stream or a near-time critical data stream.

This brief summary has been provided so that the nature of the disclosure may be understood quickly. A more complete understanding can be obtained by reference to the following detailed description and to the attached drawings.

DETAILED DESCRIPTION

Figure 1:
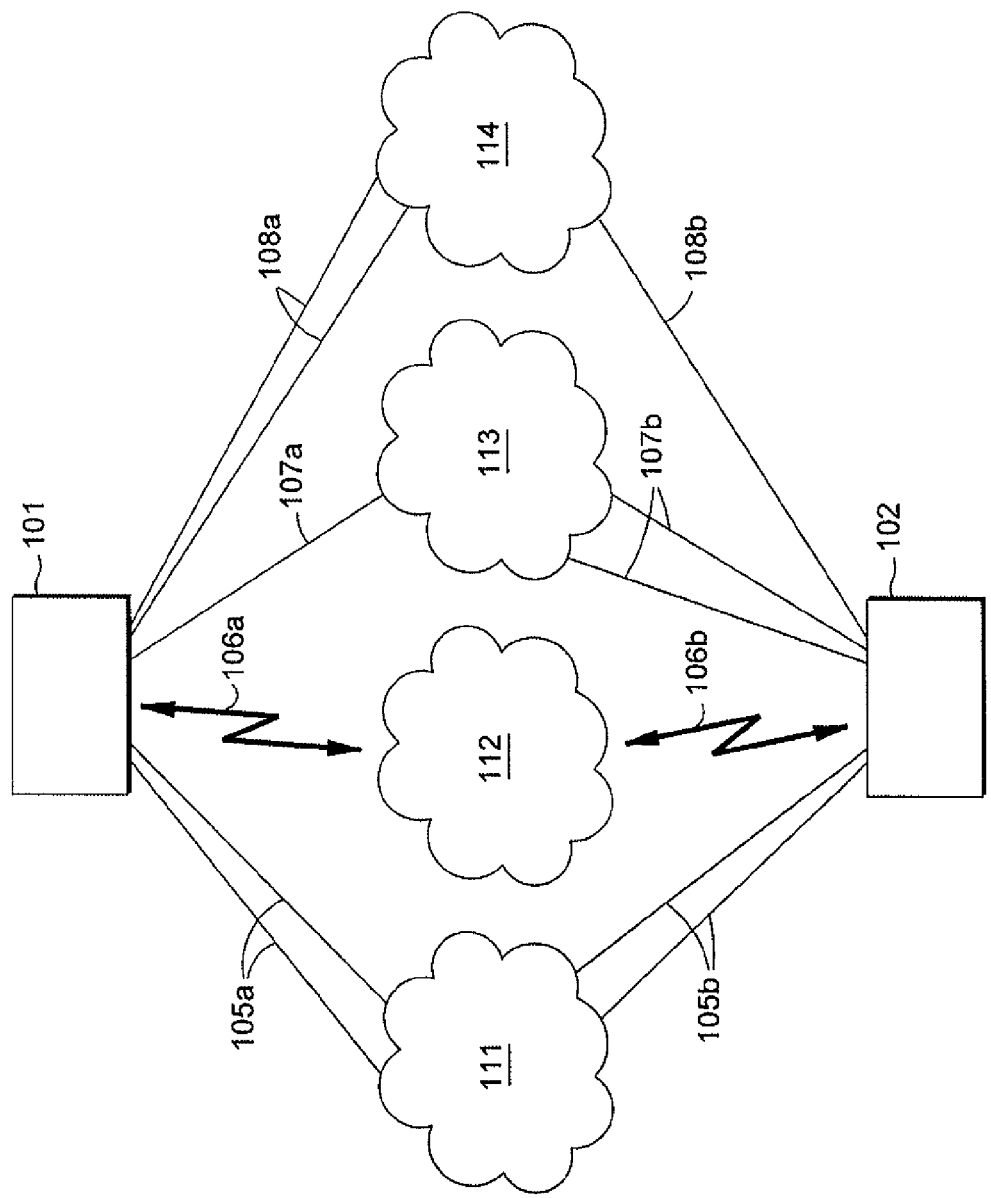
FIG. 1 is a representative view of a sending endpoint and a receiving endpoint, connected via networks, on which an architecture of an example embodiment may be implemented.

FIG. 1 is a representative view of a sending endpoint and a receiving endpoint, connected via multiple networks, on which an architecture of an example embodiment may be implemented. As shown in FIG. 1, sending endpoint 101 is connected to receiving endpoint 102 through networks 111, 112, 113 and 114. The networks may include similar or dissimilar networks, mixed in any combination, as described below. Sending endpoint 101 includes multiple physical interfaces, including at least one or more physical interface for each different network. As shown in the example of FIG. 1, sending endpoint 101 includes physical interfaces 105a, 106a, 107a and 108a. More specifically, sending endpoint 101 has physical interfaces 105a which connect sending endpoint 101 to network 111. In FIG. 1, sending endpoint 101 is shown to have two physical interfaces 105a connecting to network 111; however, in other embodiments, sending endpoint 101 may have a single physical interface connecting to network 111, or may have more than two physical interfaces connecting to network 111.

Receiving endpoint 102 also has multiple physical interfaces 105b connecting to network 111. Similar to sending endpoint 101, receiving endpoint 102 may also have a single or multiple physical interfaces connecting to network 111. As a result of the physical interface connections, sending endpoint 101 is connected to receiving endpoint 102 through network 111, using physical interfaces 105b.

Similar to the above-described connection between sending endpoint 101 and receiving endpoint 102, sending endpoint 101 and receiving endpoint 102 are connected through networks 112, 113 and 114 via physical interfaces 106a and 106b, 107a and 107b and 108a and 108b. Accordingly, sending endpoint 101 is connected to network 112 through one or more physical interfaces 106a; and, receiving endpoint 102 is connected to network 112 through one or more physical interfaces 106b. Sending endpoint 101 is connected to network 113 through one or more physical interfaces 107a; and, receiving endpoint 102 is connected to network 113 through one or more physical interfaces 107b. Lastly, sending endpoint 101 is connected to network 114 through one or more physical interfaces 108a; and, receiving endpoint 102 is connected to network 114 through one or more physical interfaces 108b. In FIG. 1, sending endpoint 101 and receiving endpoint 102 are shown to be connected through four networks; however, sending endpoint 101 and receiving endpoint 102 may be connected through more or less networks. In this regard, the number of networks is established by a user's demands, or is established by an already existing infrastructure connecting the two endpoints.

Networks 111, 112, 113 and 114 can be many different types of networks, such as, for example, an Ethernet network, a Multimedia over Coax Alliance (MoCA) network, a Home-PNA (Home Phoneline Networking Alliance) network, an Ethernet over powerline network (HomePlug), a wireless network, or any other type of network. In addition, the networks connecting the two endpoints can all be a different type of network (e.g., network 111 can be an Ethernet network, while network 112 is a wireless network, network 113 is an Ethernet over powerline network, and network 114 is a MoCA network). On the other hand, the networks connecting the two endpoints can include any variety of combinations of different networks (e.g., network 111 can be a MoCA network, while network 112 is a wireless network, and networks 113 and 114 are Ethernet networks). The type of physical interfaces connecting the endpoints to the networks depends upon the type of network. For example, an endpoint may be connected to an Ethernet network through twisted pair cable, an endpoint may be connected to a MoCA network through coaxial cable, an endpoint may be connected to an Ethernet over powerline network over power lines/wires, and an endpoint may be connected to a wireless network over one or more radio antennas.

The sending endpoint 101 serves as an application sender, which may include, for example, a media server, a conference server, or a storage sender application. A media server is an endpoint that will transfer audio and video data (or other types of large data) to a client. Although the media server is specific to transferring video streams, other types of media servers can be substituted (e.g., an audio-only stream or a large archival stream). The media server may also be a modified third party application accessing the sending endpoint 101. A conference server is an endpoint that sends data (via Unicast or Multicast) to conference players, and is used in providing interactive conference content to participants. A storage sender application is an endpoint that sends data from a device to a receiver, and is used in transferring data between two endpoints (e.g., File Transfer Protocol (FTP)). The storage sender application is primarily used in a PC collaboration as a means to send device data to be stored at an external storage medium.

The receiving endpoint 102 serves as an application receiver, which may include, for example, a media client or media player, a conference player, or a storage receiver application. A media client or media player is an endpoint that receives data from a media server, and is used primarily for video and audio stream playing. A conference player is an endpoint that receives data from the conference server, and is used in playing and interacting within a conference. A storage receiver application is an endpoint that receives data from a storage sender application, and is used in transferring data between two endpoints (e.g., FTP). The storage application receiver is primarily used in a PC collaboration as a means to receive device data to be stored at an external storage medium.

In some instances, a sending endpoint may also simultaneously act as a receiving endpoint. For example, when a sending endpoint serves as a video conferencing application, video would stream from the sending endpoint to the receiving endpoint, and video would stream simultaneously from the receiving endpoint to the sending endpoint. In this example, the sending endpoint would also be acting as a receiving endpoint, and the receiving endpoint would also be acting as a sending endpoint. In other instances, a sending endpoint may become a receiving endpoint after some period of time. For example, a sending endpoint and a receiving endpoint might transfer data back and forth to each other in a ping-pong fashion, rather than simultaneously. In other words, the sending endpoint might complete a transfer of data to the receiving endpoint, and then a second transfer may begin in the opposite direction from the receiving endpoint to the sending endpoint.

Figure 2:
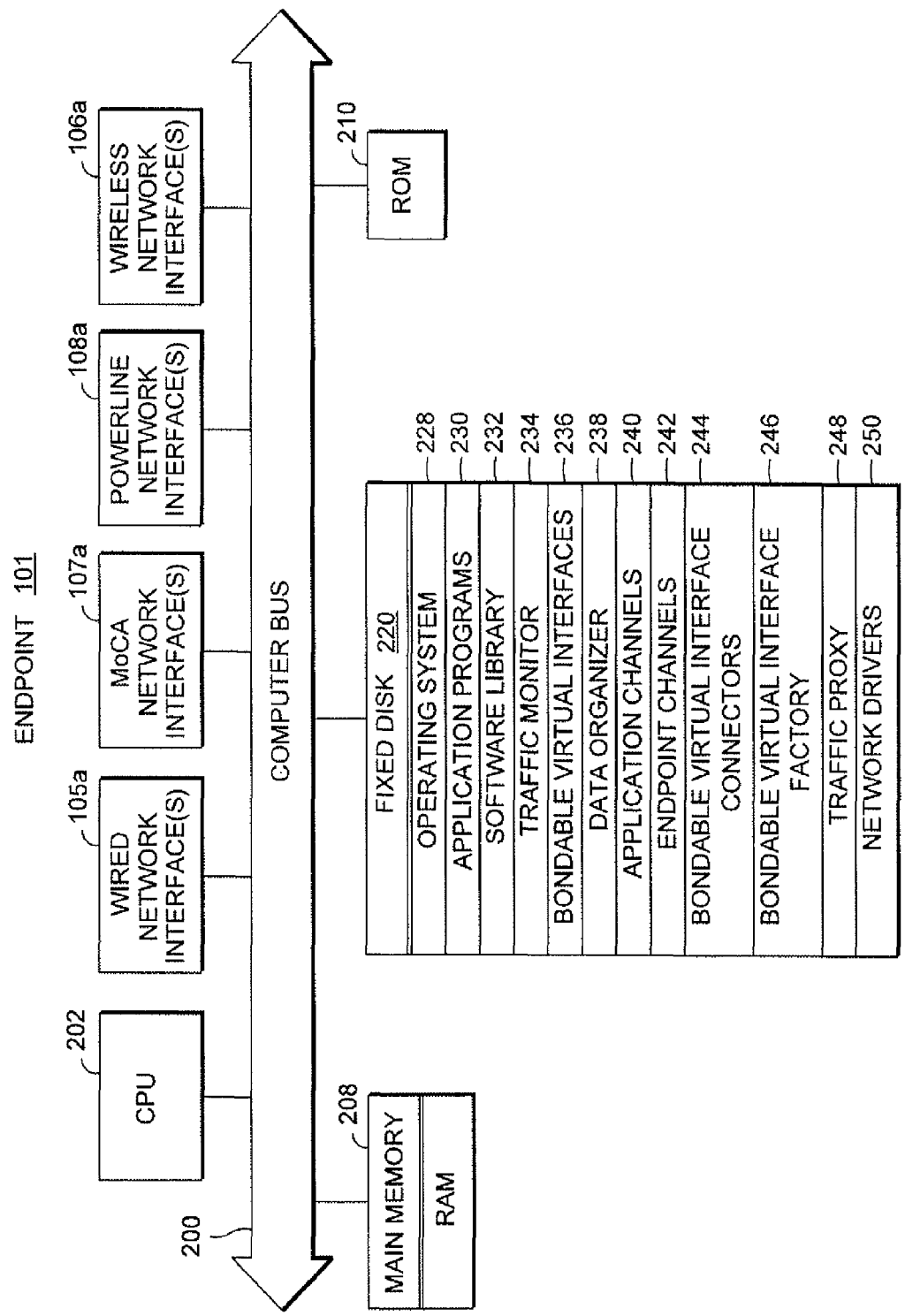
FIG. 2 is a detailed block diagram for explaining the internal architecture of the sending endpoint of FIG. 1.

FIG. 2 is a detailed block diagram for explaining the internal architecture of the sending endpoint 101 of FIG. 1. As shown in FIG. 2, sending endpoint 101 includes central processing unit (CPU) 202 which interfaces with computer bus 200. Also interfacing with computer bus 200 are hard (or fixed) disk 220, wired network interface(s) 105a, wireless network interface(s) 106a, MoCA network interface(s) 107a, powerline network interface(s) 108a, random access memory (RAM) 208 for use as a main run-time transient memory, and read only memory (ROM) 210.

RAM 208 interfaces with computer bus 200 so as to provide information stored in RAM 208 to CPU 202 during execution of the instructions in software programs such as an operating system, application programs, and interface drivers. More specifically, CPU 202 first loads computer-executable process steps from fixed disk 220, or another storage device into a region of RAM 208. CPU 202 can then execute the stored process steps from RAM 208 in order to execute the loaded computer-executable process steps. In addition, data such as gathered network performance statistics or other information can be stored in RAM 208, so that the data can be accessed by CPU 202 during the execution of computer-executable software programs, to the extent that such software programs have a need to access and/or modify the data.

As also shown in FIG. 2, hard disk 220 contains operating system 228, application programs 230 such as programs for starting up and shutting down the sending endpoint 101 or other programs. Hard disk 220 further contains software library 232 for controlling the sending of data from sending endpoint 101. Hard disk 220 also contains traffic monitor 234 for gathering performance statistics for each of the multiple physical interfaces 105a, 106a, 107a and 108a. In addition, hard disk 220 contains bondable virtual interfaces 236, data organizer 238, application channels 240, endpoint channels 242, bondable virtual interface connectors 244, bondable virtual interface factory 246, and traffic proxy 248, each of which is instantiated by the software library 232 and will be described in more detail below with reference to FIGS. 4 and 5. Traffic proxy 248 may be used as a communication interface between the software library 232 and the traffic monitor 234. Lastly, hard disk 220 contains network drivers 250 for software interface to networks such as networks 111, 112, 113 and 114.

In an example embodiment, software library 232 and traffic monitor 234 are loaded by CPU 202 into a region of RAM 208. CPU 202 then executes the stored software library 232 and the traffic monitor 234 from RAM 208 in order to execute the loaded computer-executable steps. In addition, application programs 230 are loaded by CPU 202 into a region of RAM 208. CPU 202 then executes the stored process steps as described in detail below in connection with FIGS. 16 to 18, in order to execute the loaded computer-executable steps.

Figure 3:
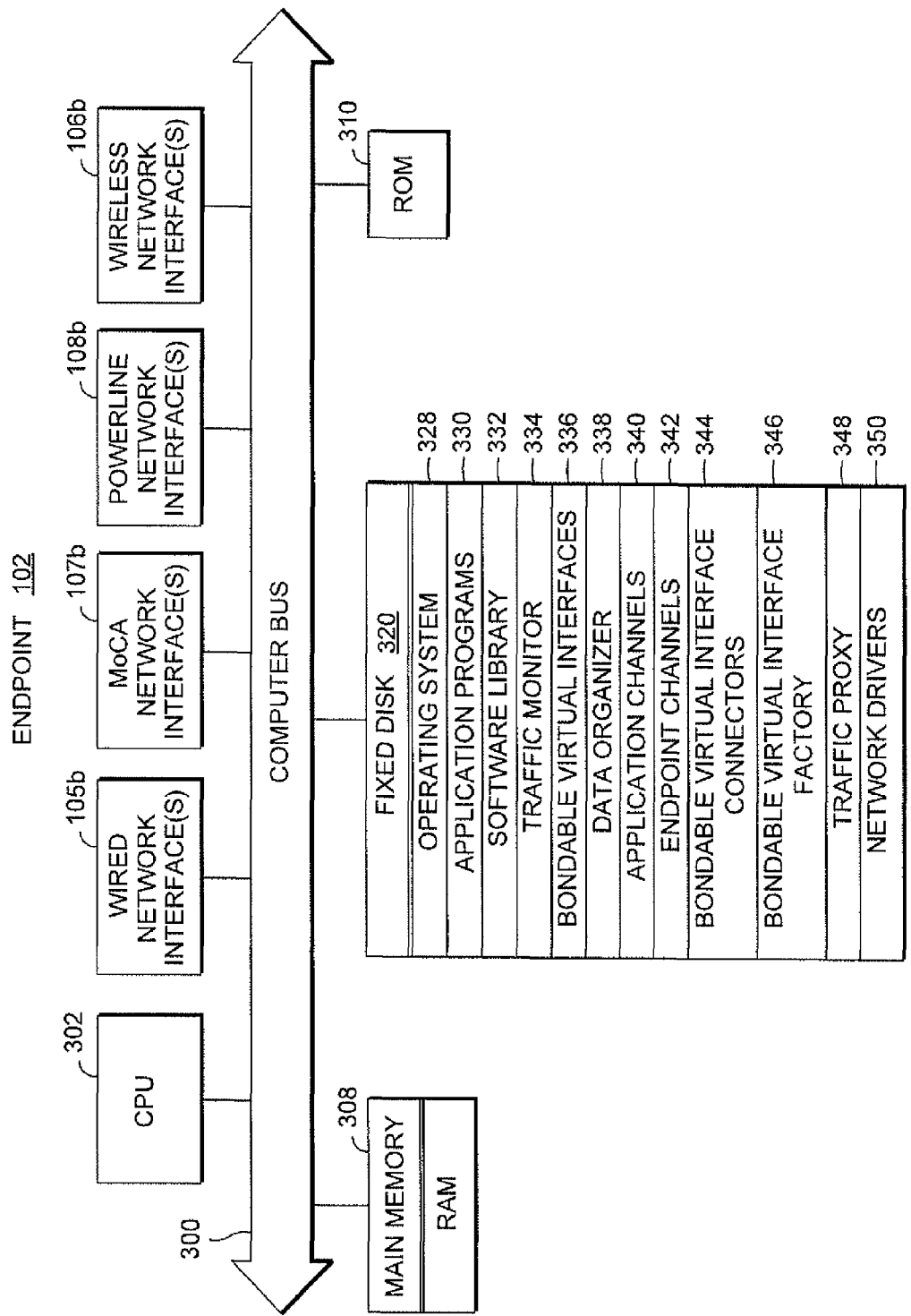
FIG. 3 is a detailed block diagram for explaining the internal architecture of the receiving endpoint of FIG. 1.

FIG. 3 is a detailed block diagram for explaining the internal architecture of the receiving endpoint 102 of FIG. 1. As shown in FIG. 3, receiving endpoint 102 includes central processing unit (CPU) 302 which interfaces with computer bus 300. Also interfacing with computer bus 300 are hard (or fixed) disk 320, wired network interface(s) 105b, wireless network interface(s) 106b, MoCA network interface(s) 107b, powerline network interface(s) 108b, random access memory (RAM) 308 for use as a main run-time transient memory, and read only memory (ROM) 310.

RAM 308 interfaces with computer bus 300 so as to provide information stored in RAM 308 to CPU 302 during execution of the instructions in software programs such as an operating system, application programs, and interface drivers. More specifically, CPU 302 first loads computer-executable process steps from fixed disk 320, or another storage device into a region of RAM 308. CPU 302 can then execute the stored process steps from RAM 308 in order to execute the loaded computer-executable process steps. In addition, data such as gathered network performance statistics or other information can be stored in RAM 308, so that the data can be accessed by CPU 302 during the execution of computer-executable software programs, to the extent that such software programs have a need to access and/or modify the data.

As also shown in FIG. 3, hard disk 320 contains operating system 328, application programs 330 such as programs for starting up and shutting down the receiving endpoint 102 or other programs. Hard disk 320 further contains software library 332 for controlling the receiving of data from receiving endpoint 102.

Software library 332 in this example is identical to software library 232 in sending endpoint 101. However, in other embodiments, the software library 332 need not be identical to library 232, so long as the two libraries implement a similar software architecture relative to the software library, the traffic monitor, the bondable virtual interfaces, and the data organizer. For example, the sending and receiving endpoints might implement different versions of the same software architecture. Or the sending and receiving endpoints might implement architecture that target different operating systems, such as Windows on the sending endpoint and Linux on the receiving endpoint. Or, the sending endpoint and the receiving endpoint might implement architecture that is OS-neutral like JAVA. Hard disk 320 also contains traffic monitor 334 for gathering performance statistics for each of the multiple physical interfaces 105b, 106b, 107b and 108b. In addition, hard disk 320 contains bondable virtual interfaces 336, data organizer 338, application channels 340, endpoint channels 342, bondable virtual interface connectors 344, bondable virtual interface factory 346, and traffic proxy 348, each of which is instantiated by the software library 332 and will be described in more detail below with reference to FIGS. 4 and 5. Traffic proxy 348 may be used as a communication interface between the software library 332 and the traffic monitor 334. Lastly, hard disk 320 contains network drivers 350 for software interface to networks such as networks 111, 112, 113 and 114.

In an example embodiment, software library 332 and traffic monitor 334 are loaded by CPU 302 into a region of RAM 308. CPU 302 then executes the stored process steps of the software library 332 and the traffic monitor 334 from RAM 308 in order to execute the loaded computer-executable steps. In addition, the process steps of the application programs 330 are loaded by CPU 302 into a region of RAM 308. CPU 302 then executes the stored process steps as described in detail below in connection with FIGS. 16 to 18, in order to execute the loaded computer-executable steps.

General Description of Architecture

Transferring data between two endpoints in an efficient manner is difficult. Efficiency can be improved in general by increasing the amount of information concerning the nature of the transfer. For example, efficiency can be improved with an understanding of how to send data between two endpoints and also an understanding of the type of data being sent. Further, by identifying multiple physical interfaces and combining them together into one physical interface (i.e., bondable virtual interface), data throughput may be improved.

In a simplistic architecture, a media receiver/player requests (via e.g., HTTP or RTSP) for a movie stream from a media server. The media server then sends data to the client with some, but probably little concern as to the means or how well the client may have received the media stream data. In contrast, within the architecture of this example embodiment, the media client provides profile information (i.e., a suggested or predetermined bondable virtual interface configuration) as to the type of the media to be streamed, and negotiates with the media server as to the physical interfaces available to exchange data. With this knowledge of media type, both the sending and receiving buffer can be modified to improve throughput. The negotiation between the media client and the media server produces a configuration and setup for multiple physical interfaces via negotiation. In a case where there are multiple logical physical interfaces, the creation of a combined (or bondable virtual interface) physical interface will occur. In this regard, a bondable virtual interface is a combination of physical interfaces that can send data via multiple physical interfaces. Further, feedback information will be sent between both endpoints to improve throughput. The media client then receives the segments on the multiple physical interfaces, recombines the segments and provides the data to the media client's player (whether included in the media client or connected to the media client). Using this architecture makes it possible to ordinarily improve throughput by: (1) Sending information back (via a feedback channel) to the endpoint regarding changes to the data stream or processing of the data, which improves the efficiency of buffer management, and (2) using a bondable virtual interface which increases throughput of data by using multiple physical interfaces to send the data.

Figure 4:
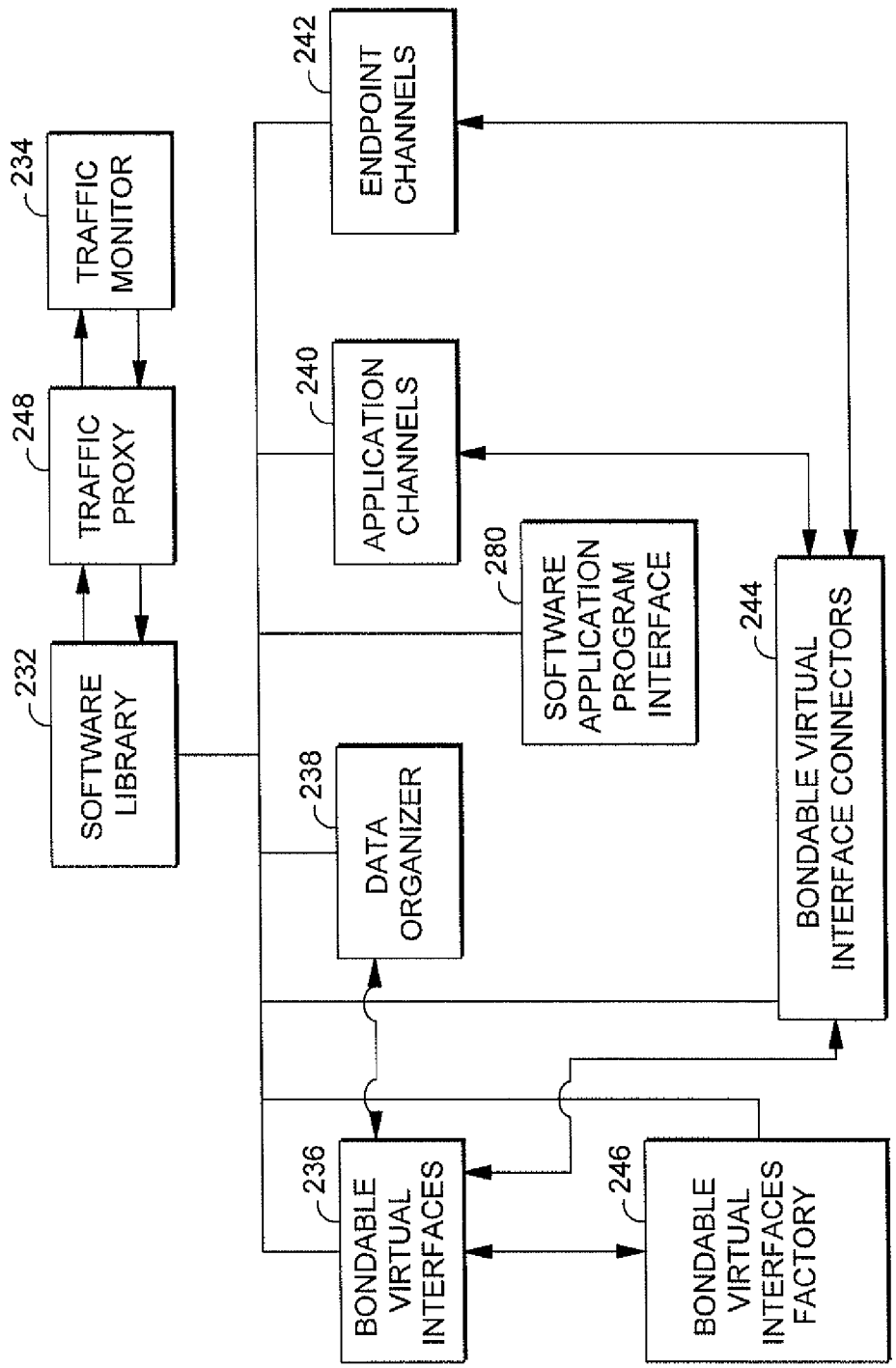
FIG. 4 is a high level view of an architecture according to an example embodiment.

FIG. 4 is a high level view of an architecture according to an example embodiment. As shown in FIG. 4, the architecture includes software library 232 and traffic monitor 234. The software library 232 is connected to and communicates with the traffic monitor 234 through traffic proxy 248. In this regard, the software library 232 instantiates and associates with the traffic monitor 234 via the traffic proxy 248. However, the traffic proxy 248 may be omitted, and the software library 232 and the traffic monitor 234 may communicate with each other directly.

As used herein, the word "instantiate" refers to the construction in memory of a software object, such as by use of an object factory. How the software object is created varies among different programming languages. In prototype-based languages, an object can be created from nothing, or an object can be based on an existing object. In class-based language, objects are derived from classes, which can be thought of as blueprints for constructing the software objects.

As further shown in FIG. 4, the software library 232 is connected to bondable virtual interfaces 236, bondable virtual interface factory 246, data organizer 238, software application program interface 280, application channels 240, and endpoint channels 242. In this regard, the software library 232 instantiates and associates with the bondable virtual interfaces 236, the bondable virtual interface factory 246, the data organizer 238, the software application program interface 280, the application channels 240, and the endpoint channels 242. In addition, the data organizer 238 instantiates a data splitter or a data combiner (both of which are described below in detail in connection with FIG. 5), depending on whether the architecture is implemented on a sending endpoint or a receiving endpoint. The foregoing mentioned components will be described, including their use and functionality, in more detail below in connection with FIG. 5.

Furthermore, the bondable virtual interface factory 246 is connected to and associates with the bondable virtual interfaces 236. The bondable virtual interfaces 236 are also connected to and associate with the data organizer 238 and the bondable virtual interface connectors 244. The bondable virtual interface connectors 244 also associate with application channels 240 and endpoint channels 242.

Figure 5:
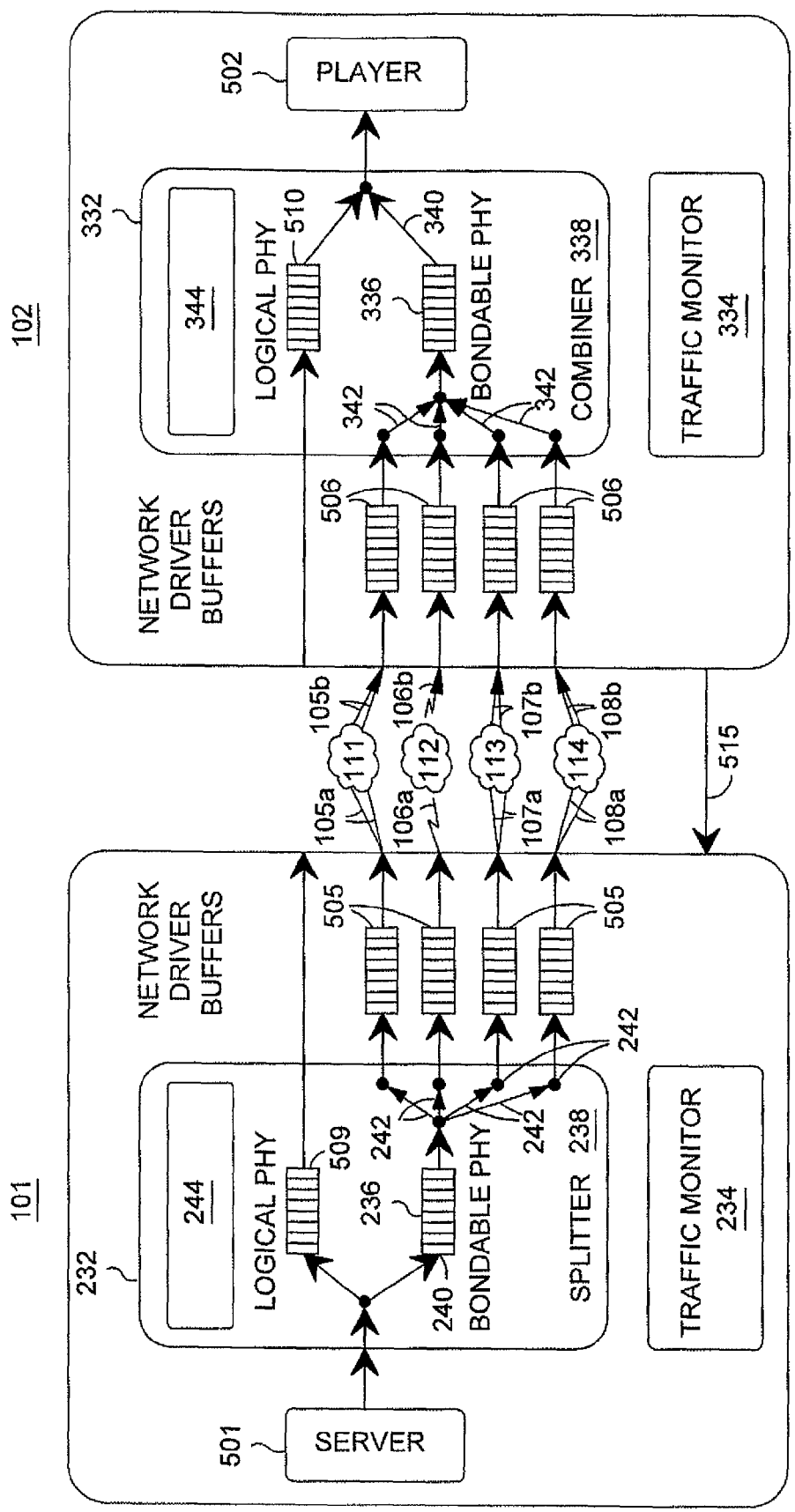
FIG. 5 is another view of a sending endpoint and a receiving endpoint, for providing a general explanation of an example embodiment.
Figure 6B:
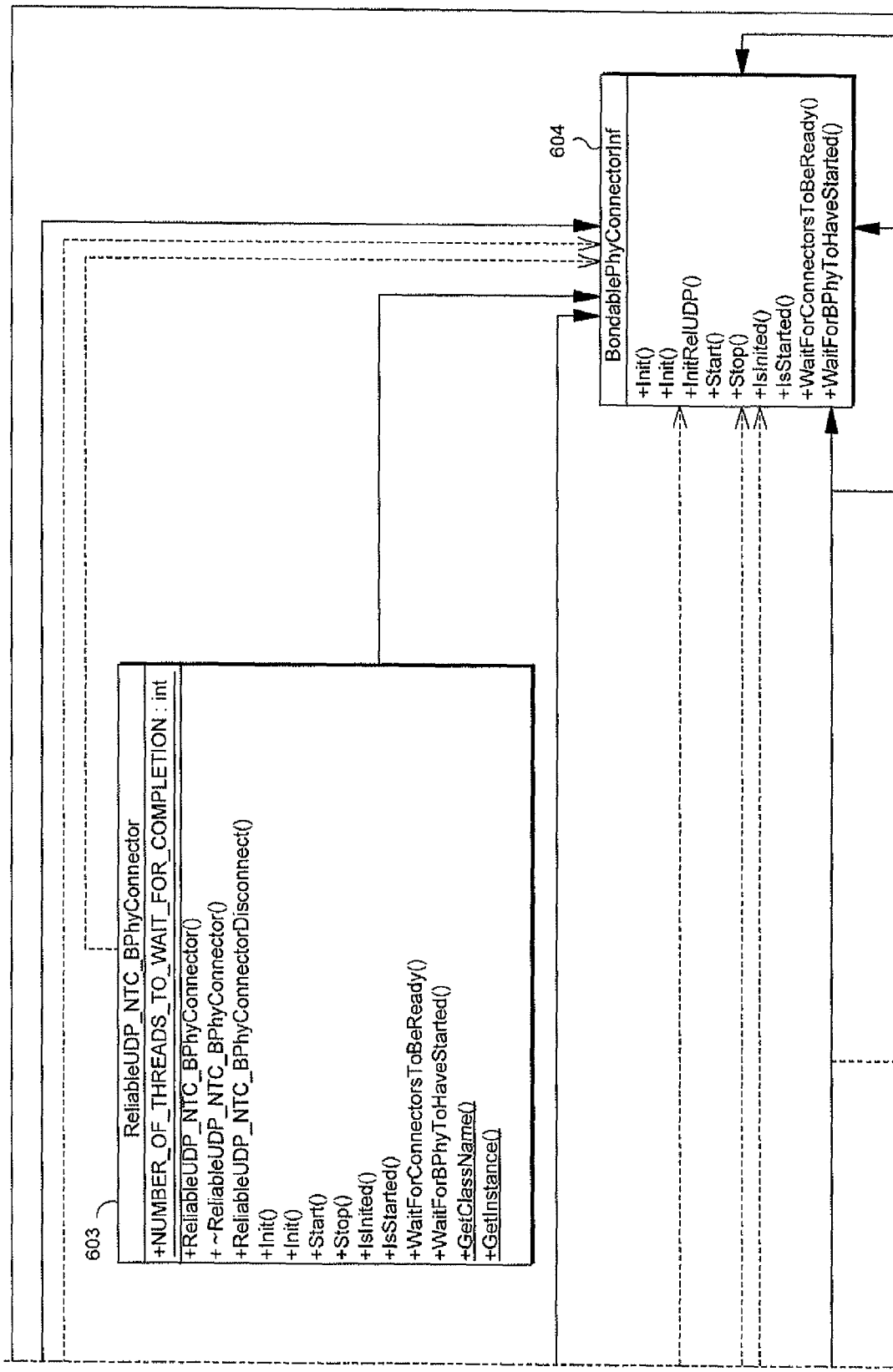
FIGS. 6A to 6N show a Unified Modeling Language (UML) class diagram for an architecture of an example embodiment.
Figure 6D:
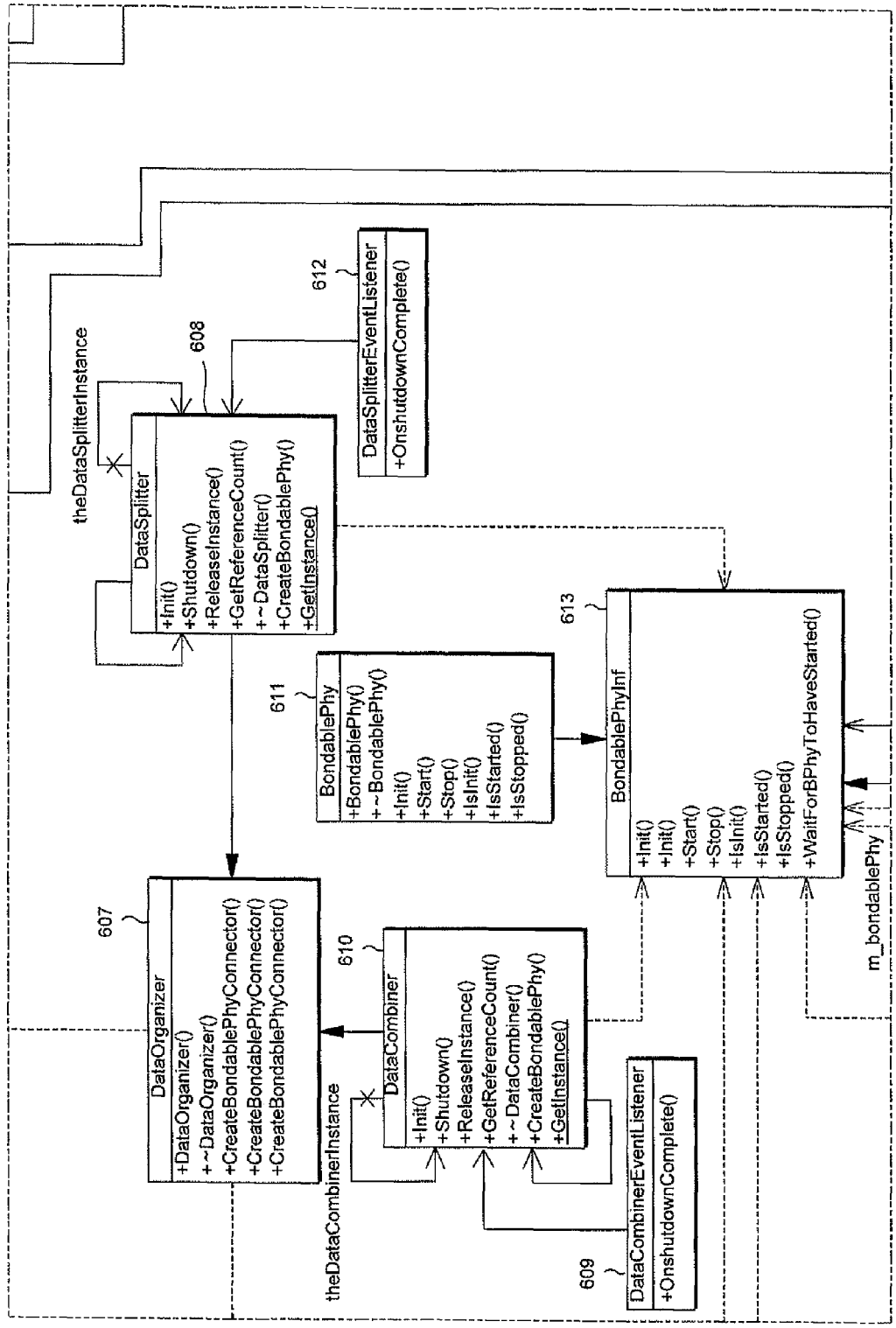
Figure 6E:
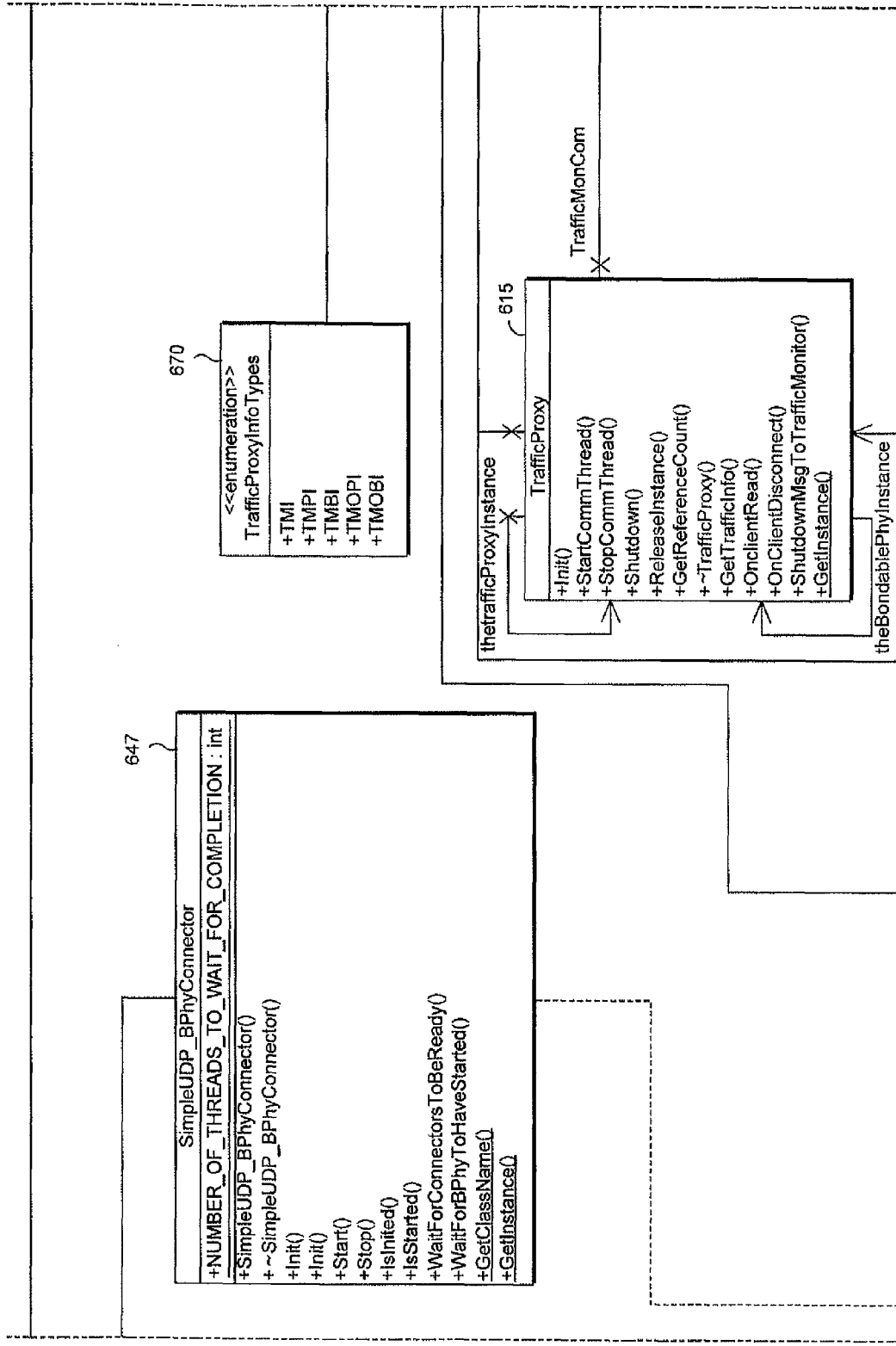
Figure 6F:
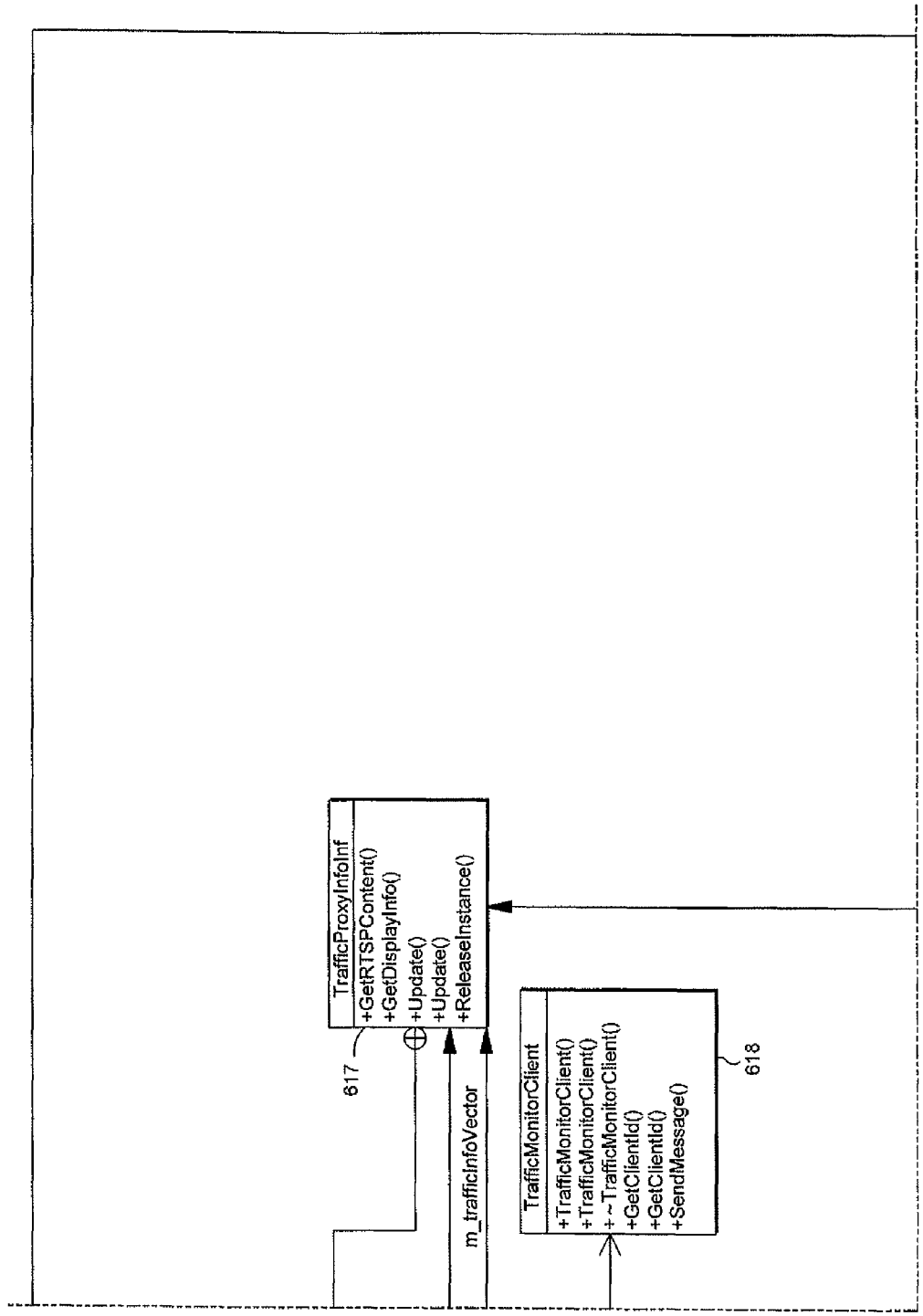
Figure 6G:
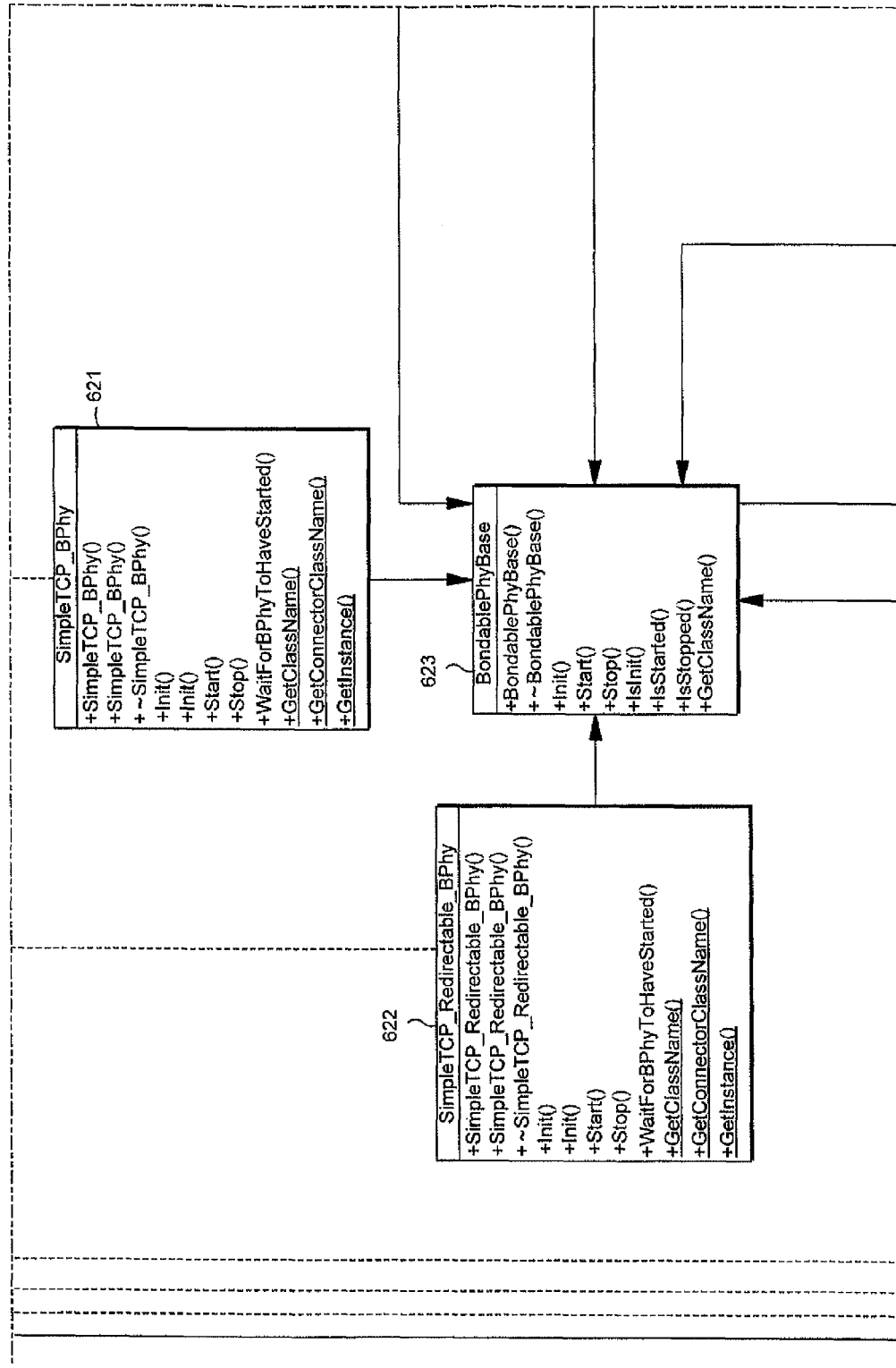
Figure 6H:
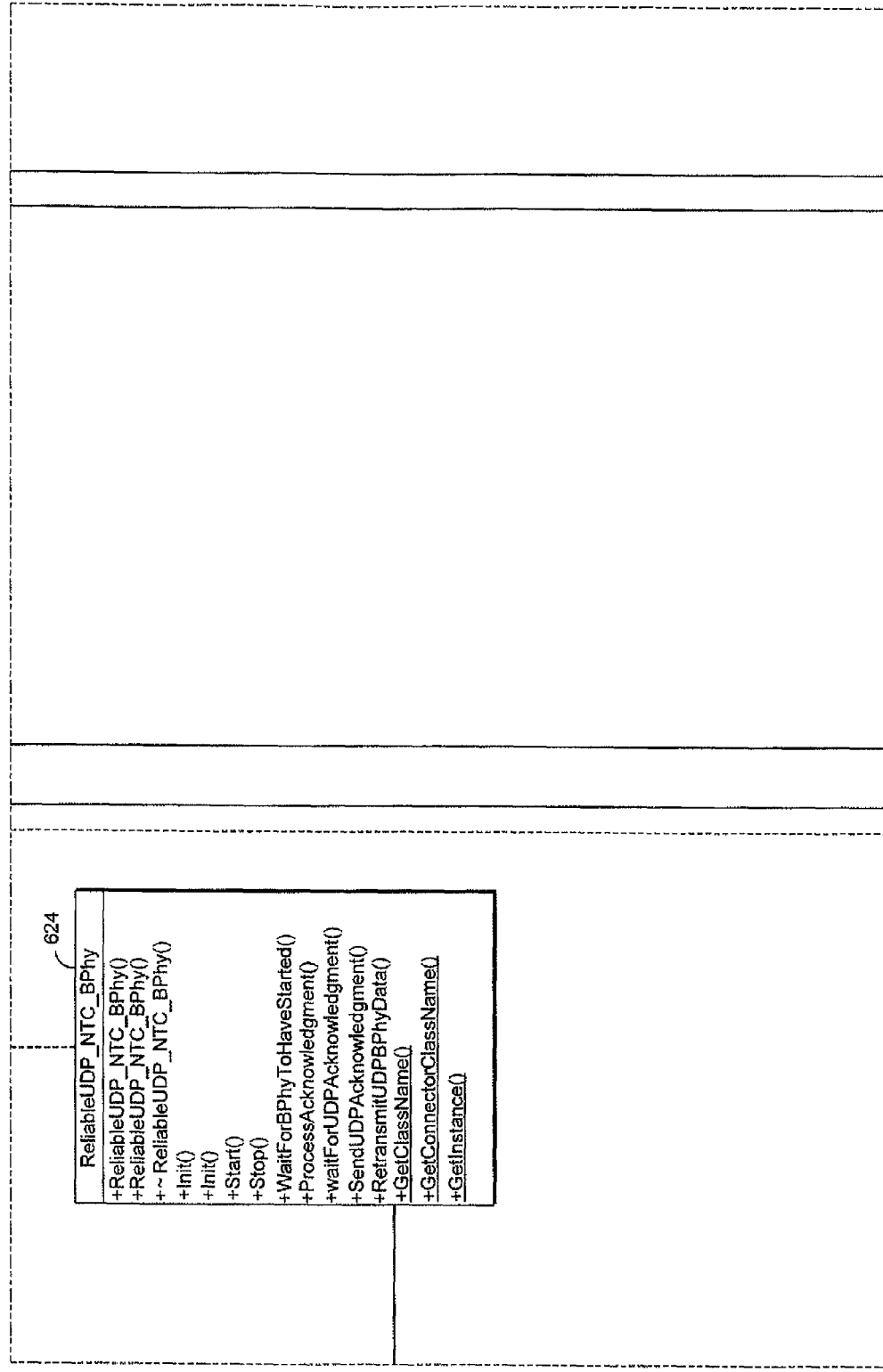
Figure 61:
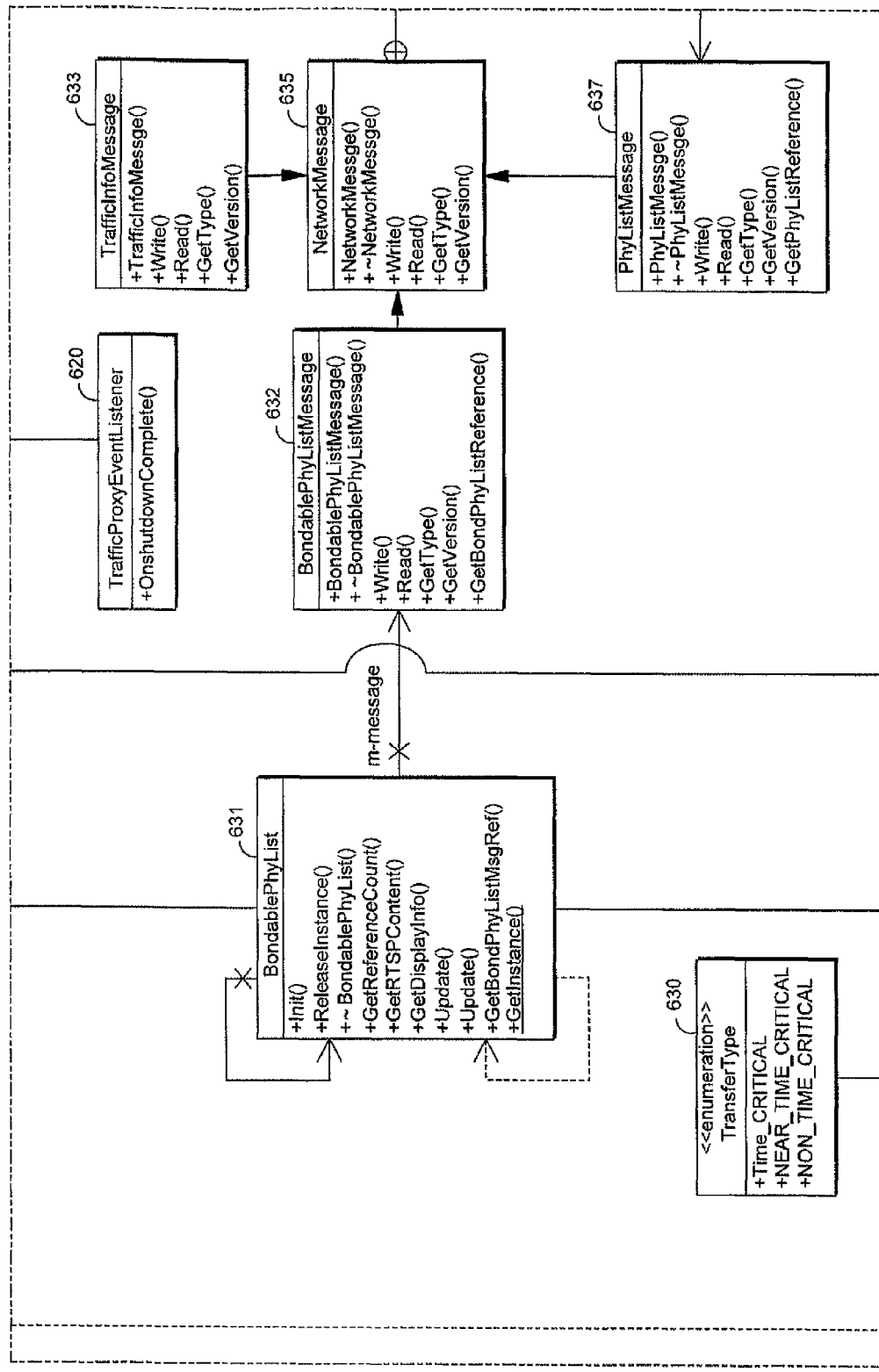
Figure 6J:
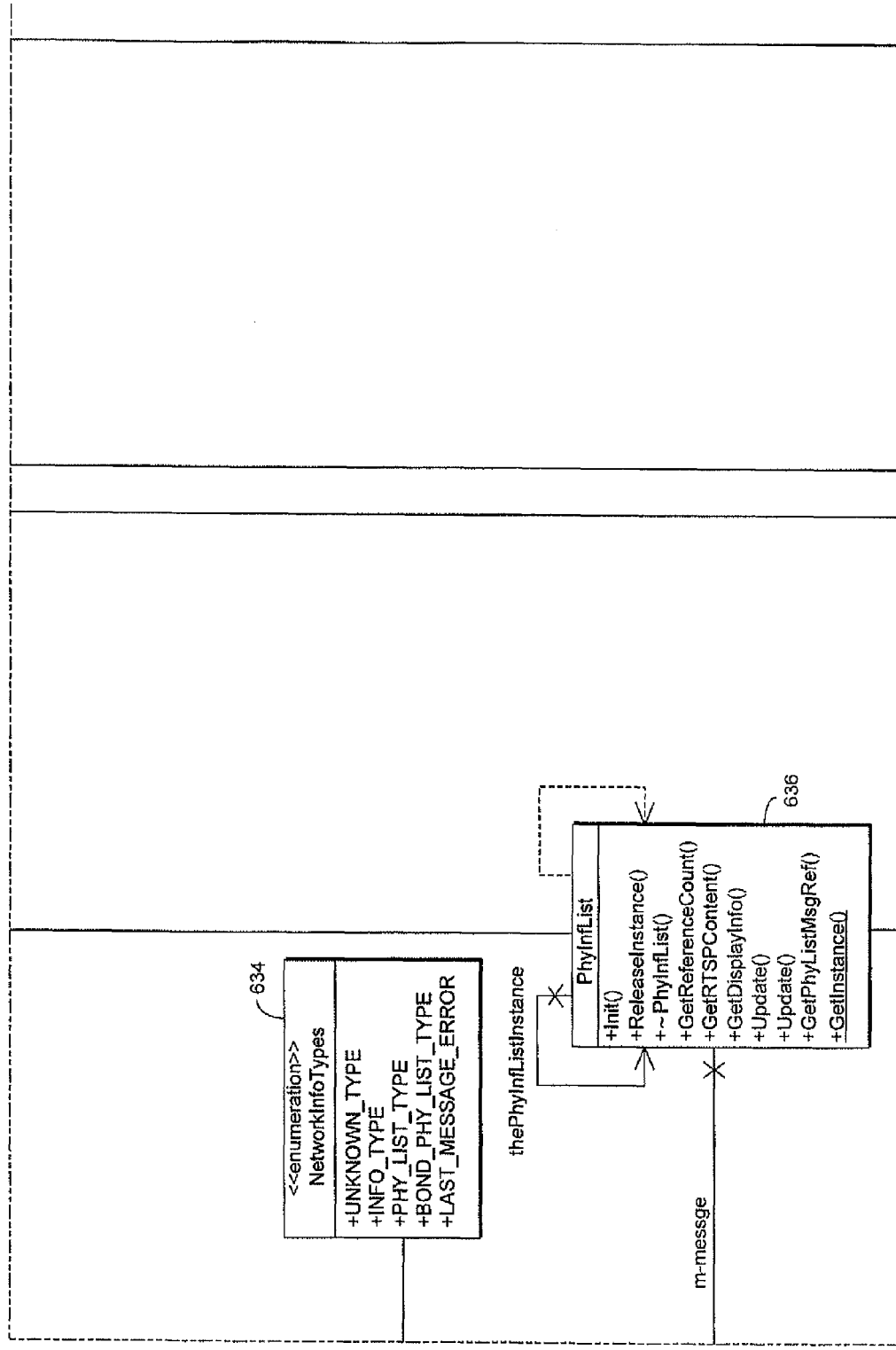
Figure 6K:
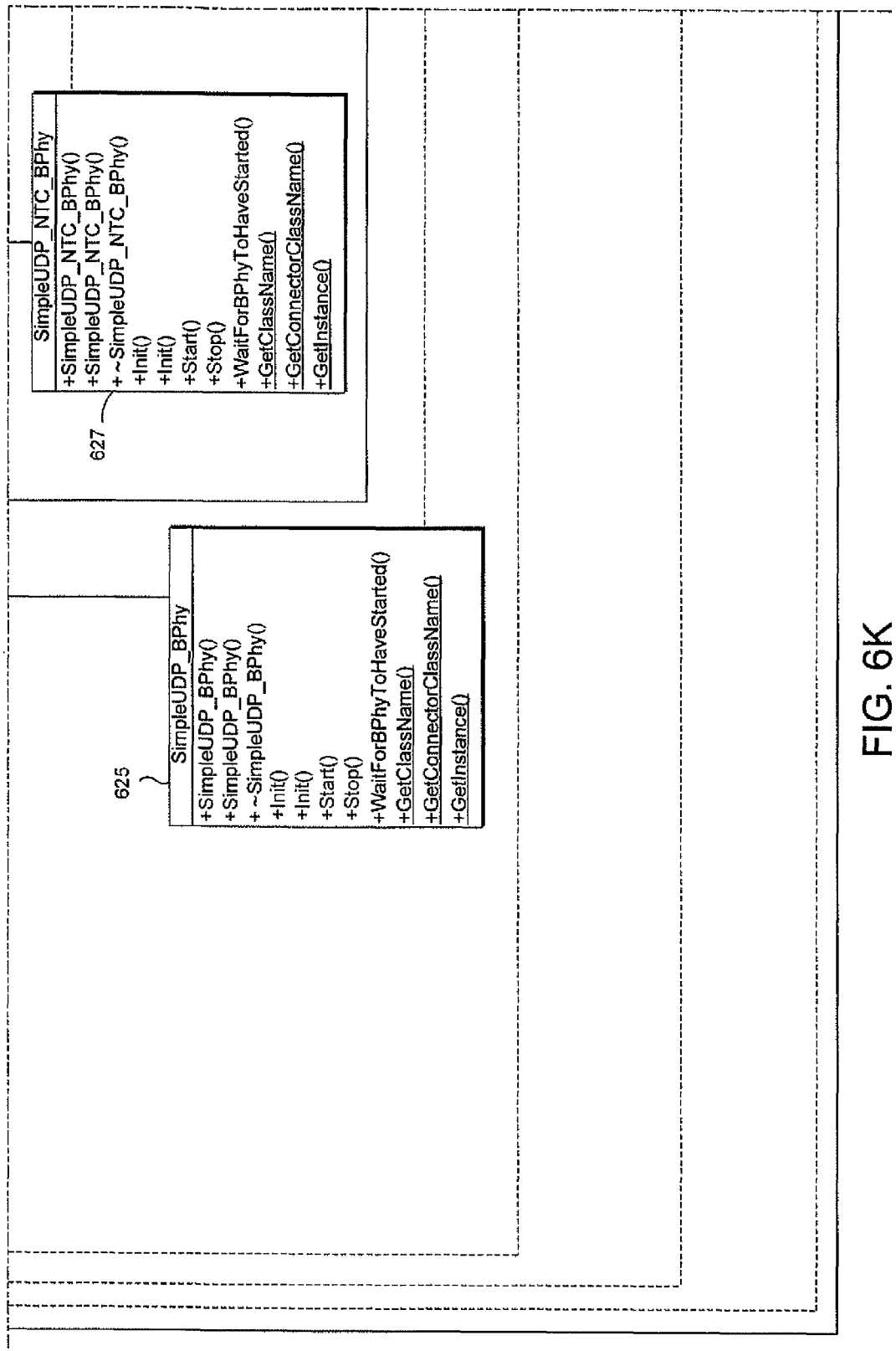
Figure 6L:
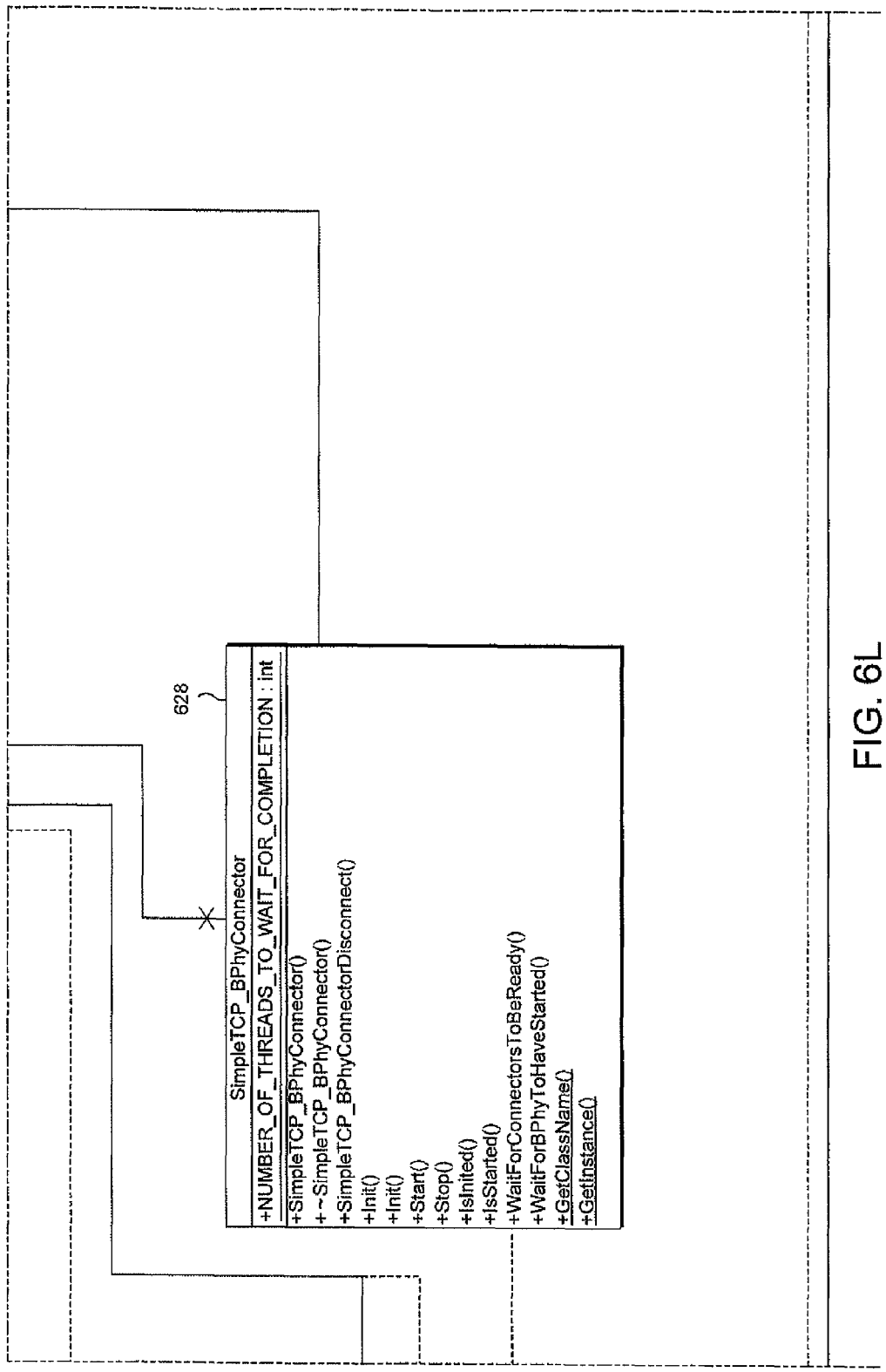
Figure 6M:
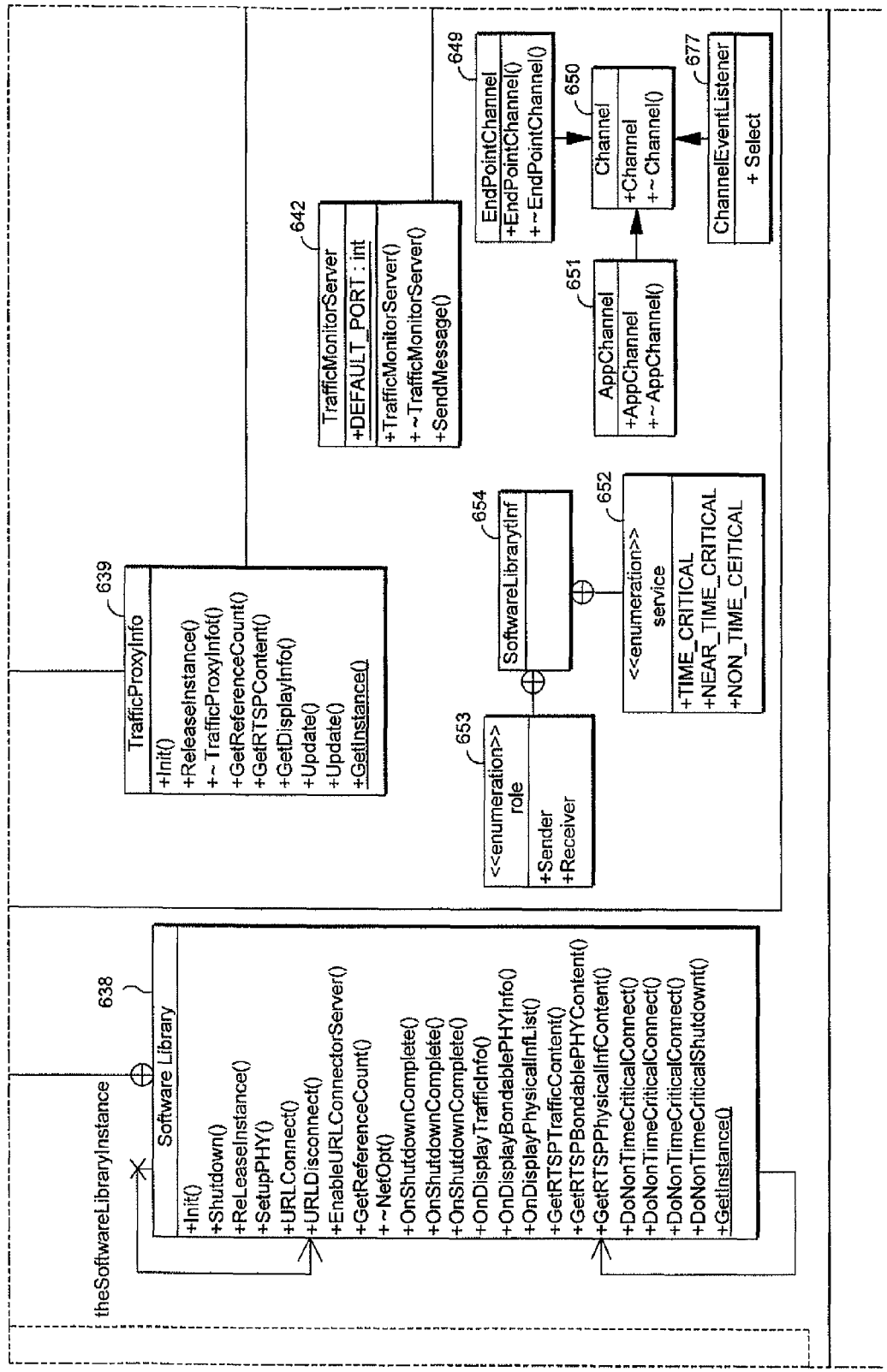
Figure 6N:
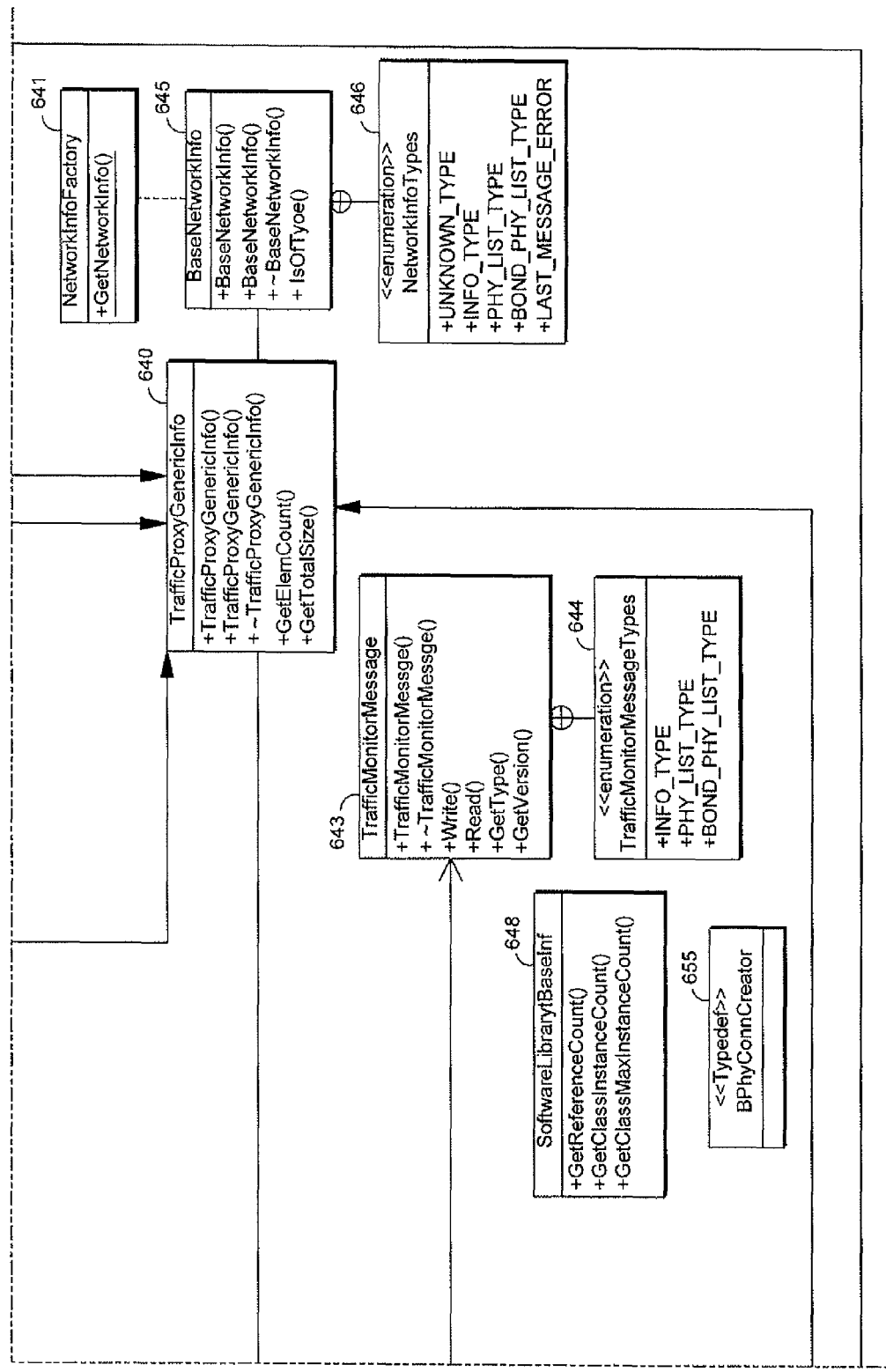

The above-mentioned architecture will now be described in more detail in connection with FIG. 5. FIG. 5 is another view of the sending endpoint 101 and the receiving endpoint 102 shown in FIG. 1, for providing an explanation of an example embodiment of the architecture included in both endpoints. As discussed above in connection with FIG. 1, the architecture is for streaming data from a sending endpoint 101 to a receiving endpoint 102 which are connected to each other by multiple networks (111, 112, 113, 114 of FIG. 1). Each of the sending endpoint 101 and the receiving endpoint 102 has multiple physical interfaces (105a and b, 106a and b, 107a and b and 108a and b of FIG. 1), each for interfacing to a respective one of the multiple networks. The architecture for controlling the streaming of the data is implemented on both the sending endpoint 101 and the receiving endpoint 102.

As shown in FIG. 5, the architecture on the sending endpoint 101 includes a software library 232 and a traffic monitor 234. The traffic monitor 234 is for gathering performance characteristics of each of the multiple physical interfaces. More specifically, the traffic monitor 234 is an operating system-specific application or (daemon) service that provides the software library 232 with all of the available physical interfaces, and with individual physical interface performance/traffic statistics and data. The traffic monitor 234 may obtain network status by periodically making system calls to system's data structures to acquire statistics for each physical interface of the sending endpoint 101. This data is then used by the traffic monitor 234 to specify corresponding configurations for bondable virtual interfaces, which will be described in more detail below, including a list of suitable known bondable virtual interfaces that can be used to transfer data based on current network traffic. The traffic monitor 234 communicates information back and forth between the software library 232. As shown in FIG. 5, the traffic monitor 234 communicates directly with the software library 232; however, in other embodiments, the traffic monitor 234 can communicate with the software library 232 via traffic proxy 248 as described above in connection with FIG. 4.

The software library 232 is for controlling the sending of the data stream from the sending endpoint 101. In controlling the sending of data, the software library 232 instantiates a plurality of bondable virtual interfaces 236 and a data organizer 238. In addition, the software library 232 instantiates logical physical interfaces 509. The logical physical interface 509 is an abstraction of a physical interface, which has a uniform interface. In addition, the bondable virtual interfaces 236 are instantiated by the software library based on the information communicated by the traffic monitor 234, for splitting the data stream into multiple data substreams at the sending endpoint 101. A bondable virtual interface is a clustering of two or more logical physical interfaces as a bondable object that aggregates available bandwidth with a single thread to manage a common buffer memory. The bondable virtual interface has a second thread to listen to a single feedback path from the receiving endpoint 102, and has additional threads for managing data transfer from a common buffer memory to each of an associated logical physical interface. An example of a bondable virtual interface is a pair of 802.11g wireless interfaces combined for a nominal available bandwidth of 44 Mb/s, assuming ~22 Mb/s of effective bandwidth for each individual interface.

In addition, the data organizer is used for designating one of the plurality of bondable virtual interfaces 236 for splitting the data stream. At the sending endpoint 101, the data organizer 238 instantiates a data splitter 238 for implementing the designated one of the plurality of bondable virtual interfaces 236 at the sending endpoint 101. In this regard, the data organizer 238 is a parent object for the data splitter, and includes functionality for the registration of new or added bondable virtual interfaces. Moreover, the data organizer 238 is inherited by the data splitter 238. The data splitter 238 contains the bondable virtual interfaces 236 class implementation, and contains the associated behavior for splitting the input data stream onto the multiple physical interfaces.

Similar to the sending endpoint 101, in the receiving endpoint 102, the architecture includes a software library 332 and a traffic monitor 334. The traffic monitor 334 is for gathering performance characteristics of each of the multiple physical interfaces. More specifically, the traffic monitor 334 is an operating system-specific application or (daemon) service that provides the software library 332 with all of the available physical interfaces and with individual physical interface performance/traffic statistics and data. The traffic monitor 334 may obtain network status by periodically making system calls to system's data structures to acquire statistics for each physical interface of the receiving endpoint 102. This data is then used by the traffic monitor 334 to specify corresponding configurations for bondable virtual interfaces, which will be described in more detail below, including a list of suitable known bondable virtual interfaces that can be used to transfer data based on current network traffic. The traffic monitor 334 communicates information back and forth between the software library 332. In FIG. 5, the traffic monitor 334 communicates directly with the software library 332; however, in other embodiments, the traffic monitor 334 can communicate with the software library 332 via a traffic proxy as described above in connection with FIG. 4.

The software library 332 is for controlling the receiving of the data stream at the receiving endpoint 102. In controlling the receiving of data, the software library 332 instantiates a plurality of bondable virtual interfaces 336 and a data organizer 338. In addition, the software library 332 instantiates logical physical interfaces 510. The logical physical interfaces 510 are substantially the same as logical physical interfaces 509, and provide the same functions. The bondable virtual interfaces 336 are instantiated by the software library based on the information communicated by the traffic monitor 334, for combining the multiple data sub-streams into the data stream at the receiving endpoint 102. In addition, the data organizer is for designating one of the plurality of bondable virtual interfaces 236 for combining the data stream.

At the receiving endpoint 102, the data organizer 338 instantiates a data combiner 338 for implementing the designated one of the plurality of bondable virtual interfaces 336 at the receiving endpoint 102. In this regard, the data combiner 338 is a parent object for the data combiner 338, and includes functionality for the registration of new or added bondable virtual interfaces. Moreover, the data organizer 338 is inherited by the data combiner 338. The data combiner 338 contains the bondable virtual interfaces 336 class implementation, and contains the associated behavior for combining multiple input streams into a resulting single data stream.

At startup of the architecture, the data splitter 238 and the data combiner 338 read network statistics provided by the traffic monitor 234 and 334. The traffic monitors' network statistics are updated periodically (at optionally application specified intervals), and are organized to display an ordered list of recommended bondable physical interface configurations, along with a minimum bandwidth available for each.

As further shown in FIG. 5, the sending endpoint 101 and the receiving endpoint 102 are each connected to one or more applications, such as application server 501 and application player 502, respectively. In this regard, the software library 232 of the sending endpoint 101 and the software library 332 of the receiving endpoint 102 further instantiate one or more application channels 240 and 340, respectively, connecting the software libraries 232 and 332 to one or more applications 501 and 502, respectively. The one or more application channels 240 write data to the software library 232, the written data having been received by the sending endpoint 101 from the one or more applications 501. In addition, the one or more application channels 340 read data from the software library 332, the read data having been sent from the receiving endpoint 102 to the one or more applications 502 connected to the receiving endpoint 102. For the application channels, a "named-socket" can be used, which provides a very similar interface to the traditional "single socket" approach in common usage. Moreover, the one or more application channels 240 and 340 include an event handling mechanism to indicate when there is data to be read from or written to the software libraries 232 and 332. The event handling mechanism for a named-socket is a select; however, many other means can be used for triggering events on the application channels.

As shown in FIG. 5, the software libraries 232 and 332 further instantiate multiple endpoint channels 242 and 342, respectively, connecting the software libraries 232 and 332 to the multiple physical interfaces 105a to 108a and 105b to 108b through network driver buffers 505 and 506. The multiple endpoint channels 242 and 342 write data to the software library 332, the written data having been received at the receiving endpoint 102 from the sending endpoint 101, and read data from the software library 232, the read data having been sent from the sending endpoint 101 to the receiving endpoint 102. The multiple endpoint channels 242 and 342 include an event handling mechanism to indicate when there is data to be read from or written to the multiple physical interfaces 105a and 105b to 108a and 108b. In addition, the network driver buffers 505 and 506 are provided to store data before sending data on the sending side, and before reconstructing the data stream and providing the single data stream to the application player 502 on the receiving side. In general, for the multiple endpoint channels, UDP and/or TCP sockets are used to write and read data to/from a network. Moreover, the event handling mechanism for the endpoint channels can be a select; however, other means for triggering events on the endpoint channels may be used. Lastly, an endpoint channel usually has an associated physical interface (e.g., an Ethernet socket); however, other instances exist in which this is not the case. For example, the case exists of using one physical interface but using multiple ports (e.g., using 2 sockets using IP address 192.168.10.1 port 10000 and port 10001).

The bondable virtual interfaces 236 and 336, as shown in FIG. 5, are created by the data splitter 238 or the data combiner 338 to perform the splitting or combining of the data stream. The bondable virtual interfaces 236 and 336 conform to an interface, which allows them to be used generically in the framework. In other words, one bondable virtual interface could be substituted with another bondable virtual interface quite easily without changing any interface requirements elsewhere in the software library, or in an application. Lastly, a bondable virtual interface can have multiple physical interfaces associated with it, or a bondable virtual interface can have a single logical physical interface (as is the case with sockets using one physical interface but with multiple ports).

In addition, the bondable virtual interfaces 236 and 336 have the basic functionality to split or combine data (based upon the role provided by the data splitter 238 or the data combiner 338). In general, the bondable virtual interfaces may be a reduction of a number or a set of rules regarding how to handle data from one or more application channels split over one or more endpoint channels (or vice versa, when recombining data). Thus, different types of bondable virtual interfaces may be created. Three examples of such bondable virtual interfaces are: a simple TCP Bondable virtual interface, a simple UDP bondable virtual interface, and a feedback TCP bondable virtual interface. A simple TCP bondable virtual interface is a bondable virtual interface consisting of multiple physical network interfaces, sending data with each interface using standard TCP connections. An example of a simple TCP bondable virtual interface would be a "round robin" type bondable virtual interface, which uses multiple interfaces to send data.

A simple UDP bondable virtual interface is a bondable virtual interface consisting of multiple physical network interfaces, and sending data with each interface using standard UDP datagrams.

A feedback TCP bondable virtual interface is a bondable virtual interface which utilizes feedback from the receiving endpoint to change the manner in which data is sent over multiple physical network interfaces using TCP connections.

When designating ones of the plurality of bondable virtual interfaces 236 and 336, the data splitter 238 and the data combiner 338 negotiate to designate one of the bondable virtual interfaces, based on the performance characteristics of the multiple physical interfaces 105a to 108a and 105b to 108b and available ones of the plurality of bondable virtual interfaces. During the negotiation between the data splitter 238 and the data combiner 338, the data splitter 238 presents available ones of the plurality of bondable virtual interfaces, and the data combiner 338 selects one of the available ones of the plurality of bondable virtual interfaces.

Furthermore, the software libraries 232 and 332 further instantiate a plurality of bondable virtual interface connectors 244 and 344, respectively. Each bondable virtual interface connector is associated with a specific bondable virtual interface. The bondable virtual interface connectors 244 and 344 ensure that the connections between the software libraries 232 and 332 and the multiple physical interfaces 105a to 108a and 105b to 108b via the multiple endpoint channels 242 and 342, respectively, are ready to accept data before sending data from the sending endpoint 101 to the receiving endpoint 102. In addition, the bondable virtual interface connectors 244 and 344 ensure that the connections between the software libraries 232 and 332 and the one or more applications 501 and 502 via the one or more application channels 240 and 340, respectively, are ready to accept data before sending data from the sending endpoint 101 to the receiving endpoint 102.

When sending streaming data from the sending endpoint 101 to the receiving endpoint 102, the one or more applications 501 specify a category of time objective: the categories include a non-time critical objective, a time critical objective, or a near-time critical objective. A non-time critical data stream is a data stream where the data should be received without error; however, time may not be a critical factor (i.e., there may be scenarios (or situations) where time is a critical factor). In these scenarios, a contributing factor for a non-time critical data stream should also include data integrity and thus, in these situations, there is a significant difference between non-time critical, near-time critical and time critical. For example, a non-time critical objective would be specified for a simple file transfer, because the data in this scenario ordinarily should be received without error, and arrival time may not be important for this data.

A near-time critical data stream is a data stream where the data is bound to an endpoint within a range of time. For example, a video stream can possibly be buffered for 5 seconds before the first video frame is displayed on the screen. Or, in the case of a larger memory buffer or hard drive, the first couple of minutes can be burst from the sender to the receiver (i.e., video server to video player). Thus, after the head start (buffer or system priming) has been buffered, the remaining data can be sent in a more leisurely manner, as long as it is received in time to be consumed by the player without interruption in playback. Further, in video streams, it is often the case that some of the packets may be dropped, corrupted or lost due to collision or other network impairments. In this regard, UDP is often the de-facto standard of video streaming and UDP does not guarantee delivery.

For a time-critical data stream, it is usually imperative that the information be received as quickly as possible. Moreover, a time critical objective would be specified when streaming an interactive video stream such as a video conference, because the data in this scenario should be received as soon as possible, while a loss of an insignificant portion of the data may be acceptable.

Because a time objective is specified for the data to be sent, the architecture has greater flexibility in choosing which of the multiple physical interfaces to utilize in sending data. Thus, instead of solely relying on network bandwidth of the multiple physical interfaces, the architecture can utilize the time objectives to provide an even more efficient means of sending data between the endpoints.

For the near-time critical and the time critical data streams, transferring of the stream will involve a payload stream mechanism, a feedback stream mechanism 515, and a control stream mechanism. The payload stream mechanism sends the payload content from the sending endpoint 101 to the receiving endpoint 102. In the architecture, the payload stream is sent via a bondable virtual interface, for example, using an RTP-like protocol where multiple physical interfaces will be used to send data to the receiving endpoint 102. The feedback stream mechanism 515 sends processing and physical interface behavior information between the receiving endpoint 102 and the sending endpoint 101 (or in other scenarios vice-a-versa) using, for example, an RTCP like protocol. The control stream mechanism sends content control commands from the receiving endpoint 102 to the sending endpoint 101 (e.g., play, pause, etc.) using, for example, an RTSP like protocol.

For a non-time critical data stream, the transferring of the stream within the architecture will have the same behavior as the near-time and the time critical data streams with no control stream. Thus, the transferring of the stream for a non-time critical data stream involves a payload stream mechanism and a feedback stream mechanism, each having similar characteristics as the stream mechanisms of the near-time and the time critical data streams.

Furthermore, the software libraries 232 and 332 each further comprise a software application program interface 280, as described in connection with FIG. 4, which consists of a set of commands used by the one or more applications 501 and 502 to utilize the architecture. In addition, the software libraries 232 and 332 each instantiate a bondable virtual interface factory 246, as described in connection with FIG. 4, for registering the newly created ones of the plurality of bondable virtual interfaces, unregistering ones of the plurality of bondable virtual interfaces which are no longer available, and providing a list of available bondable virtual interfaces to the data organizer.

As discussed above, the traffic monitors 234 and 334 may communicate with the software libraries 232 and 332, respectively, via a traffic proxy. In this case, the software libraries 234 and 334 each further instantiate a traffic proxy 248 (as described in connection with FIGS. 2 and 4) and a traffic proxy 348 (as described in connection with FIG. 3) for communicating information between the traffic monitors 234 and 334 and the software libraries 232 and 332, respectively, via a shared common interface. The common interface is a shared library, which contains objects containing information and the means to share this common data between the traffic monitors 232 and 332 and the traffic proxies 248 and 348. The transport mechanism can be changed easily and additional information can be added (e.g., by adding new objects). Furthermore, in cases where the bondable virtual interface uses some form of feedback mechanism, traffic problems identified by feedback will be relayed to the traffic monitors 234 and 334 via the traffic proxies 248 and 348.

In general, all interaction between the architecture and other applications is conducted through a basic interface. This basic interface is comprised of a core functionality, which is specific to the architecture, and behavioral functionality, which is specific to the operation of the interfacing application. Examples of core functionality would be a startup and shutdown of the architecture. Behavioral functionality examples might include RTSP, or URL connection functionality. For example, the architecture will provide a setup functionality to extend the standard RTSP setup functionality, in which the extension to RTSP is obtainable from an RTSP OPTIONS command. In another example, URL connection functionality can be added to achieve file transfer behavior.

FIG. 6 (6A to 6N) shows a Unified Modeling Language (UML) class diagram for an architecture of an example embodiment. As shown in FIG. 6, a TransferType 630 object is contained by a SoftwareLibrary object 638.

Also shown in FIG. 6, is a SimpleUDP_NTC_BPhyConnector object 601, a SimpleTCP_Redirectable_BPhyConnector object 602, and a ReliableUDP_NTC_BPhyConnector object 603, all of which associate and are dependent upon BondablePhyConnectorInf object 604. In addition, a SimpleUDP_PhyConnector object 647, and a SimpleTCP_BPhyConnector 628 all associate with and are dependent upon the BondablePhyConnectorInf object 604. Moreover, a BondablePhyFactory object 605 is dependent upon the BondablePhyConnectorInf object 604. Furthermore, a BondableBPhyConnector object 606 associates with BondablePhyConnectorInf object 604.

The SimpleTCP_BPhyConnector object 628 also associates with BondablePhyInf object 613. Moreover, a SimpleTCP_Redirectable_BPhy object 622, a SimpleTCP_BPhy object 621, a ReliableUDP_NTC_BPhy object 624, a SimpleUDP_NTC_BPhy object 627, a SimpleUDP_BPhy object 625, a DataCombiner object 610, and a DataSplitter object 608 are all dependent upon the BondablePhyInf object 613. In addition, the SimpleTCP_BPhy object 621, the SimpleTCP_Redirectable_BPhy object 622, the ReliableUDP_NTC_BPhy object 624, the SimpleUDP_BPhy object 625, and the SimpleUDP_NTC_BPhy 627 all associate with BondablePhyBase object 623. The BondablePhyBase object 623 associates with the BondablePhyInf object 613. BondablePhy object 611 also associates with the BondablePhyInf object 613.

The DataCombiner object 610 and DataSplitter object 608 each are associated with and inherit the DataOrganizer object 607, which is dependent upon the BondablePhyConnector object 606 and the BondablePhyConnectorInf object 604. In addition, a DataCombinerEventListener object 609 and a DataSplitterEventListener object 612 associate with the DataCombiner object 610 and the DataSplitter object 608, respectively.

Furthermore, a TrafficProxyInfoTypes object 670 is contained by a TrafficProxyInfoInf object 617. In addition, a PhyInfList object 636, a TrafficProxyInfo object 639, a BondablePhyList object 631, and a TrafficProxy object 615 all associate with the TrafficProxyInfoInf object 617. In addition, a TrafficProxyEventListener 620 associates with the TrafficProxy object 615, and the TrafficProxy object 615 associates with a TrafficMonitorClient object 618. The BondablePhyList also associates with the TrafficProxyGenericInfo object 640 and a BondablePhyListMessage object 632. Moreover, the TrafficProxyInfo object 639 and a BaseNetworkInfo 645 associate with the TrafficProxyGenericInfo object 640. The BaseNetworkInfo object 645 is dependent upon the NetworkInfoFactory object 641, and a NetworkInfoTypes object 646 is contained by the BaseNetworkInfo object 645.

Moreover, the BondablePhyListMessage object 632, the TrafficInfoMessage object 633, and the PhyListMessage object 637 all associate with a NetworkMessage object 635. In addition, a NetworkInfoTypes object 634 is contained by the NetworkMessage object 635. Furthermore, the PhyInfList object 636 associates with the PhyListMessage object 637 and the TrafficProxyGenericInfo object 640.

In addition, a TrafficMonitorMessageTypes object 644 is contained by a TrafficMonitorMessage object 643, and a TrafficMonitorServer object 642 associates with the TrafficMontiorMessage object 643.

FIG. 6 also shows that an EndPointChannel object 649 and an AppChannel object 651 associate with a Channel object 650. Also shown in FIG. 6, are an <<enumeration>> role object 653 and an <<enumeration>> service object 652 which interface with a SoftwareLibraryInf object 654. A ChannelEventListener object 677 is also associated with the Channel object 650.

Use Cases

Some example implementations are described below, which use the architecture according to an example embodiment. These use cases include situations in which the architecture will be used, and the steps to be implemented for these situations. The following use cases are not an extensive list of use cases for all scenarios of using the architecture; rather, other use cases and implementations may exist or be developed.

Video Streaming Use Case

Figure 7:
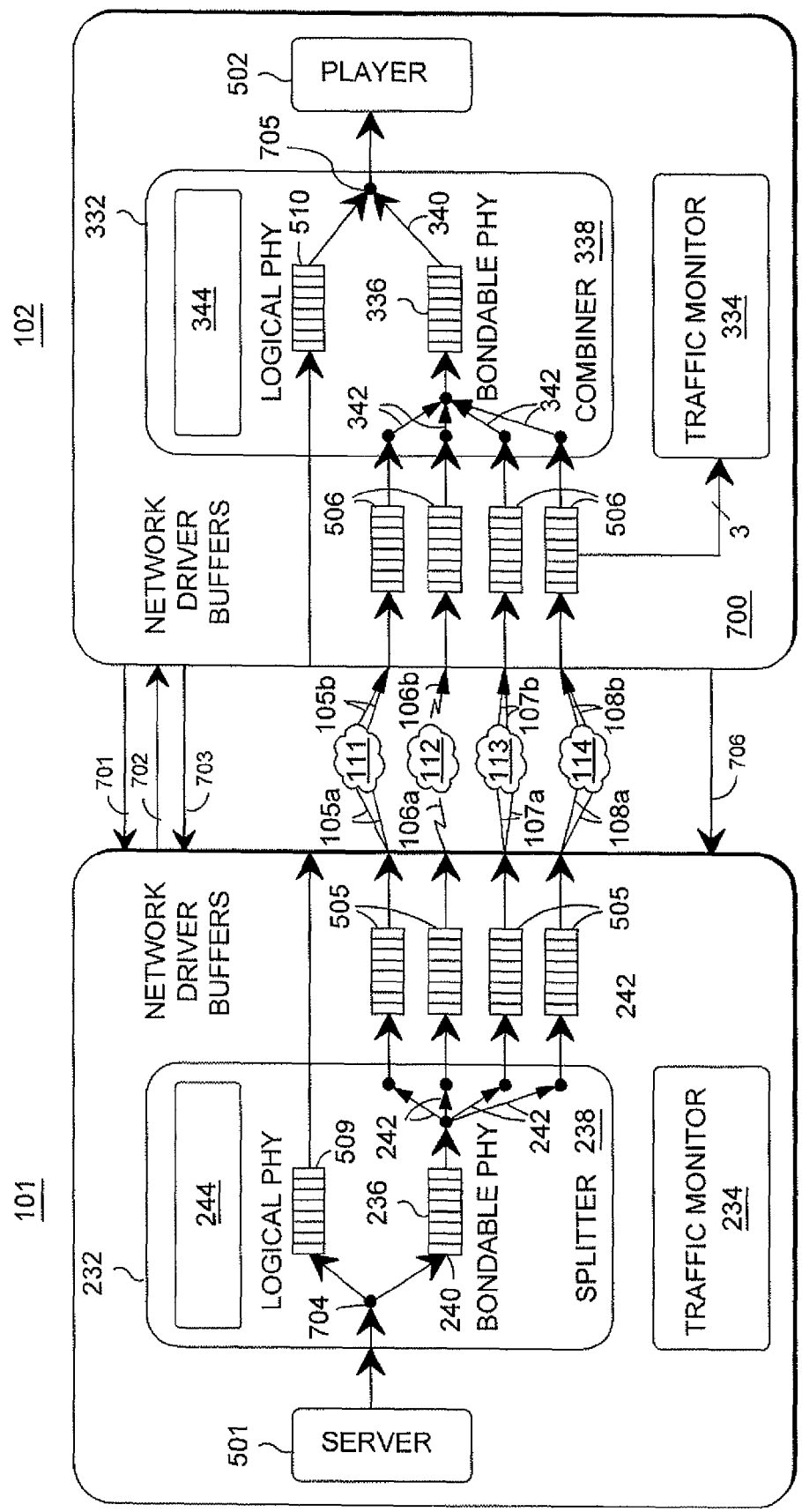
FIG. 7 is an illustration for providing an explanation of a sending endpoint and a receiving endpoint negotiating a playback of a media stream in accordance with an example embodiment.

FIG. 7 is an illustration for providing an explanation of a sending endpoint and a receiving endpoint negotiating a playback of a media stream. In particular, FIG. 7 shows how the sending endpoint 101 and the receiving endpoint 102 of FIG. 1 negotiate a playback of a media stream over multiple interfaces 105a and 105b to 108a to 108b connecting the sending endpoint 101 and the receiving endpoint 102 to multiple networks 111 to 114 using a session initiation and control protocol such as RTSP. FIGS. 8 to 15 describe this behavior of the sending endpoint 101 and the receiving endpoint 102, using UML sequence diagrams. FIG. 7 describes the behavior at a top level in order to better understand the behavior from an overall system viewpoint. Each of the sending endpoint and the receiving endpoint has multiple physical interfaces (105a and b, 106a and b, 107a and b and 108a and b of FIG. 1), each for interfacing to a respective one of the multiple networks. The architecture for controlling the streaming of data is implemented on both the sending endpoint 101 and the receiving endpoint 102.

As shown in FIG. 7, each of sending endpoint 101 and receiving endpoint 102 are connected to multiple physical interfaces 105a to 108a and 105b to 108b, respectively, which connect the endpoints through multiple networks 111 to 114, as similarly shown in FIG. 5. Also similar to the structure in FIG. 5, each of the sending endpoint 101 and the receiving endpoint 102 includes an architecture for controlling the streaming of data over the multiple physical interfaces 105a to 108a and 105b to 108b, the architectures including components such as the software libraries 232 and 332 and traffic monitors 234 and 334.

In FIG. 7, the traffic monitors 234 and 334 on the sending endpoint 101 and receiving endpoint 102, respectively, periodically record the current status of the multiple physical interfaces 105a and 105b to 108a and 108b, monitoring such statistics as the number of dropped packets since the last observation, the number of packets received in error, and the number of collisions observed on this interface (700). If possible, knowledge of the link rate (capacity) and bandwidth consumed by observed traffic are used to calculate available bandwidth remaining for each of the physical interfaces. Known device profiles (i.e., combinations of available interfaces into logical and bondable virtual interfaces) are used to create a list of paths, in preferred order, using criteria such as, for example, available bandwidth, latency, observed or expected congestion, or perhaps all three. This list is used to negotiate the desired set of interfaces, which forms the bondable virtual interfaces 236 and 336, to use when playing back a media stream.

Assuming that the receiving endpoint 102 already has the correct URL for a data stream, the receiving endpoint 102 contacts the sending endpoint 101 to initiate playback of that URL. This playback request is accompanied by a list of preferred profiles to use for playback, as obtained from the traffic monitor 334 of the receiving endpoint 102 (701).

The sending endpoint 101 receives the playback request and the profile list, and uses its traffic monitor 234 to generate a sending side list of preferred profiles. The sending endpoint compares the profile lists looking for a good match, and communicates the chosen profile back to the receiving endpoint 102 (702).

The receiving endpoint 102 confirms (agrees) which paths are to be used, and requests the software library 332 instantiate the data combiner 338 with which to receive and reconstruct the expected media sub-streams (703). The sending endpoint 101 then receives the confirmation, and requests to have the software library 232 instantiate the data splitter 238 to handle the stream. Splitting and sending of the sub-streams over the multiple physical interfaces 105a and 105b to 108a and 108b then commences. In particular, the data splitter 238 splits the single data stream from the server application 501 into sub-streams via the bondable virtual interfaces 236 and 336 (704).

The data combiner then receives and reconstructs the stream, and passes it along to a player application for consumption on the sending endpoint (705). The data combiner 338 and/or the player application 502 generates feedback information, and sends it to the data splitter 238 in the sending endpoint 102 (706).

After playback is complete (signaled, perhaps, by an RTSP teardown command), the architectures on either side of the connection shutdown the connections and the associated data splitter 238 and the data combiner 338. The traffic monitors 234 and 334 continue to run periodically to update network statistics for a next data transfer.

Startup Sequence for Receiving Endpoint

Figure 8:
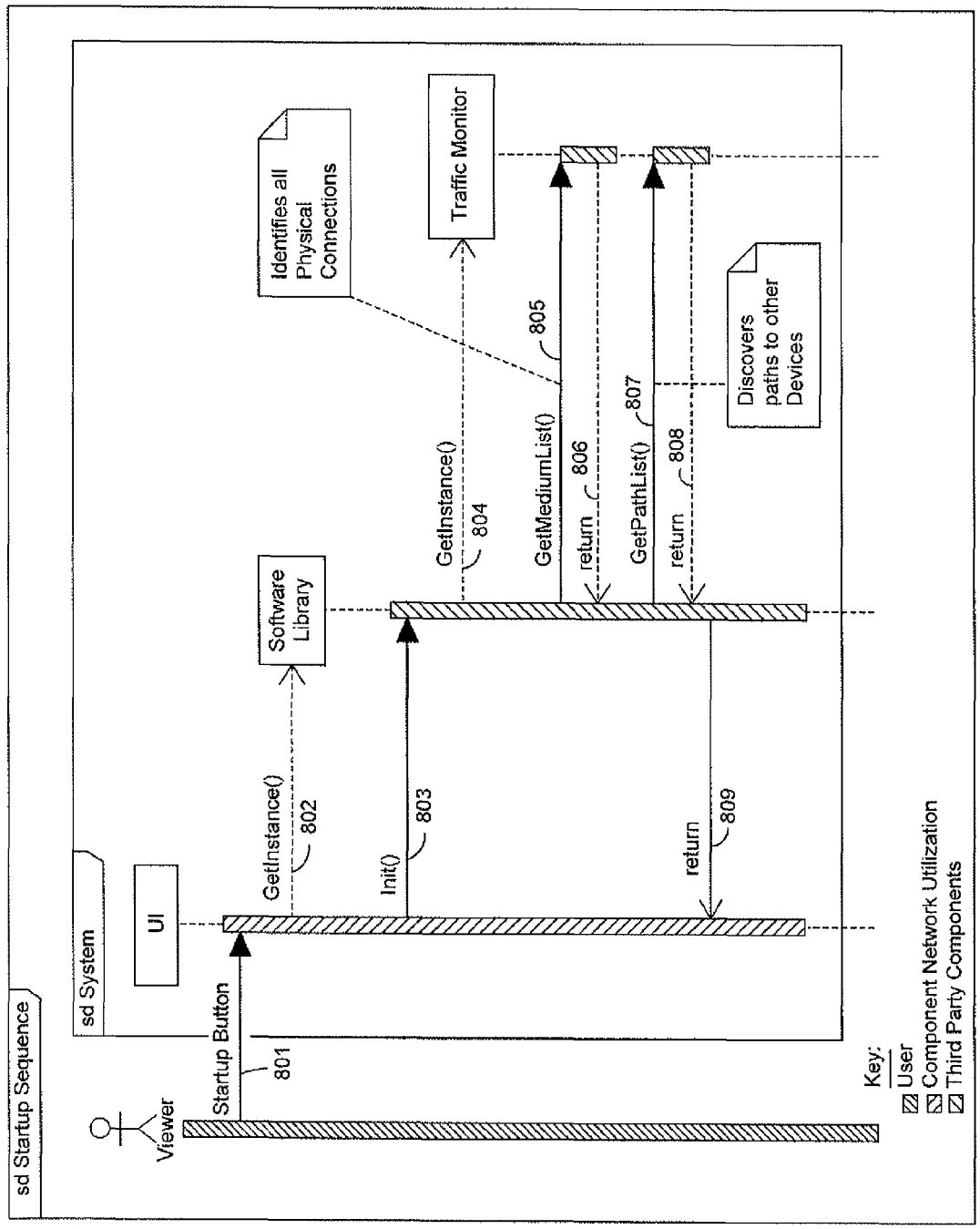
FIG. 8 shows a startup sequence diagram for the architecture on a receiving endpoint according to an example embodiment.

FIG. 8 shows a startup sequence diagram for the architecture on a receiving endpoint according to an example embodiment. As shown in FIG. 8, when a user powers-on a receiving endpoint, such as a set top box (STP) device, an application program such as application program 330 of FIG. 3 may start the architecture in the receiving endpoint 102 of FIG. 1. A set top box device is a hardware device that receives large media streams from a server, or in some cases sends large streams of data to a storage device (e.g., in the transferring of a video stream to be stored on a media server). The application program will get a handle to the architecture and call the init function. In the init function the software library will get a handle to the traffic monitor, and the software library will obtain information about the physical interfaces and the network paths.

More specifically, a user starts up the receiving endpoint 102 device, and a power-on sequence calls a start-up (801). Next, the application program calls the software library to obtain a reference (802), and uses the reference to call the init function (803). The software library then calls the traffic monitor to obtain a reference (804), and calls GetMediumList to obtain a list of the physical interfaces (805). The traffic monitor then returns the list of physical interfaces to the software library (806). The software library then calls a GetPathList( ) which discovers different paths to other devices (807). The traffic monitor then returns a list of the discovered paths to the software library (808), and the status of the init is returned to the application program (809).

Startup Sequence for Sending Endpoint

Figure 9:
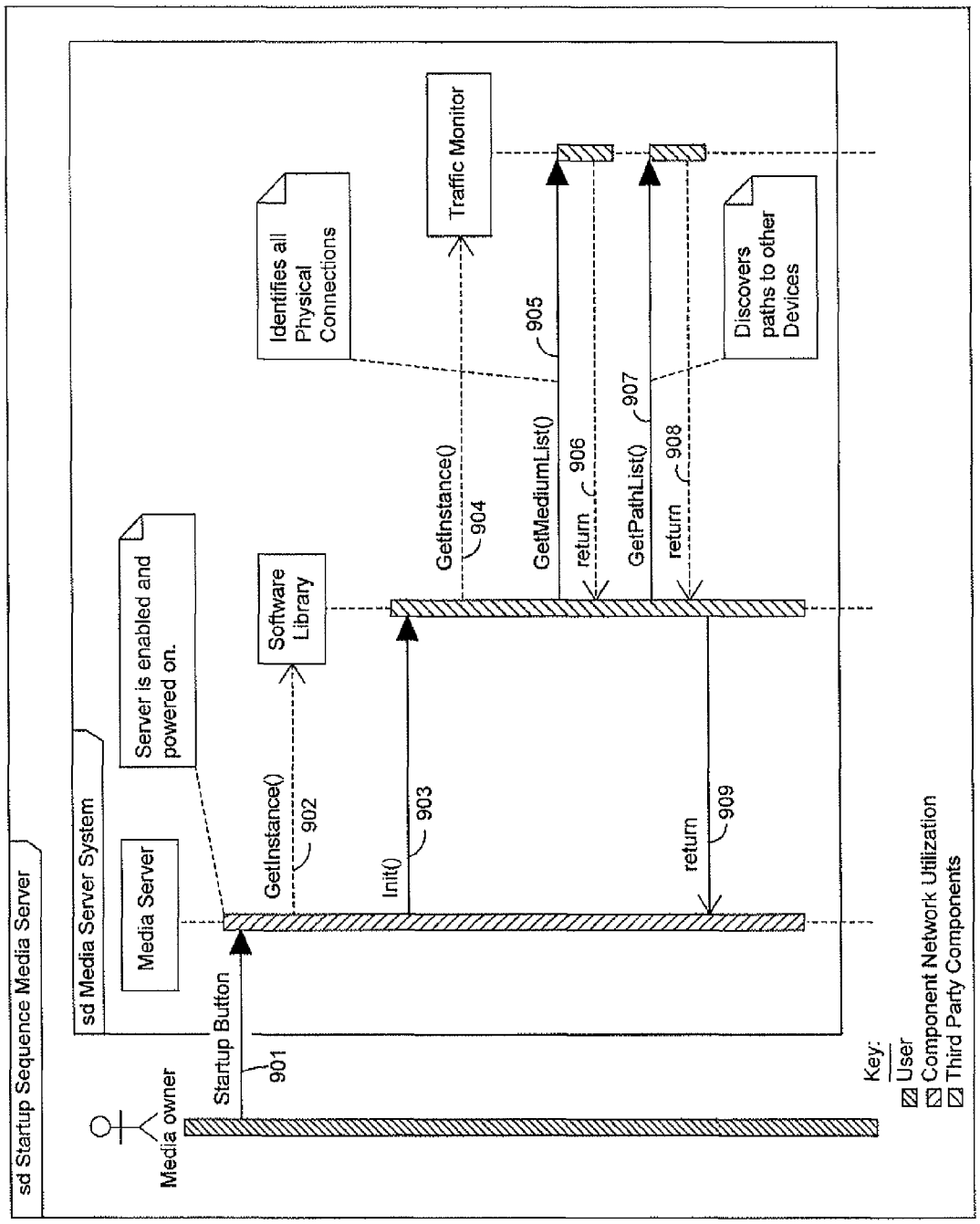
FIG. 9 shows a startup sequence diagram for a sending endpoint according to an example embodiment.

FIG. 9 shows a startup sequence diagram for a sending endpoint according to an example embodiment. As shown in FIG. 9, when a user starts the sending endpoint 101 of FIG. 1, an application program such as application program 230 of FIG. 2 will start the architecture in the sending endpoint 101. The application program will get a handle to the architecture and call the init function. In the init function, the software library will get a handle to the traffic monitor. The software library will then obtain information about the physical interfaces and the network paths.

More specifically, a user starts up the sending endpoint 101 device, and a power-on sequence calls a start-up (901). Next, the application program calls the software library to obtain a reference (902), and uses the reference to call the init function (903). The software library then calls the traffic monitor to obtain a reference (904), and calls GetMediumList to obtain a list of the physical interfaces (905). The traffic monitor then returns the list of physical interfaces to the software library (906). The software library then calls a GetPathList( ) which discovers different paths to other devices (907). The traffic monitor then returns a list of the discovered paths to the software (908), and the status of the init is returned to the application program (909).

With respect to FIGS. 8 and 9, the traffic monitors gather information from all the physical interfaces (e.g., bandwidth utilization), during initialization and periodically thereafter.

Shutdown Sequence

Figure 10:
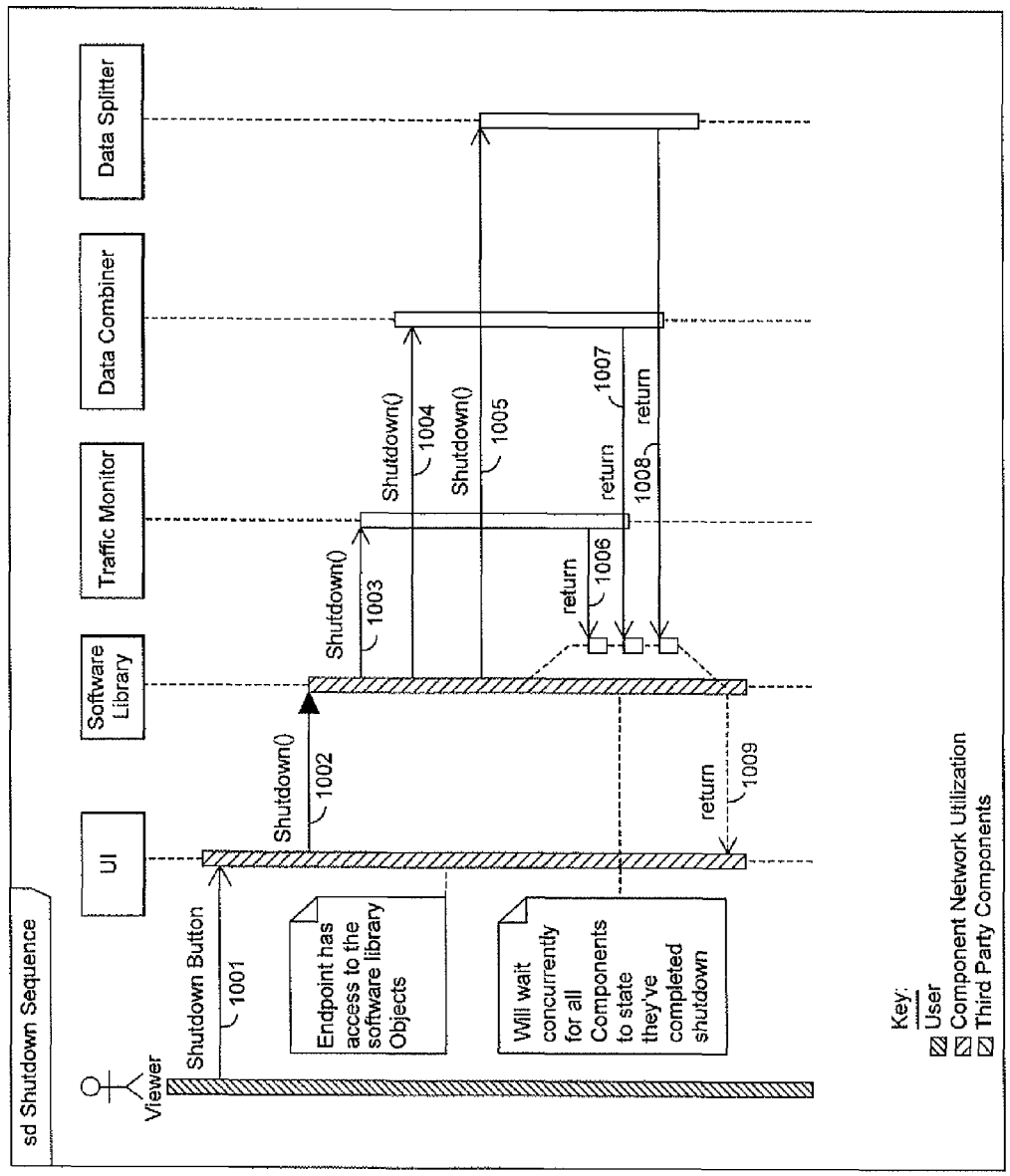
FIG. 10 shows a shutdown sequence diagram according to an example embodiment.

FIG. 10 shows a shutdown sequence diagram according to an example embodiment. As shown in FIG. 10, the application program, such as application program 230 or 330, which has a handle to the architecture can call the shutdown mechanism. The software library will call all of the components' (i.e., the traffic monitor's, the data combiner's or data splitter's) shutdown method. The software library will wait until all of the components return an OK before shutting down the architecture.

More specifically, a user initiates a quit (1001), and the application program calls a software library shutdown function (1002). Moreover, an asynchronous shutdown is sent to the traffic monitor (1003), an asynchronous shutdown is sent to the data combiner (1004), and/or an asynchronous shutdown is sent to the data splitter (the data splitter could have been invoked when the application sent data to a storage server) (1005). These asynchronously sent messages allow the software library to continue running. Next, the traffic monitor sends a return status to the software library (1006). This return is sent to the software library, where the software library is waiting for all the components to return their shutdown status. Then, the data combiner sends a return status to the software library (1007), and the data splitter sends a return status to the software library (1008). A status of the software library shutdown object is then returned to the application program (1009).

Retrieve Media List

Figure 11:
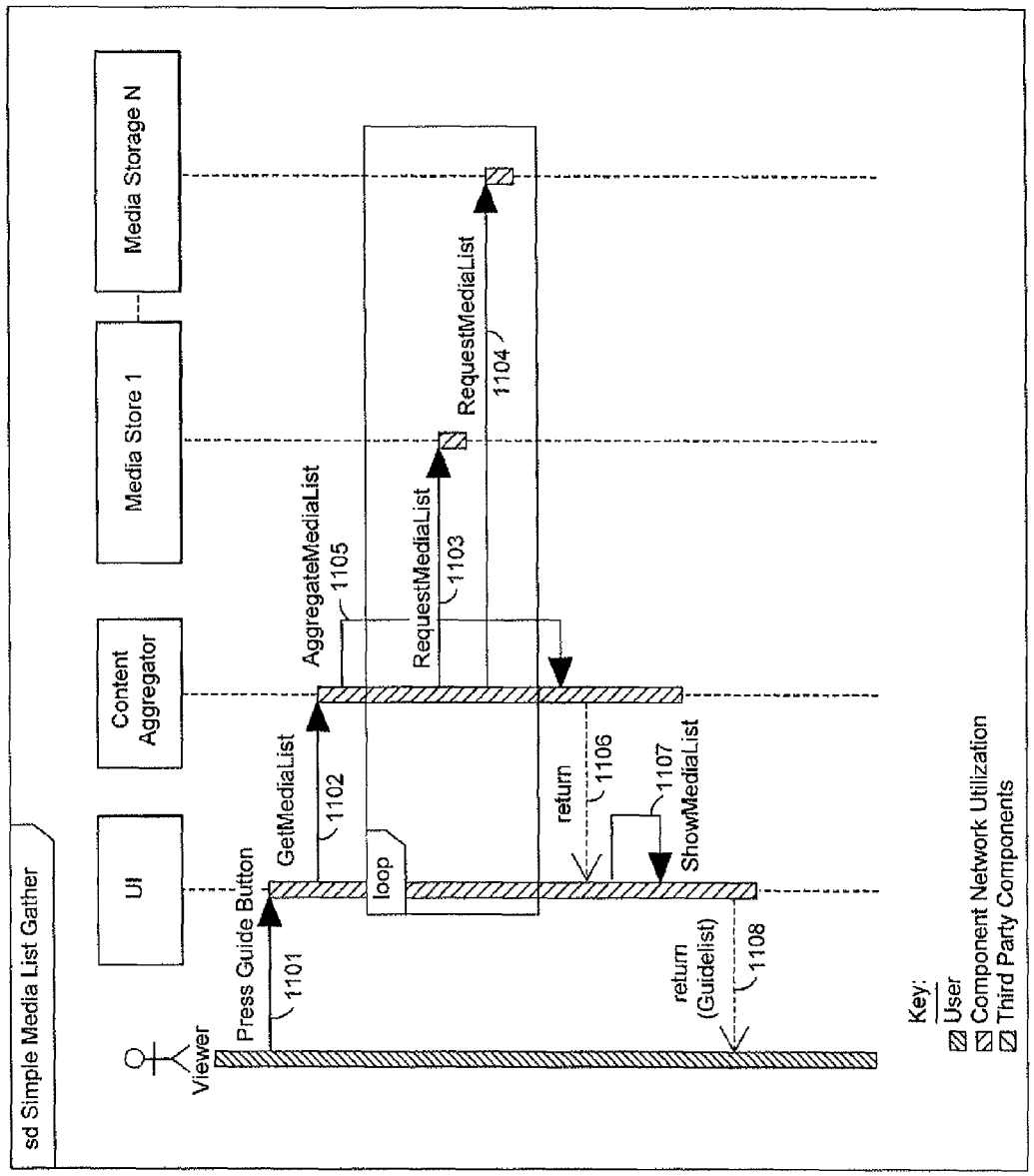
FIG. 11 shows a sequence diagram for gathering a list of media according to an example embodiment.

FIG. 11 shows a sequence diagram for gathering a list of media according to an example embodiment. This sequence diagram depicts a request for a movie or a media list from a content aggregator, which may include components not shown in FIG. 11. As shown in FIG. 11, a user presses a list button (e.g., a guide button), which is then sent to a user interface (UI) on a STB (1101). The UI then sends an appropriate message to a content aggregator (1102). The content aggregator then retrieves the media content by calling pertinent media stores for information (1103). The content aggregator calls more than one media store (for example, an N number of media stores), so as to obtain an extensive list of media content (1104). The aggregated list is then formed and returned to the STB's UI (1105). The STB UI processes the media list (1106), and the STB UI displays the media list (1107). The list is then returned to the software library (1108).

Streaming a Video

FIG. 12 shows a sequence diagram for streaming a video according to an example embodiment. The sequence diagram of FIG. 12 will be described in five sections, namely: (i) startup, (ii) setup, (iii) command, (iv) stream, and (v) teardown.

(i) Startup

Figure 12A:
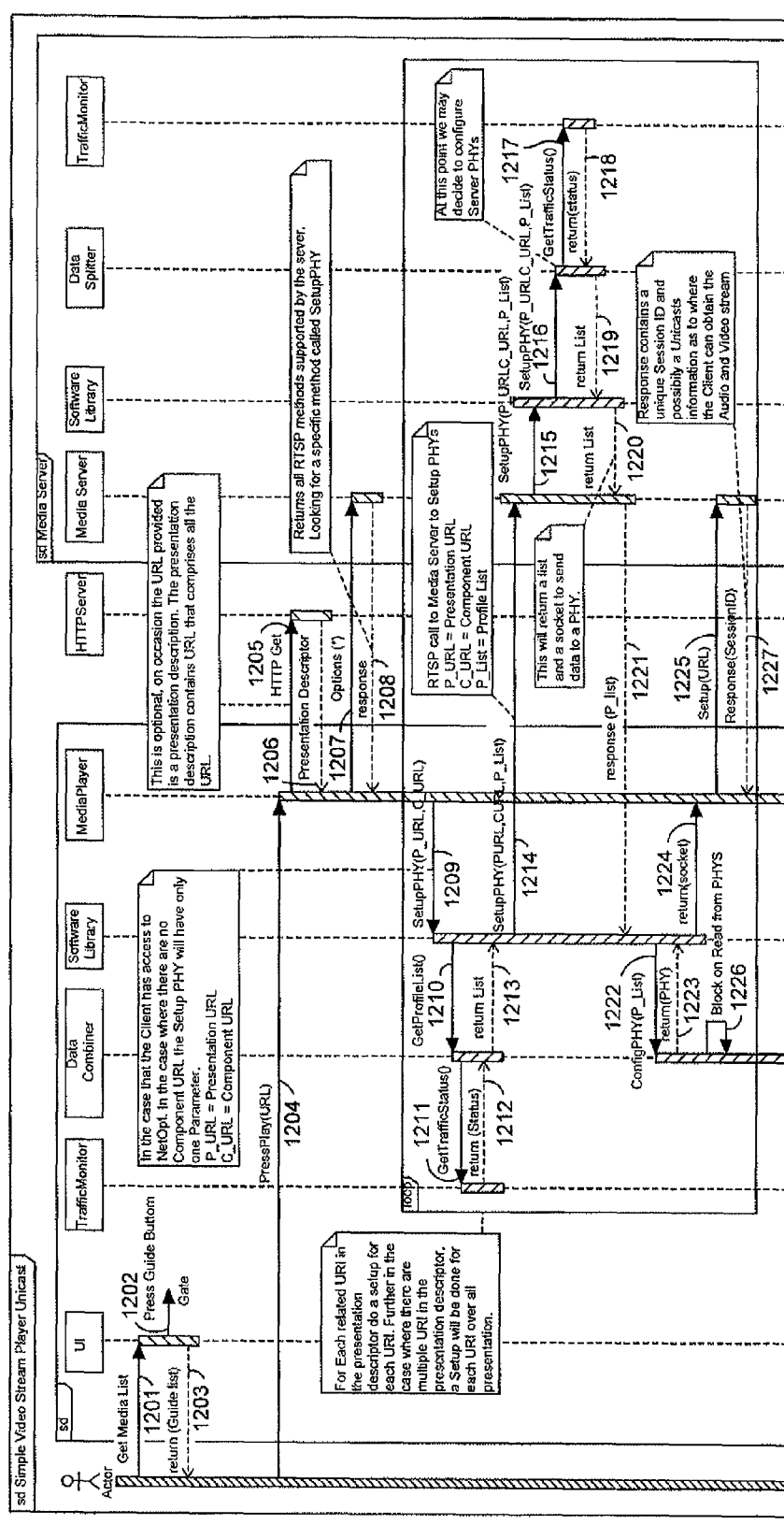
FIG. 12 shows a sequence diagram for streaming a video according to an example embodiment.

As shown in FIG. 12A, a user presses a list button to obtain a media list, as described-above in more detail in connection with FIG. 11 (steps 1201 to 1203). The user selects a URL to play, and the receiving endpoint 102 is given the selected URL to play (1204). If the URL is a presentation descriptor, the receiving endpoint 102 asks another application for the information (e.g., an HTTP and RTSP server) (1205)(1206). The receiving endpoint 102 then sends, for example, a standard RTSP OPTIONS command to the sending endpoint 101 (1207). The OPTIONS command returns a list, for example, of RTSP methods available (which contains a Software Library RTSP extension command called "SetupPHY") (1208).

(ii) Setup

As shown in FIG. 12A, the receiving endpoint 102 calls the software library SetupPHY( ) method (1209), and the software library calls the GetProfileList( ) method of the data combiner (1210). During the process of getting the ProfileList, the data combiner calls the traffic monitor to GetTrafficStatus( ) (1211). The traffic monitor then returns the physical interface status in the form of a list (1212). The ProfileList may be a list of bondable virtual interfaces, and the list of bondable virtual interfaces may be in order of preference. On the other hand, the ProfileList may be a list of physical interfaces. The resulting ProfileList is then returned to the software library (1213). The software library makes a direct RTSP call to the sending endpoint 101, sending the list (1214). The sending endpoint 101 then calls the software library's SetupPHY( ) method, passing the list (1215), and calls the GetProfileList( ) method of the data splitter (1216). During the process of getting the ProfileList, the data splitter calls the traffic monitor to GetTrafficStatus( ) (1217). The traffic monitor then returns the physical interface status in the form of a list (1218). The ProfileList may be a list of bondable virtual interfaces, and the list of bondable virtual interfaces may be in order of preference. On the other hand, the ProfileList may be a list of physical interfaces. The resulting ProfileList is then returned to the software library (1219). The actual physical interfaces to be used for the data transfer are returned to the sending endpoint 101, which includes the list of sockets to be used to send the multiple substreams, and a single socket that will be used by the sending endpoint 101 to send the stream (1220). The single socket is an application channel 240. The sending endpoint 101 then responds to the RTSP call from step 1214, passing the actual connection information to be used (1221). This information is then passed to the ConfigurePHY( ) method of the data combiner, and used to create the socket that will be used to receive the data stream (1222). The sockets are then returned to the software library (1223), and then returned to the sending endpoint 101 (1224).

(iii) Command

Figure 12B:
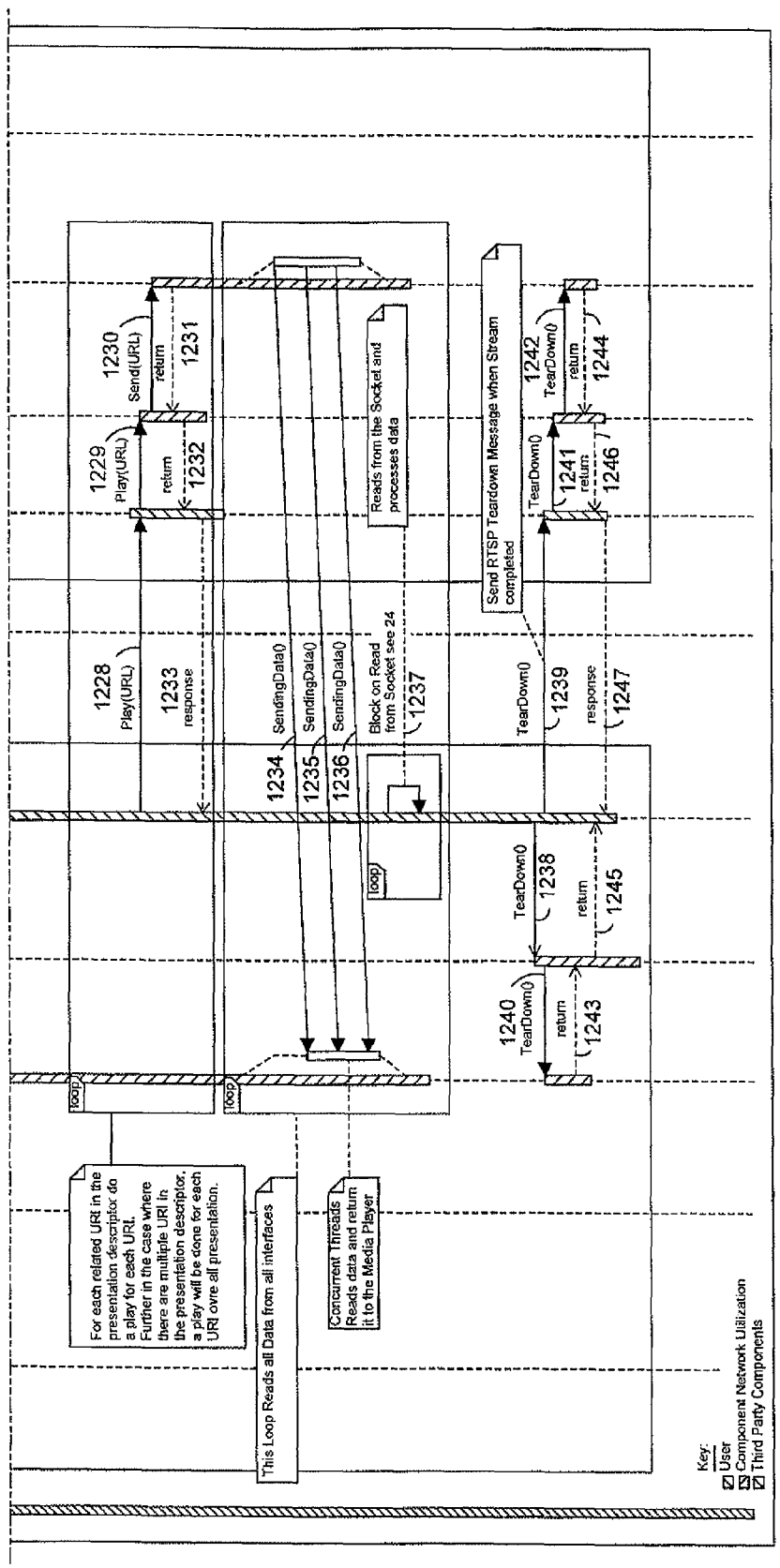

As shown in FIG. 12A, an RTSP setup command is sent to the sending endpoint 101 to the receiving endpoint 102 (1225). Meanwhile, the data combiner is blocked, waiting for data (1226). The setup response is then returned, along with a unique SessionID (1227). As shown in FIG. 12B, the RTSP play command is then sent, using the unique SessionID (1228). The sending endpoint 101 calls the software library Play( ) method to begin playback of the data stream (1229). The software library then calls the data splitter's Send( ) method (1230 and 1231). The software library play method then completes (1233), and the sending endpoint 101 responds to the RTSP play command (1233). If there is more than one stream to be played (e.g., a separate audio and video stream), then steps 1225 to 1233 are executed for each stream.

(iv) Stream

As shown in FIG. 12B, asynchronous calls are made passing portions of the data using the bondable virtual interface to transfer substreams from the sending endpoint's data splitter object over the multiple networks, to be received by the receiving endpoint's data combiner object (1234 to 1236). The receiving endpoint 102 then blocks, and continues to read from the single socket, which is an application channel 240, provided by the software library from step 1224, with the reconstructed stream (1237).

(v) Teardown

As shown in FIG. 12B, when the receiving endpoint 102 receives the end of the data stream, the receiving endpoint 102 calls the TearDown( ) method asynchronously (1238), and then immediately sends an RTSP teardown command to the sending endpoint 101 (1239). The software library of the receiving endpoint 102 then calls the data combiner's Teardown( ) method, and then waits for a response to the RTSP command (which will occur in step 1247) (1240, 1243 and 1245). The sending endpoint 101 then receives the RTSP teardown command and begins a similar process as used in steps 1240, 1243 and 1245, to tear down the data splitter (1241, 1242, 1244 and 1246).

For special play modes, such as fast-forward and reverse, the sequence diagram is the same as the above-described sequence diagram in FIG. 12, except that in the RTSP call to play, the scale is increased. More specifically, in a normal play mode the scale would be 1, while fast-forwarding would scale to a value greater than 1. In addition, a play mode in reverse would scale to a negative value. For example, a fast-forward of 2× would scale to 2, while a reverse 2× would scale to −2. In addition, special consideration should be given to scenarios where the receiving endpoint has a mass storage container (i.e., allowing for recording), where the data must be streamed in normal play speed (i.e., scale=1), and special play will take place in the streaming from the storage container. However, this special scenario is not the case for this example embodiment.

Whiteboard Conferencing

Figures 13, 13A:
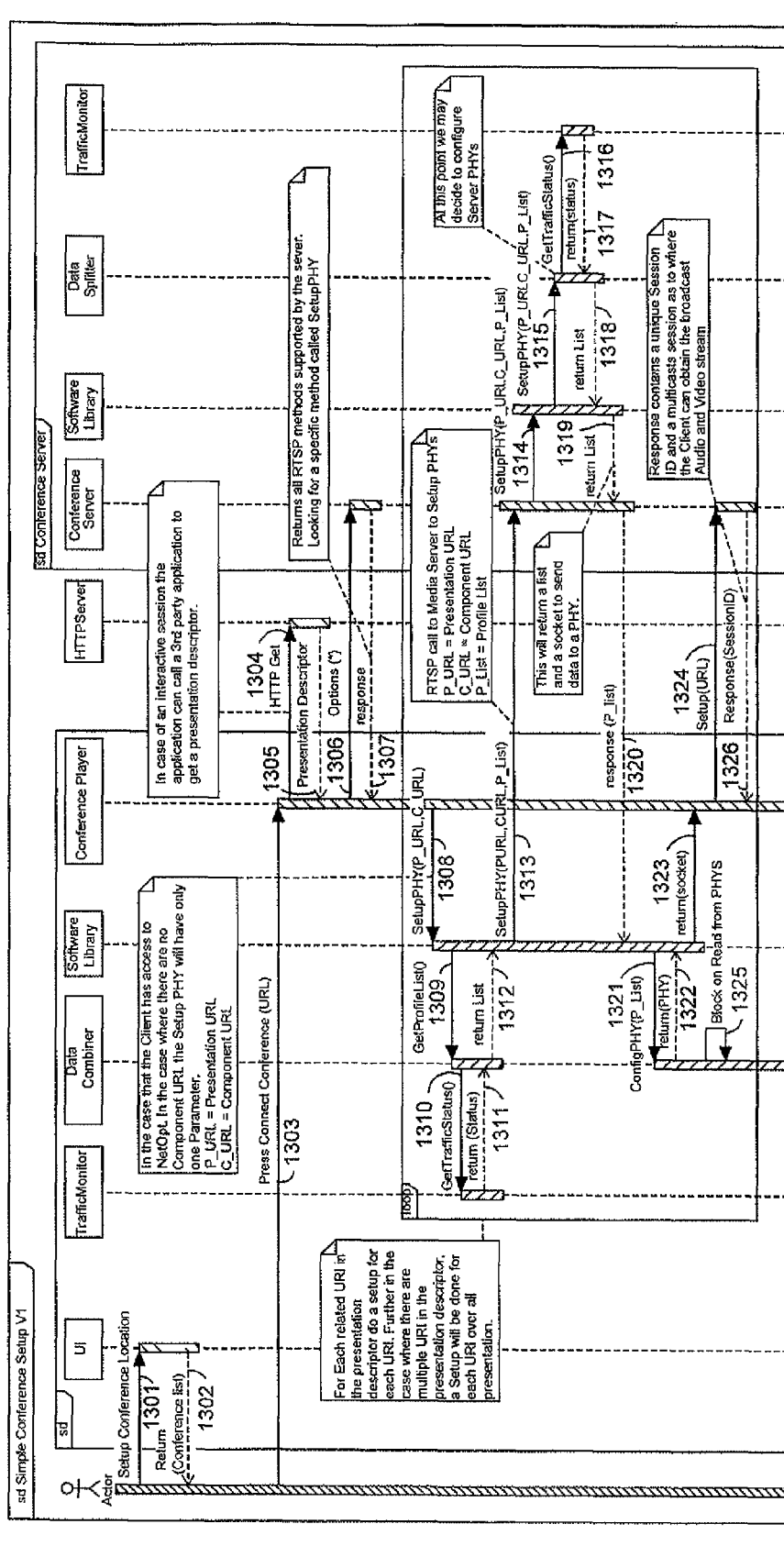
FIG. 13 shows a sequence diagram for streaming a video conference according to an example embodiment.

FIG. 13 shows a sequence diagram for streaming a video conference according to an example embodiment. The sequence diagram of FIG. 13 depicts the interaction of the architecture in a conference scenario. This scenario is similar to the video streaming scenario, except that the data can flow in both directions. This sequence diagram will also be described in five sections, namely: (i) startup, (ii) setup, (iii) command, (iv) stream, and (v) teardown.

(i) Startup

As shown in FIG. 13A, a user calls a setup conference location (1301), and a conference list is then returned to the user (1302). A URL is then given to the receiving endpoint 102 (1303), and the receiving endpoint 102 optionally requests to get a presentation descriptor (1304 and 1305). The receiving endpoint 102 then sends, for example, a standard RTSP OPTIONS command to the sending endpoint 101 (1306). The OPTIONS command returns a list, for example, of RTSP methods available (which will contain a Software Library RTSP extension command called 'SetupPHY') (1307).

(ii) Setup

As shown in FIG. 13A, the receiving endpoint 102 calls the software library SetupPHY( ) method (1308). The software library then calls a GetProfileList( ) method of the data combiner (1309). During the process of getting the ProfileList, the data combiner calls the traffic monitor to GetTrafficStatus( ) (1310). The traffic monitor then returns a status for each of the physical interfaces in the form of a list (1311), and the resulting ProfileList is returned to the software library (1312). The ProfileList may be a list of bondable virtual interfaces, and the list of bondable virtual interfaces may be in order of preference. On the other hand, the ProfileList may be a list of physical interfaces. The software library of the receiving endpoint 102 then makes a direct RTSP call to the sending endpoint 101, sending the list (1313). The sending endpoint 101 then calls its software library's SetupPHY( ) method, passing the list (1314). The software library then calls a GetProfileList( ) method of the data splitter (1315). During the process of getting the ProfileList, the data combiner calls the traffic monitor to GetTrafficStatus( ) (1316). The traffic monitor then returns a status for each of the physical interfaces in the form of a list (1317), and the resulting ProfileList is returned to the software library (1318). The ProfileList may be a list of bondable virtual interfaces, and the list of bondable virtual interfaces may be in order of preference. On the other hand, the ProfileList may be a list of physical interfaces. The actual physical interfaces to be used for the transfer are returned to the sending endpoint 101, which includes the list of sockets to be used to send the multiple substreams, and a single socket that will be used by the sending endpoint 101 to send the data stream (1319). The single socket is an application channel 240. The sending endpoint 101 then responds to the RTSP call from step 1313, passing the actual connection information to be used to the receiving endpoint 102 (1320). This information is then passed to a ConfigurePHY( ) method of the data combiner, and used to create the socket that will be used to receive the data stream (1321). The sockets are then returned to the software library of the receiving endpoint 102 (1322), and then to the receiving endpoint 102 (1323).

(iii) Command

Figure 13B:
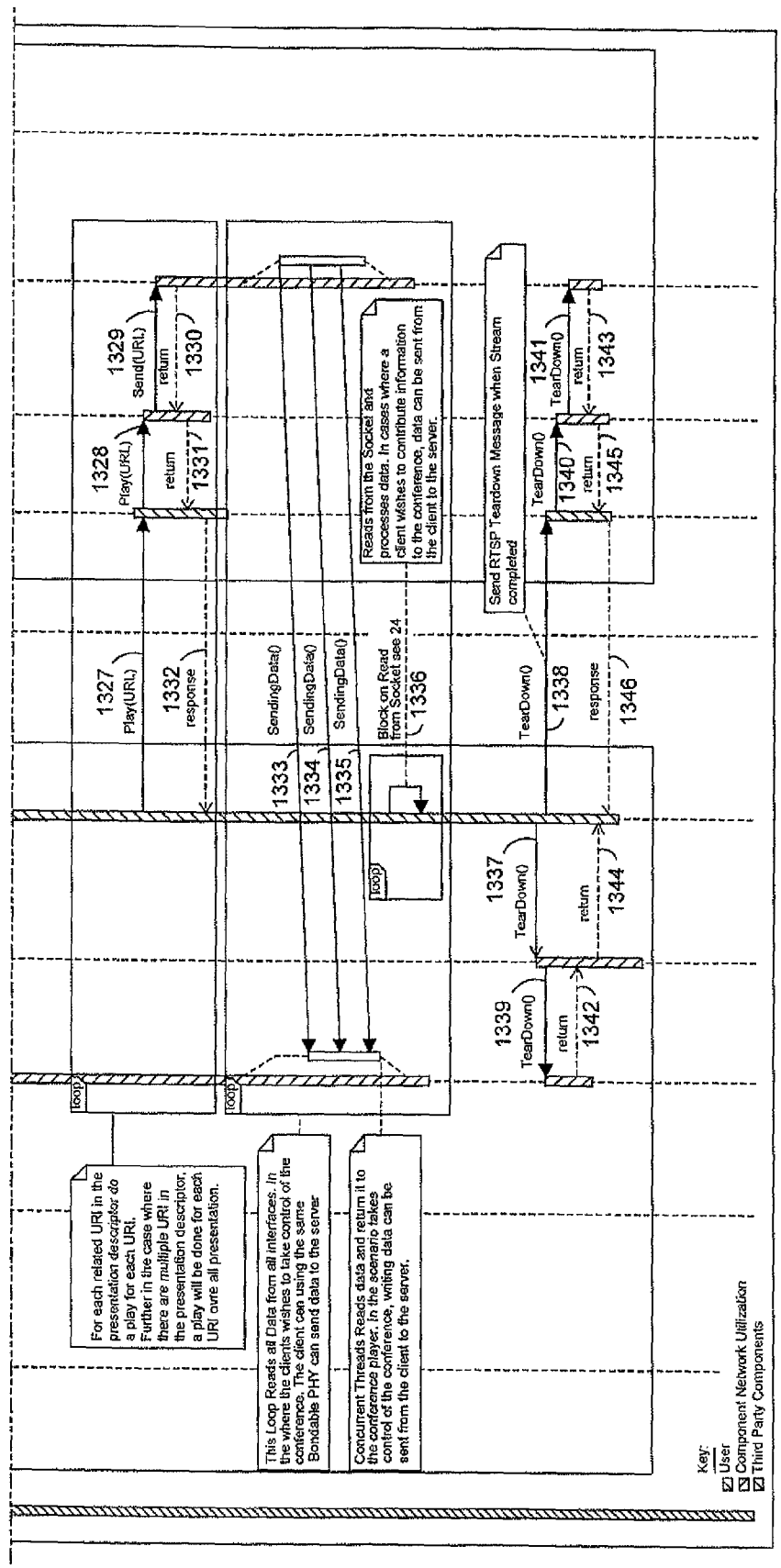

As shown in FIG. 13A, an RTSP setup command is then sent to the sending endpoint 101 (1324). Meanwhile, the data combiner is blocked, waiting for data (1325). The setup response is then returned, along with a unique SessionID (1326). As shown in FIG. 13B, the RTSP command is then sent to the sending endpoint 101, using the unique SessionID from step 1326 (1327). The sending endpoint 101 then calls a software library Play( ) method to begin playback of the data stream (1328). The software library of the sending endpoint 101 then calls the data splitter's Send( ) method (1329 and 1330). The software library Play( ) method then completes (1331), and the sending endpoint 101 responds to the RTSP play command (1332). If there is more than one stream to be played (e.g., separate audio and video streams), then steps 1324 to 1332 are then executed for each stream.

(iv) Stream

As shown in FIG. 13B, asynchronous calls are made passing portions of the data using the bondable virtual interface to transfer substreams from the sending endpoint's data splitter object over the one or more networks, to be received by the receiving endpoint's data combiner object (1333 to 1335). The sending endpoint 102 blocks, and continues to read from the single socket provided by the software library (from step 1323), with the reconstructed stream (1336).

(v) Teardown

As shown in FIG. 13B, when the receiving endpoint 102 receives the end of the data stream, the receiving endpoint calls a TearDown( ) method asynchronously, and then immediately sends an RTSP teardown command to the sending endpoint 101 (1338). The software library on the receiving endpoint 102 calls the data combiner's TearDown( ) method, and then waits for the response to the RTSP command (which will occur in step 1346) (1339, 1342 and 1344). The sending endpoint 101 then receives the RTSP teardown command and begins a similar process as used in steps 1339, 1342 and 1344, to tear down the data splitter (1340, 1341, 1343 and 1345).

In general, the entire process of FIG. 13 may occur simultaneously in the opposite direction. In other words, the process of FIG. 13 may occur in the direction from the sending endpoint to the receiving endpoint, and may also occur simultaneously in the direction from the receiving endpoint. In addition, in the process of FIG. 13, the sending endpoint and the receiving endpoint may trade roles. For example, if a viewer on a receiving endpoint takes control of a conferencing session, the software library can be used to stream inputs from this viewer (now the sending endpoint) to the receiving endpoint.

Archival Data Transfer

Figures 14, 14A, 14B:
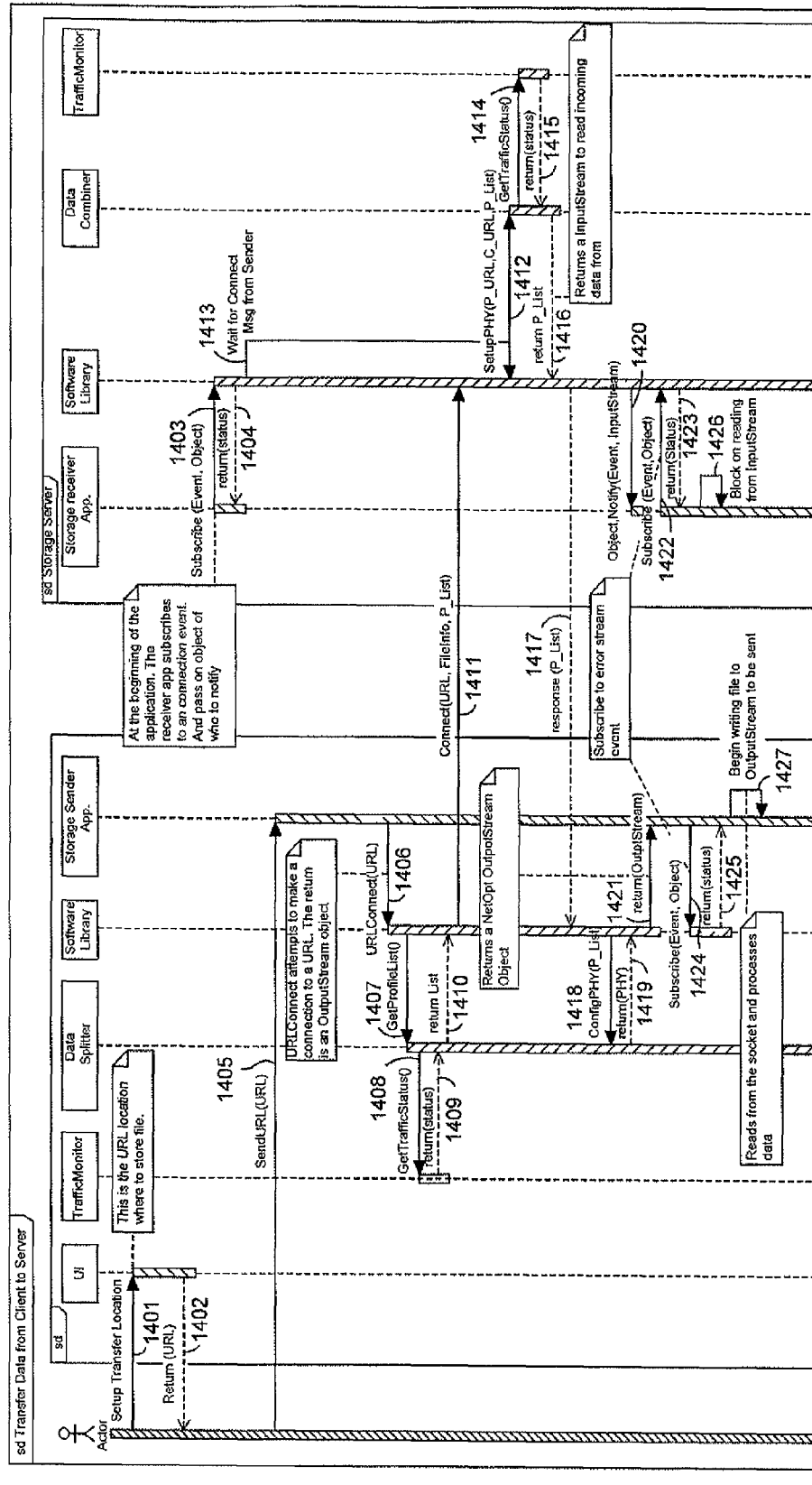
FIG. 14 shows a sequence diagram for streaming a data file transfer according to an example embodiment.
Figure 14B:
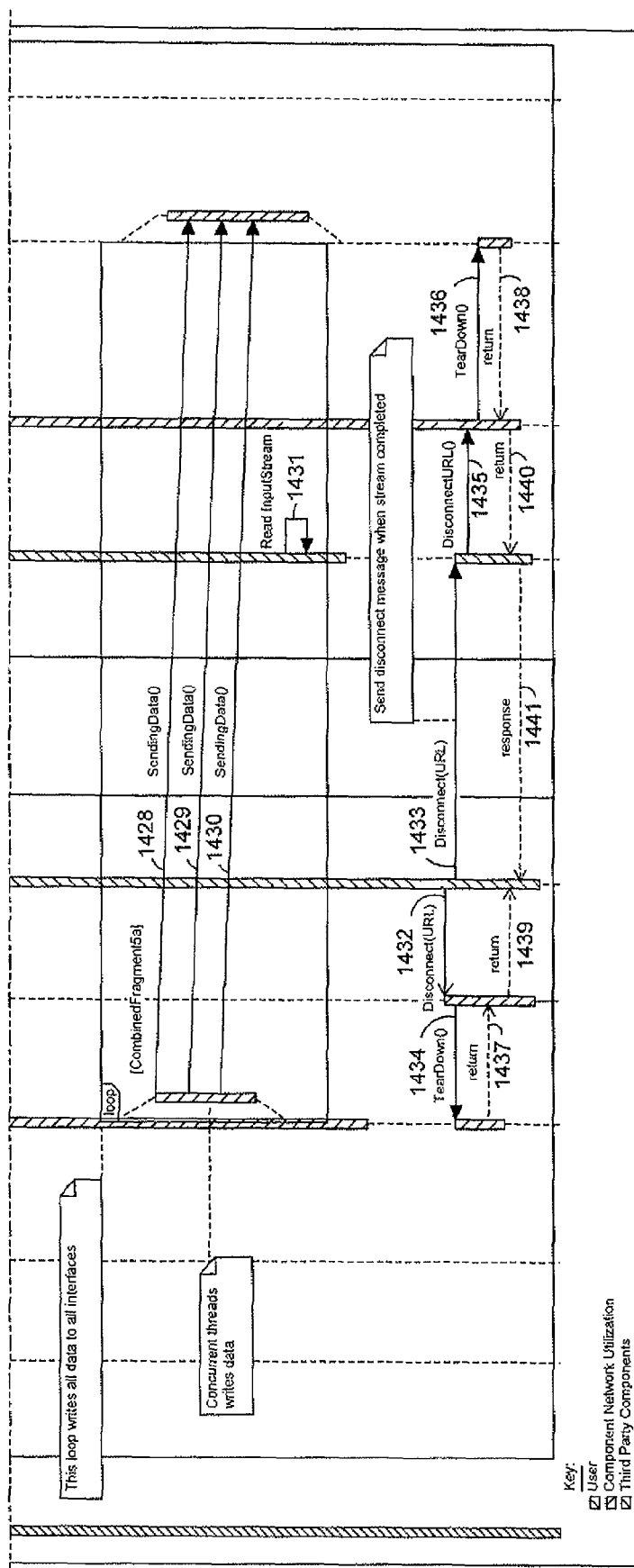

FIG. 14 shows a sequence diagram for streaming a data file transfer according to an example embodiment. In FIG. 14, a transfer data sequence diagram is depicted to show the interaction between the architecture components when an application wishes to transfer an amount of data to be stored on a server. For this sequence, the paradigm that is used is one of a simple URL connection, in which the inner working of the connection is similar to basic media streaming. However, instead of using a socket to communicate between the two endpoints, an input and an output stream will be used. Although the implementation of an input or output stream can be achieved via a socket, the foregoing interface is used to ensure that data flows from the sending application to the receiving server storage. This sequence diagram will be described in four sections, namely: (i) startup, (ii) connection, (iii) transfer, and (iv) disconnect.

(i) Startup

As shown in FIG. 14A, the application retrieves a URL identifying where to store the data to be transferred (1401 and 1402). The receiving endpoint 102 sustains a subscription to a connection event (1403 and 1404), and waits for an incoming connection, such as a sending endpoint connecting and sending a file (1413).

(ii) Connection

As shown in FIG. 14A, the URL is sent to the sending endpoint 101 (1405), and the sending endpoint 101 calls its software library's URLConnect( ) method (1406). The software library then calls the GetProfileList( ) method of the data splitter (1407). During the process of getting the ProfileList, the data splitter calls the traffic monitor to GetTrafficStatus( ) (1408), and the traffic monitor returns status of the physical interfaces in the form of a list (1409). The ProfileList may be a list of bondable virtual interfaces, and the list of bondable virtual interfaces may be in order of preference. On the other hand, the ProfileList may be a list of physical interfaces. The resulting ProfileList is then returned to the software library of the sending endpoint 101 (1410). The sending endpoint 101 then makes a ConnectURL call over the one or more networks to the software library of the receiving endpoint (1411). The software library then calls the GetProfileList( ) method of the data combiner (1412). During the process of getting the ProfileList, the data combiner calls the traffic monitor to GetTrafficStatus( ) (1414), and the traffic monitor returns status of the physical interfaces in the form of a list (1415). The ProfileList may be a list of bondable virtual interfaces, and the list of bondable virtual interfaces may be in order of preference. On the other hand, the ProfileList may be a list of physical interfaces. An InputStream to read incoming data is then returned to the software library of the receiving endpoint 102 (1416). Next, the receiving endpoint 102 responds to the ConnectURL call from step 1411 (1417). This information is then passed to the ConfigurePHY( ) method of the data splitter, and used to create the socket that will be used to send the data stream (1418). An OutputStream is then returned to the software library of the sending endpoint 101 (1419), and then to the sending endpoint 101 (1421). The software library of the receiving endpoint 102 then notifies the receiving endpoint 102, which is waiting (from step 1413), that a connection has been made (1420). The receiving endpoint 102 then subscribes for an error stream, to be notified of any errors encountered during reception (1422 and 1423). Likewise, the sending endpoint 101 subscribes to an error stream, to be notified of any errors encountered while sending data (1424 and 1425). The receiving endpoint 102 then blocks, waiting for data (1426).

(iii) Transfer

As shown in FIG. 14B, the sending endpoint 101 begins sending data on the output stream (1427). Asynchronous calls are made passing portions of the data using the bondable virtual interfaces to transfer substreams from the sending endpoint's data splitter object over the one or more networks, to be received by the receiving endpoint's data combiner object (1430). The receiving endpoint 102 then blocks, and continues to read the reconstructed data stream from the single input stream (1431).

(iv) Disconnect

As shown in FIG. 14B, when the sending endpoint 101 reaches the end of the data stream, the sending endpoint 101 calls a DisconnectURL( ) method asynchronously (1432), and then immediately sends a Disconnect( ) command to the receiving endpoint 102 (1433). The software library of the sending endpoint 101 calls the data splitter's TearDown( ) method, and then waits for the response to the Disconnect( ) command (which will occur in step 1441) (1432, 1434, 1437 and 1439). The receiving endpoint 102 then receives the DisconnectURL command and begins a similar process as used in steps 1432, 1434, 1437 and 1439, to tear down the data combiner (1435, 1436, 1438 and 1440).

Feedback Mechanism

Figure 15:
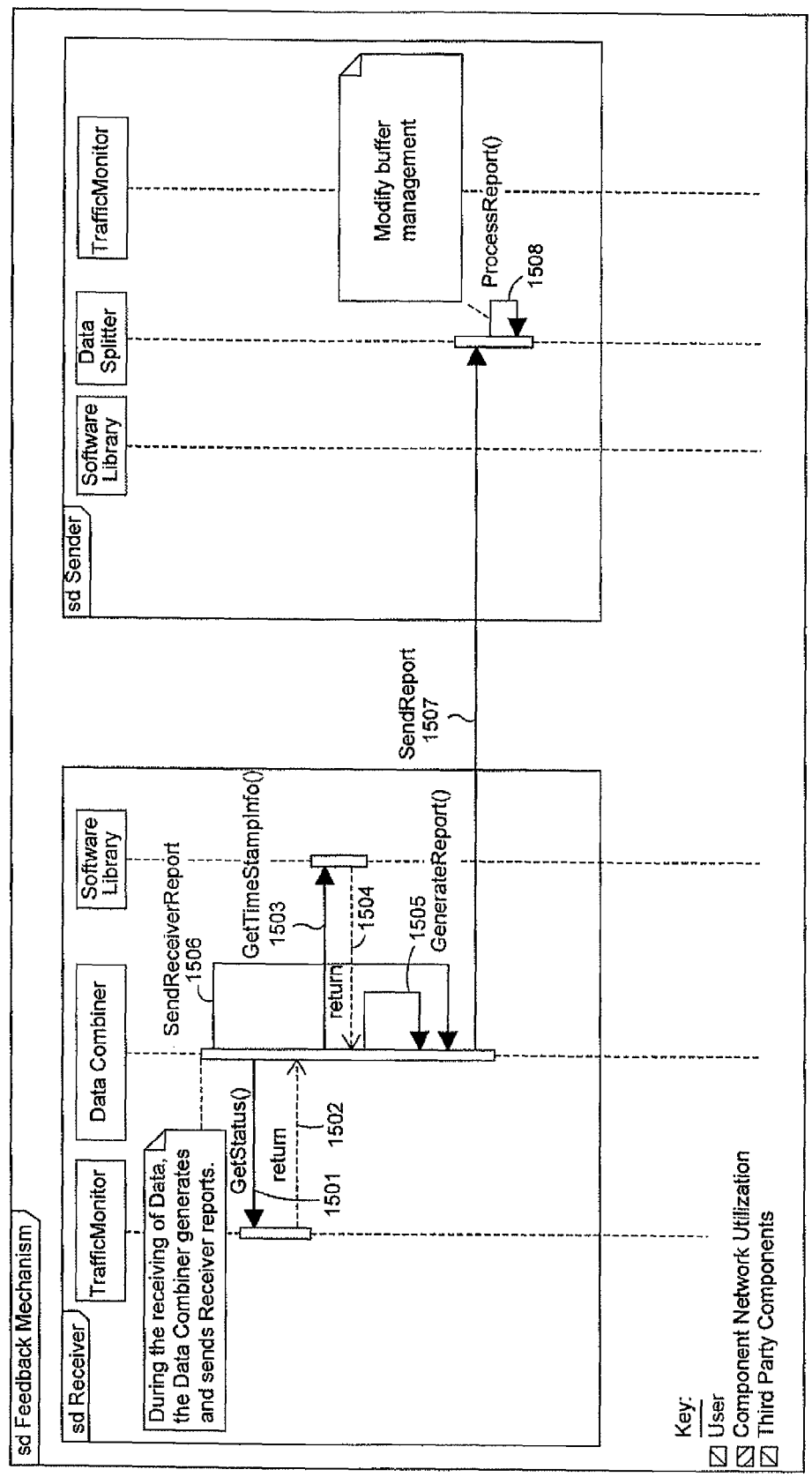
FIG. 15 shows a sequence diagram for a feedback mechanism according to an example embodiment.

FIG. 15 shows a sequence diagram for a feedback mechanism according to an example embodiment. In this sequence diagram, a basic feedback mechanism is depicted which is used by the data combiner to provide information to the data splitter. The information provided to the data splitter is used to modify the buffer management of both the data splitter and the data combiner. Furthermore, the feedback data is unidirectional and is sent from the data combiner to the data splitter. A modified RTCP-like protocol may be used to send data reports.

As shown in FIG. 15, during normal intervals and processing, events may trigger the data combiner to generate a new report. The data combiner then calls the GetStatus from the traffic monitor (1501), and the status is returned to the data combiner (1502). The data combiner then calls the software library of the receiving endpoint 102 for a GetTimeStampInfo from the software library used in creating the report (1503), and the information is returned to the data combiner (1504). A report is then created by the data combiner (1505), and sent directly to the data splitter of the sending endpoint 101 (1506 and 1507). The report is then processed and an update is made to the buffer management of the data splitter (1508).

Figure 16:
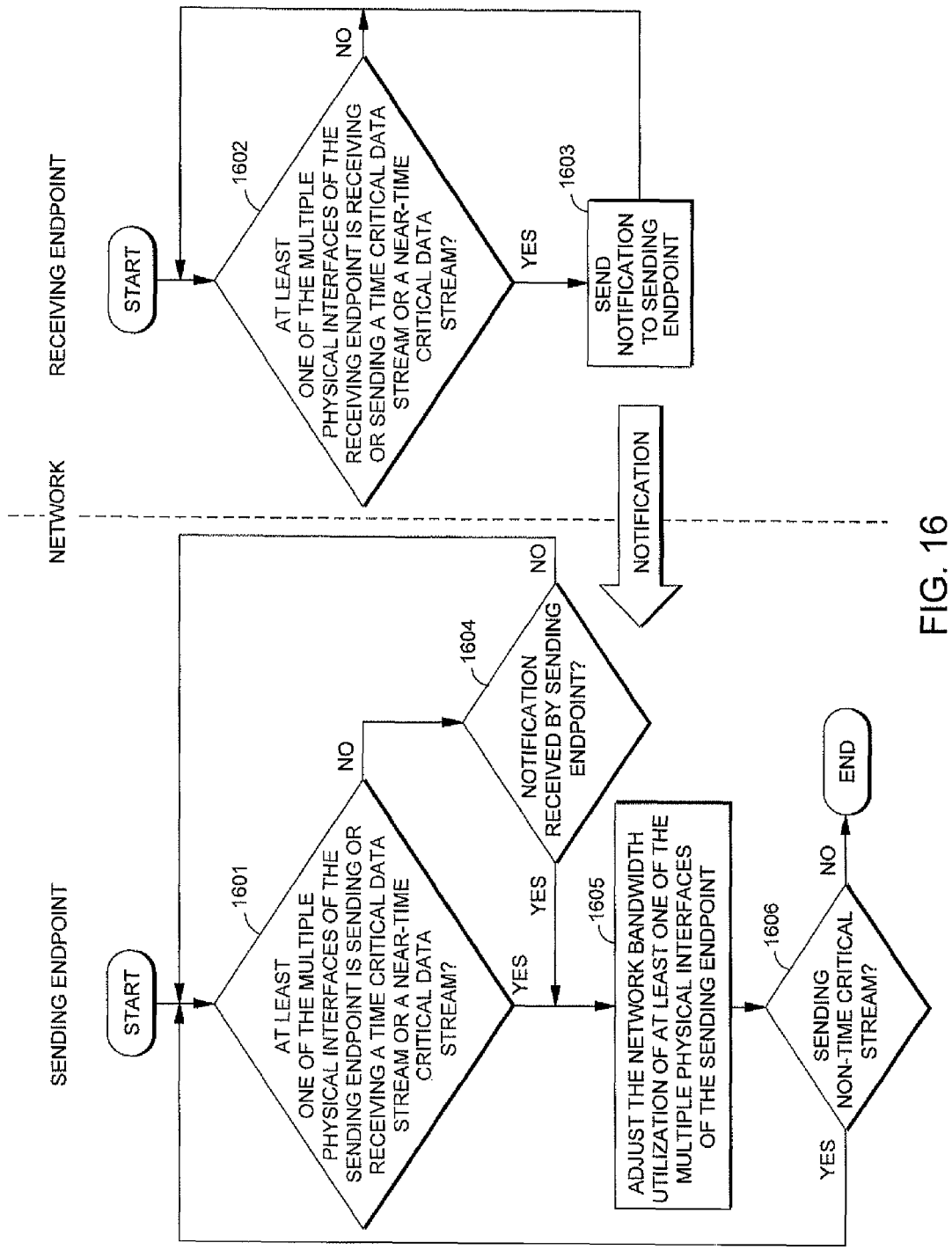
FIG. 16 is a flow chart for providing a detailed explanation of another example embodiment.

Efficient Bandwidth Utilization When Streaming Data Over Multiple Network Interfaces FIG. 16 is a flowchart for providing a detailed explanation of another example embodiment. More specifically, FIG. 16 depicts a flowchart for providing a detailed explanation of an example embodiment for adjusting utilization of network bandwidth by a non-time critical data stream being sent from a sending endpoint 101 to a receiving endpoint 102 as shown in FIG. 1. Both of the sending endpoint 101 and the receiving endpoint 102 each have multiple physical interfaces (105a and 105b to 108a and 108b of FIG. 1) connecting the sending endpoint 101 and the receiving endpoint 102 to multiple networks 111 to 114 of FIG. 1, respectively. In this example embodiment, the non-time critical data stream is split into sub-streams and sent over multiple physical interfaces, such as multiple physical interfaces 105a and 105b to 108a and 108b.

As shown in FIG. 16, in block 1601, on the sending endpoint 101, a determination is made as to whether at least one of the multiple physical interfaces 105a to 108a of the sending endpoint 101 is also sending or receiving a time critical data stream or a near-time critical data stream. The determination is made by the bondable virtual interface 236 as described in connection with FIG. 5, based upon a time objective specified by the application server 501. If there is at least one of the multiple physical interfaces 105a to 108a of the sending endpoint 101 also sending or receiving a time critical data stream or a near-time critical data stream, then an adjustment is made to the network bandwidth utilization of at least one of the multiple physical interfaces 105a to 108a of the sending endpoint 101 in accordance with the determination. The adjustment of the network bandwidth utilization is made by the data organizer 238 which instantiates the data splitter 238 to split and send the data packets over the multiple physical interfaces 105a to 108a.

In block 1602, at the receiving endpoint 102, a determination is made as to whether at least one of the multiple physical interfaces 105b to 108b of the receiving endpoint 102 is also sending or receiving a time critical data stream or a near-time critical data stream. This determination is made by the bondable virtual interface 336 described in connection with FIG. 5, based on the data received and combined at the receiving endpoint 102. If at least one of the multiple physical interfaces 105b to 108b of the receiving endpoint 102 is also sending or receiving a time critical data stream or a near-time critical data stream, then the receiving endpoint 102 sends a notification to the sending endpoint 101 (1603). More specifically, a notification is sent by the data organizer 338 which instantiates the data combiner 338 to combine data received over the multiple physical interfaces 105b to 108b. If a notification is received by the sending endpoint 101 (1604), then an adjustment is made to the network utilization of at least one of the multiple physical interfaces of the sending endpoint 101 (1605).

If in block 1601, none of the multiple physical interfaces 105a to 108a of the sending endpoint 101 is also sending or receiving a time critical data stream or a near-time critical data stream, and a notification is not received by the sending endpoint 101 in block 1604, then the process starts over. In addition, after an adjustment is made by the data splitter 238 to the network bandwidth utilization of at least one of the multiple physical interfaces 105a to 108a of the sending endpoint 101 in block 1605, a determination is made as to whether the sending endpoint 101 is sending a non-time critical data stream to the receiving endpoint 102 (1606). The determination is made by the bondable virtual interface 236 based upon a time objective specified by the application server 501. If the sending endpoint 101 continues to send a non-time critical data stream to the receiving endpoint 102, then the process starts over. If the sending endpoint 101 is no longer sending a non-time critical data stream to the receiving endpoint 102, then the process ends.

By virtue of the foregoing described embodiment, it is ordinarily possible to ensure that a non-time critical data stream will not substantially affect its interaction with an endpoint which is currently sending or receiving a time critical data stream or a near-time critical data stream. More specifically, because a sending endpoint and a receiving endpoint of a non-time critical data stream each determine if their multiple physical interfaces are also sending or receiving a time critical data stream or a near-time critical data stream, and the network bandwidth utilization of at least one of the multiple physical interfaces is adjusted in accordance with the determinations, the time critical data streams or a near-time critical data streams are proactively allowed a sufficient amount of network bandwidth so that the quality of delivery of the time critical and a near-time critical data streams is substantially maintained or even improved. In this regard, the sending endpoint and receiving endpoint of the non-time critical data stream are acting as "good citizens" in the network by proactively adjusting how much network bandwidth each of the multiple physical interfaces of each endpoint utilizes when sending a non-time critical data stream.

In one example aspect of this embodiment, in block 1603, the notification includes an indication of the ones of the multiple physical interfaces of the receiving endpoint 102 also sending or receiving a time critical or a near-time critical data stream. The physical interfaces may be identified in the notification by, for example, IP address, MAC address, or other means. In this aspect, the adjusting in block 1605 is performed in accordance with the notification received by the sending endpoint 101 in a case where there is a conflict between a time critical data stream or a near-time critical data stream and the non-time critical data stream on one of the multiple networks 111 to 114 or multiple physical interfaces 105b to 108b of the receiving endpoint 102.

In another example aspect of this embodiment, in block 1601, if at least one of the multiple physical interfaces 105a to 108a of the sending endpoint 101 is determined by the bondable virtual interface 236 to also be sending or receiving a time critical data stream or a near-time critical data stream, then the adjustment made by the data splitter 238 in block 1605 includes reducing the network bandwidth utilization of the multiple physical interfaces 105a to 108a of the sending endpoint 101. In addition, if at least one of the multiple physical interfaces 105b to 108b of the receiving endpoint 102 is determined by the bondable virtual interface to also be sending or receiving a time critical data stream or a near-time critical data stream, then the adjustment made by the data splitter 238 in block 1605 includes reducing the network bandwidth utilization of the multiple physical interfaces 105a to 108a of the sending endpoint 101. More specifically, in this example aspect, adjusting the network bandwidth utilization may consist of reducing the network bandwidth utilization of the multiple physical interfaces 105a to 108a of the sending endpoint 101 sending the non-time critical data stream in proportion to an amount of network bandwidth sufficient for the multiple physical interfaces of the sending endpoint 101 and the receiving endpoint 102 to send and/or receive a time critical data stream or a near-time critical data stream.

As an example, assume a determination is made that a physical interface on the sending endpoint 101, or a physical interface on the receiving endpoint 102, is also sending or receiving a time critical data stream which is currently being sent at 50 Mb/s, but requires a network bandwidth utilization of 100 Mb/s for a certain quality of data streaming. In addition, the physical interfaces of the sending endpoint 101 sending the non-time critical data stream are utilizing 100 Mb/s of network bandwidth. In this example, a reduction would be made to the network bandwidth utilization of the physical interfaces of the sending endpoint 101 which are sending the non-time critical data stream, the reduction being equal to 50% of network bandwidth utilization. That is, if two physical interfaces of the sending endpoint 101 were sending the non-time critical data stream, then each would be reduced to utilize 25 Mb/s of network bandwidth. In this regard, the network bandwidth utilization of the physical interfaces of the sending endpoint 101 is being reduced in proportion to what the time critical data stream or near-time critical data stream requires in order to maintain a certain quality of data streaming.

Because, in this example aspect of the embodiment, the network bandwidth utilization of the multiple physical interfaces sending a non-time critical data stream is reduced in proportion to an amount of network bandwidth sufficient for the multiple physical interfaces sending and/or receiving a time critical data stream or a near-time critical data stream, a more exact reduction in network bandwidth utilization is obtained, than when compared with brute-force, undifferentiated reductions in the network bandwidth utilization of the multiple physical interfaces 105a to 108a. Therefore, the sending endpoint 101 and the receiving endpoint 102 are accurately reducing the network bandwidth utilized in streaming a non-time critical data stream, so as to proactively allow a time-critical or a near-time critical data stream the sufficient amount of network bandwidth.

In yet another example aspect of this embodiment, in block 1601, if at least one of the multiple physical interfaces 105a to 108a of the sending endpoint 101 is determined by the virtual physical interface 236 to also be sending or receiving a time critical data stream or a near-time critical data stream, then the adjustment made by the data splitter 238 in block 1605 includes reducing the network bandwidth utilization of the multiple physical interfaces 105a to 108a of the sending endpoint 101 sending the non-time critical data stream. In addition, if at least one of the multiple physical interfaces 105b to 108b of the receiving endpoint 102 is determined by bondable virtual interface 336 to also be sending or receiving a time critical data stream or a near-time critical data stream, then the adjustment made by the data splitter 238 in block 1605 includes reducing the network bandwidth utilization of the multiple physical interfaces 105a to 108a of the sending endpoint 101 sending the non-time critical data stream. In this example aspect of the embodiment, the adjustment in block 1605 further includes increasing, at the same time as the above-described reduction, the network bandwidth utilization of the remaining multiple physical interfaces of the sending endpoint 101 in order to compensate for the above-described reduction. The remaining physical interfaces include physical interfaces sending a time critical or a near-time critical data stream, and may include physical interfaces sending the non-time critical data stream. The network bandwidth utilization of the remaining multiple physical interfaces is increased in equal proportion to the reduction of the network bandwidth utilization of the multiple physical interfaces 105a to 108a of the sending endpoint 101 sending the non-time critical data stream.

In an additional example aspect of this embodiment, in block 1601, if at least one of the multiple physical interfaces 105a to 108a of the sending endpoint 101 is determined by the bondable virtual interface 236 to also be sending or receiving a time critical data stream or a near-time critical data stream, then the adjustment made by the data splitter 238 in block 1605 includes reducing the network bandwidth utilization of the multiple physical interfaces 105a to 108a of the sending endpoint 101 sending the non-time critical data stream. In addition, if at least one of the multiple physical interfaces 105b to 108b of the receiving endpoint 102 is determined by the bondable virtual interface 336 to also be sending or receiving a time critical data stream or a near-time critical data stream, then the adjustment made by the data splitter 238 in block 1605 includes reducing the network bandwidth utilization of the multiple physical interfaces 105a to 108a of the sending endpoint 101 sending the non-time critical data stream. In this regard, the reduction of network bandwidth utilization of the multiple physical interfaces 105a to 108a of the sending endpoint 101 sending the non-time critical data stream would include physical interfaces which might be sending or receiving a time critical data stream or a near-time critical data stream. For example, in a case where a non-time critical data stream shares a physical interface with a time critical data stream or a near-time critical data stream and thus, when reducing the network bandwidth utilization of one of the multiple physical interfaces sending the non-time critical data stream, the network bandwidth utilization of one of the multiple physical interfaces sending a time critical data stream or a near-time critical data stream will also be reduced. In another example embodiment, the above-described reduction of network bandwidth utilization is made to the physical interfaces only sending the non-time critical data stream. In this example, if a physical interface of the sending endpoint 101 is sending the non-time critical data stream, but is also sending a time critical data stream or a near-time critical data stream, then the network bandwidth utilization would not be reduced for this physical interface.

Moreover, the network bandwidth utilization of all the multiple physical interfaces 105a to 108a of the sending endpoint 101 may be reduced by the data splitter 238 in order of multiple physical interfaces sending a non-time critical data stream, a near-time critical data stream, and a time critical data stream. In this regard, the network bandwidth utilization of the physical interfaces is reduced in a hierarchical manner, so that the network bandwidth utilization of the physical interfaces only sending a non-time critical data stream is reduced first and reduced more than physical interfaces sending a near-time critical data stream or a time critical data stream. After the reduction is made to the network bandwidth utilization of the physical interfaces only sending the non-time critical data, then a less of a reduction is made to the network bandwidth utilization of the physical interfaces sending a near-time critical data stream, and an even less of a reduction is made to the network bandwidth utilization of the physical interfaces sending a time-critical data stream.

If the process starts over after block 1606, and if in block 1601, on the sending endpoint 101, an additional one or more of the multiple physical interfaces 105a to 108a of the sending endpoint 101 are determined by the bondable virtual interface 236 to be sending or receiving a near-time critical data stream or a time critical data stream, then a further adjustment is made by the data splitter 238 to the network bandwidth utilization of at least one of the multiple physical interfaces 105a to 108a of the sending endpoint 101 in accordance with the additional determination. In addition, in block 1602, on the receiving endpoint 102, if an additional one or more of the multiple physical interfaces 105b to 108b of the receiving endpoint 102 are determined by the bondable virtual interface 336 to be sending or receiving a near-time critical data stream or a time critical data stream, a notification is sent by the data combiner 338 from the receiving endpoint 102 to the sending endpoint 101 of the additional one or more multiple physical interfaces of the receiving endpoint 102 also sending or receiving a time critical or a near-time critical data stream (1603). A further adjustment is then made by the data splitter 238 to the network utilization of at least one of the multiple physical interfaces 105a to 108a of the sending endpoint 101 in accordance with the additional notification.

In this example embodiment, the network bandwidth utilization of each of the multiple physical interfaces 105a to 108a of the sending endpoint 101 sending a non-time critical data stream may be automatically reduced to a percentage smaller than a maximum network bandwidth utilization of the respective physical interfaces. For example, the network bandwidth utilization of the multiple physical interfaces of the sending endpoint and the receiving endpoint of a non-time critical data stream may automatically be reduced to anywhere from 10% to 90% of their maximum network bandwidth utilization. As a result, the sending endpoint and receiving endpoint of a non-time critical data stream are always acting as a "good citizen" in the network by allowing more network bandwidth for time critical and near-time critical data streams. In this regard, further reductions may be made to the network bandwidth utilization of the multiple physical interfaces of the sending endpoint 101 sending a non-time critical data stream in accordance with block 1605.

Figure 17:
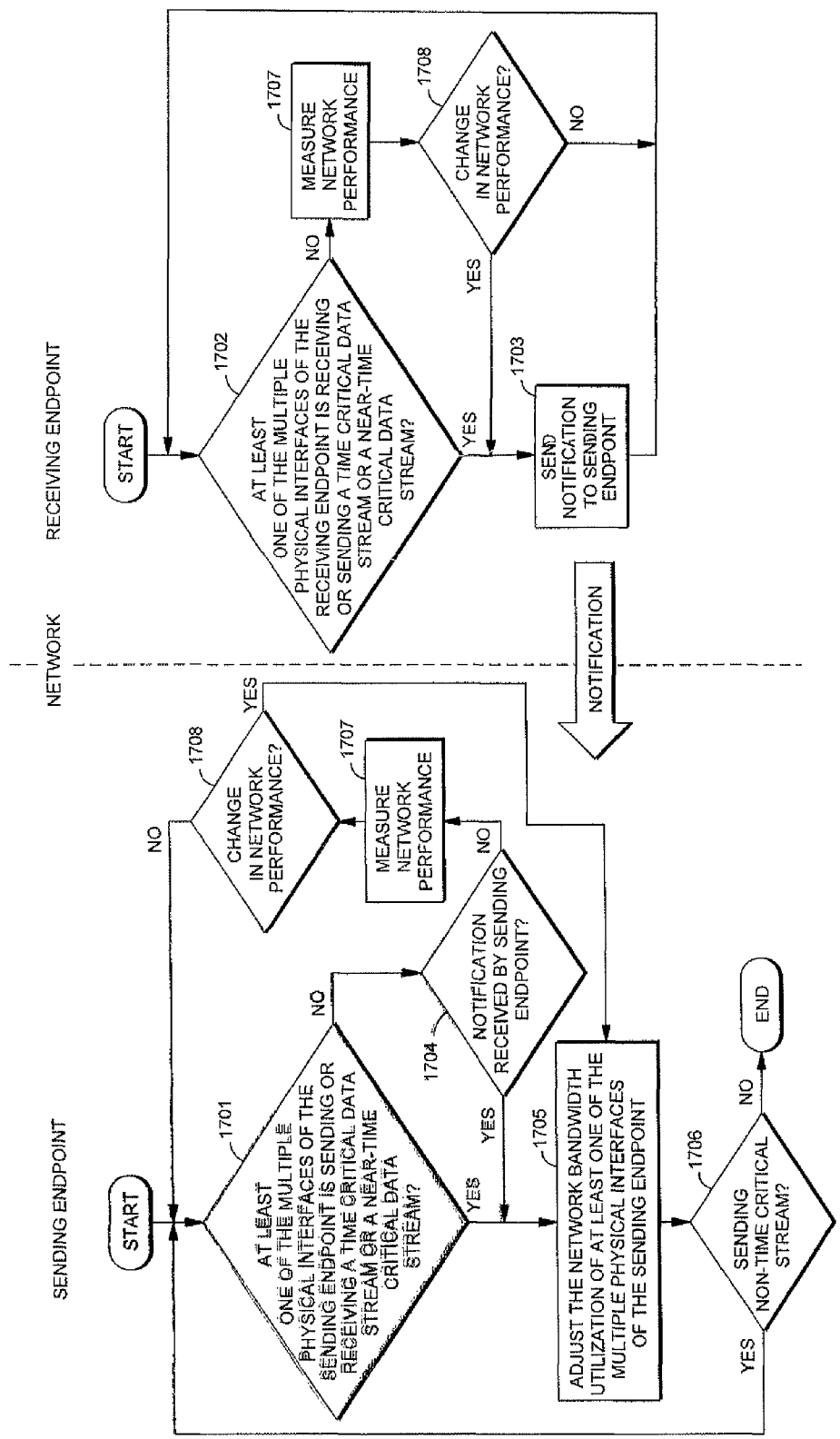
FIG. 17 is a flow chart for providing a detailed explanation of yet another example embodiment.

FIG. 17 is a flow chart for providing a detailed explanation of yet another example embodiment. More specifically, FIG. 17 depicts a flowchart for providing a detailed explanation of another example embodiment for adjusting utilization of network bandwidth by a non-time critical data stream being sent from a sending endpoint 101 to a receiving endpoint 102 as shown in FIG. 1. Similar to the example embodiment as depicted in FIG. 16, in this example embodiment, both of the sending endpoint 101 and the receiving endpoint 102 each have multiple physical interfaces (105a and 105b to 108a and 108b of FIG. 1) connecting the sending endpoint 101 and the receiving endpoint 102 to multiple networks 111 to 114 of FIG. 1, respectively. Also similar to the example embodiment depicted in FIG. 16, in this example embodiment, the non-time critical data stream is split into sub-streams and sent over multiple physical interfaces, such as multiple physical interfaces 105a and 105b to 108a and 108b.

As shown in FIG. 17, blocks 1701 through 1706 are substantially similar to blocks 1601 through 1606 of FIG. 16 and the process connected with those blocks will not be repeated here for the sake of brevity. A few deviations from the process described in FIG. 16 are included in this example embodiment, which will now be described in detail. In particular, if in block 1701, on the sending endpoint 101, none of the multiple physical interfaces 105a to 108a of the sending endpoint 101 are determined to also be sending or receiving a time critical data stream or a near-time critical data stream, and if in block 1704, a notification indicating that at least one of the multiple physical interfaces 105b to 108b of the receiving endpoint 102 is also sending or receiving a time critical data stream or a near-time critical data stream, is not received by the sending endpoint 101, then the process goes to block 1709. In block 1709, the sending endpoint 101, and more specifically the traffic monitor 234 as described in connection with FIG. 5, measures network performance for data sent over the multiple physical interfaces 105a to 108a of the sending endpoint 101. In this regard, the network performance may be measured in terms of network congestion and/or latency. If a change in network performance is measured (1710), as measured by the sending endpoint 101, then an adjustment is made to the network bandwidth utilization of at least one of the multiple physical interfaces 105a to 108a of the sending endpoint 101 in accordance with the measured network performance (1705). If no change in network performance is measured, as measured by the sending endpoint 101, then the process starts over.

In addition, if in block 1702, none of the multiple physical interfaces 105b to 108b of the receiving endpoint 102 are also receiving or sending a time critical data stream or a near-time critical data stream, then the process moves to block 1707. In block 1707, the sending endpoint 101, and more specifically the traffic monitor 334 as described in connection with FIG. 5, measures network performance for data received over the multiple physical interfaces 105b to 108b of the receiving endpoint 102. In this regard, the network performance may be measured in terms of network congestion and/or latency. If a change in network performance is measured (1708), as measured by the receiving endpoint 102, then a notification is sent by the data combiner 338 to the sending endpoint 101 (1703). This notification includes an indication that the network performance, as measured by the traffic monitor 334, has changed. Upon receiving such a notification at the sending endpoint 101 in block 1704, the process then proceeds to block 1705, in which an adjustment is made by the data splitter 238 to the network bandwidth utilization of at least one of the multiple physical interfaces 105a to 108a of the sending endpoint 101 in accordance with the measured network performance. If no change in network performance is measured, as measured by the receiving endpoint 102, then the process starts over. Because the sending endpoint and the receiving endpoint of a non-time critical data stream are measuring network performance, it is ordinarily possible to ensure that the non-time critical data stream will not indirectly affect other endpoints on the network which are currently sending or receiving a time critical data stream or a near-time critical data stream.

In one example aspect of this embodiment, if a change in network performance is measured, then the step of adjusting by the data splitter 238 in block 1705 includes reducing the network bandwidth utilization of the multiple physical interfaces 105a to 108a of the sending endpoint 101 sending a non-time critical data stream in proportion to the change in network performance.

When measuring the network performance, for latency, the sending endpoint 101 and the receiving endpoint 102 may measure the time it takes for a packet of data to be sent and received. For congestion, the sending endpoint 101 and the receiving endpoint 102 may measure a round trip time for a packet of data. The identification of a change in network performance can be performed by capturing the latency or congestion as statistical data and then using a standard deviation to identify those data points outside of the norm. Then, when reducing the network bandwidth utilization of the multiple physical interfaces 105a to 108a of the sending endpoint 101 sending a non-time critical data stream in proportion to the change in network performance, the reduction would be proportional to the amount that the data point falls outside of the norm. A sliding population amount of data points is used to accurately identify if a data point is outside of the norm (e.g., capturing 100 data points before identifying if a data point is outside of the norm). Furthermore, other types of predictive models could be used (e.g., the use of Bayesian Statistics could be used to identify when a physical interface is congested or latent).

In another example aspect of this embodiment, if a change in network performance is measured, then the step of adjusting by the data splitter 238 in block 1705 includes reducing the network bandwidth utilization of the multiple physical interfaces 105a to 108a of the sending endpoint 101 sending a non-time critical data stream. In this example aspect, the step of adjusting the network bandwidth utilization may further include increasing the network bandwidth utilization of the remaining multiple physical interfaces of the sending endpoint 101 in order to compensate for the reduction. In this regard, the remaining multiple physical interfaces include physical interfaces of the sending endpoint 101 for which a reduction in network performance was not observed, and for which the network bandwidth utilization was not reduced as described above. The network bandwidth utilization for these remaining physical interfaces would be increased in equal proportion to the reduction of the network bandwidth utilization of the multiple physical interfaces 105a to 108a of the sending endpoint 101 sending the non-time critical data stream.

In yet another example aspect of this embodiment, if a change in network performance is measured, then the step of adjusting by the data splitter 238 includes reducing the network bandwidth utilization of the multiple physical interfaces 105a to 108a of the sending endpoint 101 sending the non-time critical data stream. In this regard, the reduction of network bandwidth utilization of the multiple physical interfaces 105a to 108a of the sending endpoint 101 sending the non-time critical data stream would not include physical interfaces which are sending or receiving a time critical data stream or a near-time critical data stream. For example, in a case where a non-time critical data stream shares a physical interface with a time critical data stream or a near-time critical data stream, the network utilization would not be reduced for the shared physical interface.

After an adjustment is made to at least one of the multiple physical interfaces 105a to 108a of the sending endpoint 101 in block 1705, the process proceeds to block 1706. In block 1706, a determination is made whether a non-time critical data stream is being sent from the sending endpoint 101 to the receiving endpoint 102. If the determination in block 1706 is positive, then the process starts over. On the other hand, if the determination in block 1706 is negative, then the process ends.

If the process starts over after block 1706, and in blocks 1707 and 1708 or in blocks 1709 and 1710, an additional change in network performance is measured, then a further adjustment is made to the network bandwidth utilization of at least one of the multiple physical interfaces 105a to 108a of the sending endpoint 101 in accordance with the additional measured change in network performance. In addition, if in blocks 1707 and 1708 and blocks 1709 and 1710, the network performance is measured and the network performance has changed back to the original network performance, then the network bandwidth utilization of the multiple physical interfaces 105a to 108a of the sending endpoint 101 which had previously been adjusted are readjusted back to their original network bandwidth utilization.

Figure 18:
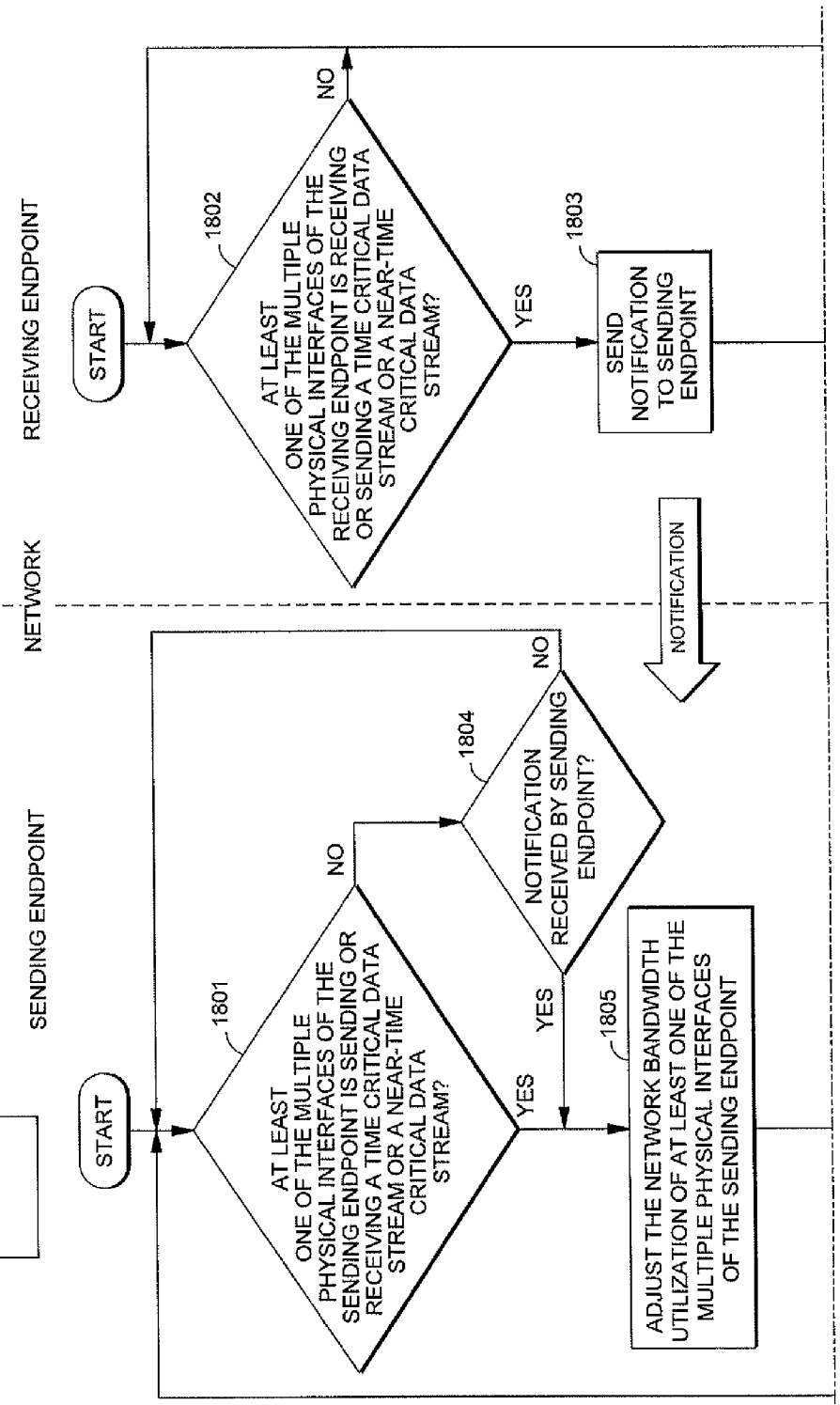
FIG. 18 is a flow chart for providing a detailed explanation of an additional example embodiment.
Figure 18B:
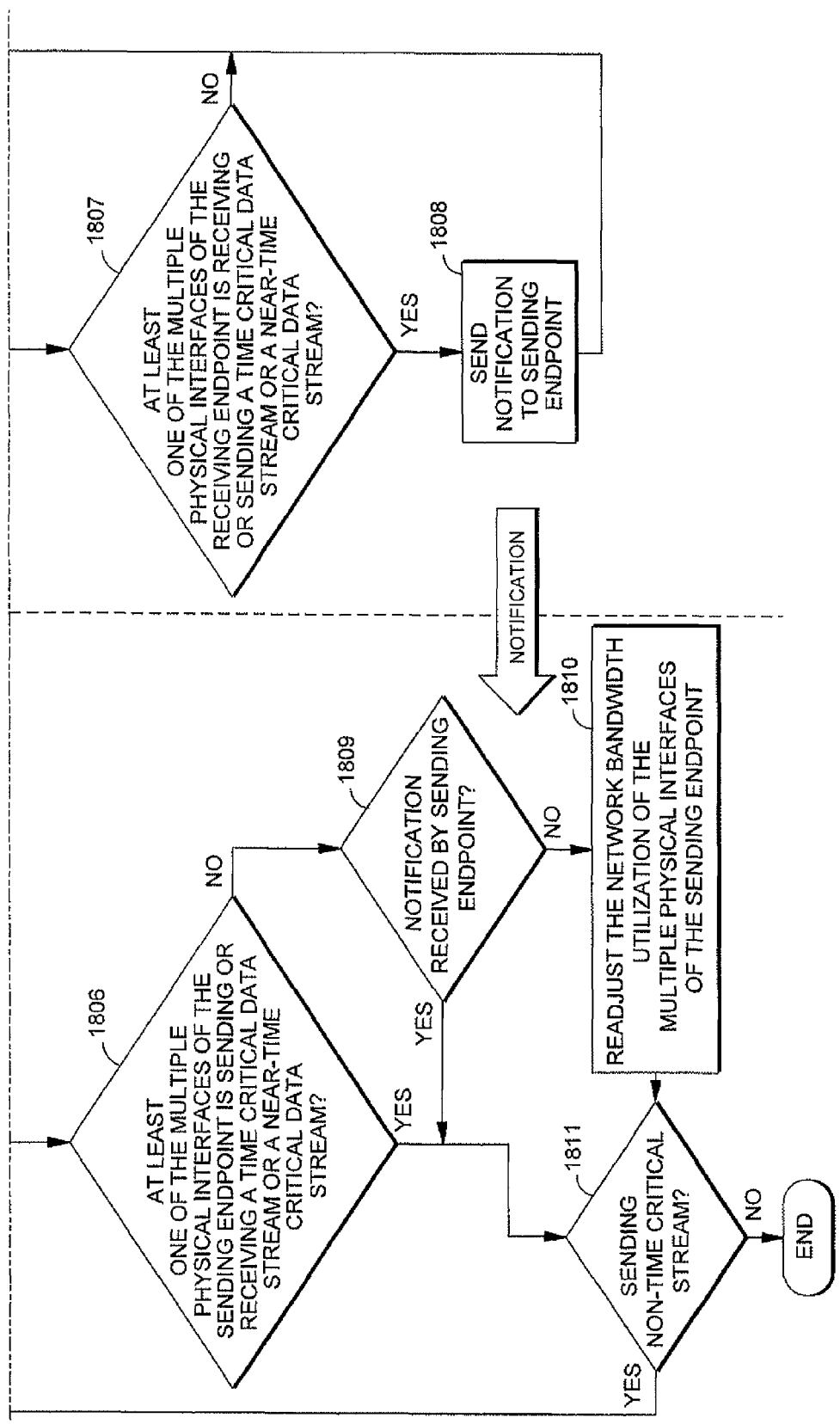

FIG. 18 is a flow chart for providing a detailed explanation of an additional example embodiment. More specifically, FIG. 18 depicts a flowchart for providing a detailed explanation of another example embodiment for adjusting utilization of network bandwidth by a non-time critical data stream being sent from a sending endpoint 101 to a receiving endpoint 102 as shown in FIG. 1. Similar to the example embodiment as depicted in FIG. 16, in this example embodiment, both of the sending endpoint 101 and the receiving endpoint 102 each have multiple physical interfaces (105a and 105b to 108a and 108b of FIG. 1) connecting the sending endpoint 101 and the receiving endpoint 102 to multiple networks 111 to 114 of FIG. 1, respectively. Also similar to the example embodiment depicted in FIG. 16, in this example embodiment, the non-time critical data stream is split into substreams and sent over multiple physical interfaces, such as multiple physical interfaces 105a and 105b to 108a and 108b.

As shown in FIG. 18, blocks 1801 through 1805 are substantially similar to blocks 1601 through 1605 of FIG. 16, and the process described in connection with those blocks will not be repeated here for the sake of brevity.

As shown in FIG. 18, if in block 1805, on the sending endpoint 101, an adjustment is made by the data splitter 238 to the network bandwidth utilization of at least one of the multiple physical interfaces of the sending endpoint 101, then the process proceeds to blocks 1806. In block 1806, a determination is made by the bondable virtual interface 236 as to whether at least one of the multiple physical interfaces 105a to 108a of the sending endpoint 101 is sending or receiving a time critical data stream or a near-time critical data stream. If at least one of the multiple physical interfaces 105a to 108a of the sending endpoint 101 is still sending or receiving a time critical data stream or a near-time critical data stream, then the process proceeds to block 1811. On the other hand, if the multiple physical interfaces 105a to 108a of the sending endpoint 101 are no longer sending or receiving a time critical data stream or a near-time critical data stream, then the process proceeds to block 1809.

In block 1807, on the receiving endpoint 102, a determination is made by the bondable virtual interface 336 as to whether at least one of the multiple physical interfaces 105b to 108b of the receiving endpoint 102 is sending or receiving a time critical data stream or a near-time critical data stream. If at least one of the multiple physical interfaces 105b to 108b of the receiving endpoint 102 is still sending or receiving a time critical data stream or a near-time critical data stream, the receiving endpoint 102, and more specifically the data combiner 338, sends a notification to the sending endpoint 101 (1808). If the notification is received by the sending endpoint 101 (1809), then the process proceeds to block 1811.

If a notification is not received by the sending endpoint 101 (1809), then the process proceeds to block 1810. In block 1810, a readjustment is made to the network bandwidth utilization of the multiple physical interfaces 105a to 108a of the sending endpoint 101.

In one example aspect of this embodiment, an adjustment was previously made by the data splitter 238 in block 1805, which included reducing the network bandwidth utilization of the multiple physical interfaces 105a to 108a of the sending endpoint 102. More specifically, a reduction was made to the network bandwidth utilization of the multiple physical interfaces 105a to 108a of the sending endpoint 101 sending the non-time critical data stream in proportion to an amount of network bandwidth sufficient for the multiple physical interfaces of the sending endpoint 101 and the receiving endpoint 102 to send and/or receive a time critical data stream or a near-time critical data stream. In this example aspect, in block 1810, the readjustment includes increasing the network bandwidth utilization of each of the multiple physical interfaces 105a to 108a of the sending endpoint 101 in proportion to an amount that each of such physical interfaces was reduced. Because the network bandwidth utilization of the multiple physical interfaces sending a non-time critical data stream is increased when a time critical data stream or a near-time critical data stream is no longer being sent or received by the sending endpoint 101 or the receiving endpoint 102, the non-time critical data stream, such as a data file transfer, can be sent more efficiently, as compared to a configuration which sets the multiple physical interfaces of the sending endpoint that are sending the non-time critical data stream to a reduced network bandwidth utilization state.

In another example embodiment, instead of readjusting the network bandwidth utilization of each of the multiple physical interfaces 105a to 108a of the sending endpoint 101 to their original network bandwidth utilization, a readjustment is made by the data splitter 238 to the network bandwidth utilization of each of the multiple physical interfaces 105a to 108a of the sending endpoint 101 sending a non-time critical data stream in accordance with current network conditions. In other words, the sending endpoint 101 and the receiving endpoint 102 may measure the network performance, and based on any change in the network performance, the network bandwidth utilization of the multiple physical interfaces 105a to 108a of the sending endpoint 101 sending a non-time critical data stream may or may not be readjusted to their original network bandwidth utilization. If the multiple physical interfaces 105a to 108a of the sending endpoint 101 are no longer sending a time critical data stream or near-time critical data stream, and no change in network performance is measured, then a readjustment is made by the data splitter 238 to the network bandwidth utilization of the multiple physical interfaces 105a to 108a of the sending endpoint 101 sending the non-time critical data stream back to the original network bandwidth utilization. On the other hand, if the multiple physical interfaces 105a to 108a of the sending endpoint 101 are no longer sending a time critical data stream or near-time critical data stream, and a change in network performance is measured, then a readjustment is made to the network bandwidth utilization of the multiple physical interfaces 105a to 108a of the sending endpoint 101 sending the non-time critical data stream in accordance with the change in network performance. Thus, a readjustment is made to the network bandwidth utilization of the multiple physical interfaces 105a to 108a of the sending endpoint 101 sending the non-time critical data stream, but the readjustment will not be a full readjustment, and will be limited by the change in network performance. The above-described readjustment may be utilized in block 1810.

In another example aspect of this embodiment, an adjustment was previously made by the data splitter 238 in block 1805. The adjustment included reducing the network bandwidth utilization of the multiple physical interfaces 105a to 108a of the sending endpoint 101 sending the non-time critical data stream, and included optionally increasing the network bandwidth utilization of the remaining multiple physical interfaces, which included physical interfaces of the sending endpoint 101 sending the non-time critical data stream but for which the network bandwidth utilization was not reduced. These remaining physical interfaces were optionally increased in equal proportion to the reduction of the network bandwidth utilization of the multiple physical interfaces 105a to 108a of the sending endpoint 101 sending the non-time critical data stream. In this example aspect, in block 1810, the readjustment then includes increasing the network bandwidth utilization of each of the multiple physical interfaces 105a to 108a of the sending endpoint 101 in proportion to an amount that each of such physical interfaces was reduced, and reducing the network utilization of each of the multiple physical interfaces 105a to 108a of the sending endpoint 101 in proportion to an amount that each of such physical interfaces was optionally increased.

In yet another example aspect of this embodiment, an adjustment was made by the data splitter 238 in block 1805 which included reducing the network bandwidth utilization of the multiple physical interfaces 105a to 108a of the sending endpoint 101 sending the non-time critical data stream. In this example aspect, in block 1810, the readjustment by the data splitter 238 then includes increasing the network bandwidth utilization of the multiple physical interfaces 105a to 108a of the sending endpoint 101 in proportion to an amount that each of such physical interfaces was reduced.

In block 1811, a determination is made as to whether the sending endpoint 101 is sending a non-time critical data stream to the receiving endpoint 102. If the sending endpoint 101 is sending a non-time critical data stream to the receiving endpoint 102, then the process starts over. On the other hand, if the sending endpoint 101 is determined to not be sending a non-time critical data stream to the receiving endpoint 102, then the process ends.

If the process starts over after block 1811, and in block 1801, on the sending endpoint 101, an additional one or more of the multiple physical interfaces 105a to 108a of the sending endpoint 101 are determined by the bondable virtual interface 236 to be sending or receiving a near-time critical data stream or a time critical data stream, then a further adjustment is made by the data splitter 238 to the network bandwidth utilization of at least one of the multiple physical interfaces 105a to 108a of the sending endpoint 101 in accordance with the additional determination. In addition, in block 1802, on the receiving endpoint 102, if an additional one or more of the multiple physical interfaces 105b to 108b of the receiving endpoint 102 are determined by the bondable virtual interface 336 to be sending or receiving a near-time critical data stream or a time critical data stream, a notification is sent by the data combiner 338 from the receiving endpoint 102 to the sending endpoint 101 of the additional one or more multiple physical interfaces of the receiving endpoint 102 also receiving a time critical or a near-time critical data stream (1803). A further adjustment is then made to the network utilization of at least one of the multiple physical interfaces 105a to 108a of the sending endpoint 101 in accordance with the additional notification.

This disclosure has provided a detailed description with respect to particular illustrative embodiments. It is understood that the scope of the appended claims is not limited to the above-described embodiments and that various changes and modifications may be made by those skilled in the relevant art without departing from the scope of the claims.

What is claimed is:

1. A method for adjusting network bandwidth, the network bandwidth being utilized by a non-time critical data stream being sent from a sending endpoint to a receiving endpoint, wherein both of the sending endpoint and the receiving endpoint each have multiple physical interfaces connecting the sending endpoint and the receiving endpoint to multiple networks, respectively, wherein the non-time critical data stream is split into sub-streams and sent over multiple physical interfaces, and wherein the sending endpoint performs the method, the method comprising:
    determining if at least one of the multiple physical interfaces of the sending endpoint is also sending or receiving a time critical data stream or a near-time critical data stream;
    receiving a notification from the receiving endpoint in a case where at least one of the multiple physical interfaces of the receiving endpoint is determined to be sending or receiving a time critical data stream or a near-time critical data stream; and
    adjusting the network bandwidth utilization of at least one of the multiple physical interfaces of the sending endpoint in accordance with the determination and/or the notification.

2. The method according to claim 1, wherein adjusting the network bandwidth utilization of at least one of the multiple physical interfaces of the sending endpoint includes automatically reducing the network bandwidth utilization of each of the multiple physical interfaces of the sending endpoint sending or receiving a non-time critical data stream to a percentage smaller than a maximum network bandwidth utilization of the respective physical interfaces.

3. The method according to claim 1, wherein the notification includes an indication of the ones of the multiple physical interfaces of the receiving endpoint also receiving or sending a time critical or a near-time critical data stream, and wherein adjusting the network bandwidth utilization is performed in accordance with the notification in a case where there is a conflict between the non-time critical data stream and the time critical or near-time critical data stream on one of the multiple networks or multiple physical interfaces of the receiving endpoint.

4. The method according to claim 1, wherein if at least one of the multiple physical interfaces of the sending endpoint is determined to also be sending or receiving a time critical data stream or a near-time critical data stream, or if at least one of the multiple physical interfaces of the receiving endpoint is determined to also be sending or receiving a time critical data stream or a near-time critical data stream, then adjusting the network bandwidth utilization comprises:

reducing the network bandwidth utilization of the multiple physical interfaces of the sending endpoint sending the non-time critical data stream in proportion to an amount of network bandwidth sufficient for the multiple physical interfaces of the sending endpoint and the receiving endpoint to send and/or receive a time critical data stream or a near-time critical data stream.

5. The method according to claim 4, wherein adjusting the network bandwidth utilization further comprises:

in a case where the multiple physical interfaces of the sending endpoint are determined to no longer be sending or receiving a time critical or a near-time critical data stream, and where the multiple physical interfaces of the receiving endpoint are determined to no longer be sending or receiving a time critical or a near-time critical data stream, increasing the network bandwidth utilization of each of the multiple physical interfaces of the sending endpoint in proportion to an amount that each of such physical interfaces was reduced.

6. The method according to claim 1, wherein if at least one of the multiple physical interfaces of the sending endpoint is determined to also be sending or receiving a time critical data stream or a near-time critical data stream, or if at least one of the multiple physical interfaces of the receiving endpoint is determined to also be sending or receiving a time critical data stream or a near-time critical data stream, then adjusting the network bandwidth utilization comprises:

reducing the network bandwidth utilization of the multiple physical interfaces of the sending endpoint sending the non-time critical data stream; and increasing the network bandwidth utilization of the remaining multiple physical interfaces of the sending endpoint in equal proportion to the reduction of the network bandwidth utilization of the multiple physical interfaces of the sending endpoint sending the non-time critical data stream.

7. The method according to claim 6, wherein adjusting the network bandwidth utilization further comprises:

in a case where the multiple physical interfaces of the sending endpoint are determined to no longer be sending or receiving a time critical data stream or a near-time critical data stream, and where the multiple physical interfaces of the receiving endpoint are determined to no longer be sending or receiving a time critical data stream or a near-time critical data stream, increasing the network bandwidth utilization of each of the multiple physical interfaces of the sending endpoint in proportion to an amount that each of such physical interfaces was reduced, and reducing the network bandwidth utilization of each of the multiple physical interfaces of the sending endpoint in proportion to an amount that each of such physical interfaces was increased.

8. The method according to claim 6, wherein adjusting the network bandwidth utilization further comprises:

in a case where the multiple physical interfaces of the sending endpoint are determined to no longer be sending or receiving a time critical data stream or a near-time critical data stream, and where the multiple physical interfaces of the receiving endpoint are determined to no longer be sending or receiving a time critical data stream or a near-time critical data stream, readjusting the network bandwidth utilization of each of the multiple physical interfaces of the sending endpoint sending a non-time critical data stream in accordance with current network conditions.

9. The method according to claim 1, wherein if at least one of the multiple physical interfaces of the sending endpoint is determined to also be sending or receiving a time critical data stream or a near-time critical data stream, or if at least one of the multiple physical interfaces of the receiving endpoint is determined to also be sending or receiving a time critical data stream or a near-time critical data stream, then adjusting the network bandwidth utilization comprises:

reducing the network bandwidth utilization of the multiple physical interfaces of the sending endpoint sending the non-time critical data stream.

10. The method according to claim 9, wherein the network bandwidth utilization of the multiple physical interfaces of the sending endpoint sending the non-time critical data stream is reduced in order of multiple physical interfaces sending a non-time critical data stream, a near-time critical data stream, and a time critical data stream.

11. The method according to claim 9, wherein adjusting the network bandwidth utilization further comprises:

in a case where the multiple physical interfaces of the sending endpoint are determined to no longer be sending or receiving a time critical data stream or a near-time critical data stream, and where the multiple physical interfaces of the receiving endpoint are determined to no longer be sending or receiving a time critical data stream or a near-time critical data stream, increasing the network bandwidth utilization of the multiple physical interfaces of the sending endpoint in proportion to an amount that each of such physical interfaces was reduced.

12. The method according to claim 1, wherein in said method the sending endpoint further performs:

in a case where none of the multiple physical interfaces of the sending endpoint and none of the multiple physical interfaces of the receiving endpoint are determined to be sending or receiving a time critical data stream or a near-time critical data stream, measuring network performance for data sent between multiple physical interfaces of the sending endpoint and multiple physical interfaces of the receiving endpoint; and adjusting the network bandwidth utilization of at least one of the multiple physical interfaces of the sending endpoint in accordance with the measured network performance.

13. The method according to claim 12, wherein the network performance measured is network congestion and/or latency.

14. The method according to claim 12, wherein if a change in network performance is measured, then adjusting the network bandwidth utilization comprises:
reducing the network bandwidth utilization of the multiple physical interfaces of the sending endpoint sending a non-time critical data stream in proportion to the change in network performance.

15. The method according to claim 12, wherein if a change in network performance is measured, then adjusting the network bandwidth utilization comprises:
reducing the network bandwidth utilization of the multiple physical interfaces of the sending endpoint sending a non-time critical data stream; and
increasing the network bandwidth utilization of the remaining multiple physical interfaces of the sending endpoint in equal proportion to the reduction of the network bandwidth utilization of the multiple physical interfaces of the sending endpoint sending the non-time critical data stream.

16. The method according to claim 12, wherein if a change in network performance is measured, then adjusting the network bandwidth utilization comprises:
reducing the network bandwidth utilization of the multiple physical interfaces of the sending endpoint sending the non-time critical data stream.

17. The method according to claim 1, wherein in said method the sending endpoint further performs:
in a case where an additional one or more of the multiple physical interfaces of the sending endpoint are determined to be sending or receiving a near-time critical data stream or a time critical data stream, and/or where an additional one or more of the multiple physical interfaces of the receiving endpoint are determined to be sending or receiving a near-time critical data stream or a time critical data stream, receiving a notification from the receiving endpoint of the additional one or more multiple physical interfaces of the receiving endpoint also receiving a time critical or a near-time critical data stream; and
further adjusting the network bandwidth utilization of at least one of the multiple physical interfaces of the sending endpoint in accordance with the additional determination and/or additional notification.

18. The method according to claim 1, wherein if at least one of the multiple physical interfaces of the sending endpoint is determined to also be sending or receiving a time critical data stream or a near-time critical data stream, or if at least one of the multiple physical interfaces of the receiving endpoint is determined to also be sending or receiving a time critical data stream or a near-time critical data stream, then adjusting the network bandwidth utilization comprises:
reducing the network bandwidth utilization of the multiple physical interfaces of the sending endpoint only sending the non-time critical data stream.

19. A method for adjusting utilization of network bandwidth, the network bandwidth being utilized by a non-time critical data stream being sent from a sending endpoint to a receiving endpoint, wherein both of the sending endpoint and the receiving endpoint each have multiple physical interfaces connecting the sending endpoint and the receiving endpoint to multiple networks, respectively, wherein the non-time critical data stream is split into sub-streams and sent over multiple physical interfaces, and wherein in said method the receiving endpoint performs:
determining if at least one of the multiple physical interfaces of the receiving endpoint is also sending or receiving a time critical data stream or a near-time critical data stream; and
in a case where at least one of the multiple physical interfaces of the receiving endpoint is determined to be sending or receiving a time critical data stream or a near-time critical data stream, notifying the sending endpoint of the ones of the multiple physical interfaces of the receiving endpoint also sending or receiving a time critical or a near-time critical data stream,
wherein the sending endpoint determines if at least one of the multiple physical interfaces of the sending endpoint is also sending or receiving a time critical data stream or a near-time critical data stream, and adjusts the network bandwidth utilization of at least one of the multiple physical interfaces of the sending endpoint in accordance with the determination and/or the notification.

20. A method according to claim 19, wherein in said method the receiving endpoint further performs:
in a case where an additional one or more of the multiple physical interfaces of the receiving endpoint are determined to be sending or receiving a near-time critical data stream or a time critical data stream, notifying the sending endpoint of the additional one or more multiple physical interfaces of the receiving endpoint also sending or receiving a time critical or a near-time critical data stream,
wherein if an additional one or more of the multiple physical interfaces of the sending endpoint are determined to be sending or receiving a near-time critical data stream or a time critical data stream, the network bandwidth utilization of at least one of the multiple physical interfaces of the sending endpoint is further adjusted in accordance with the additional determination and/or additional notification.

21. A method for adjusting utilization of network bandwidth, the network bandwidth being utilized by a non-time critical data stream being sent from a sending endpoint to a receiving endpoint, wherein both of the sending endpoint and the receiving endpoint each have multiple physical interfaces connecting the sending endpoint and the receiving endpoint to multiple networks, respectively, and wherein the non-time critical data stream is split into sub-streams and sent over multiple physical interfaces, the method comprising:
first determining if at least one of the multiple physical interfaces of the sending endpoint is also sending or receiving a time critical data stream or a near-time critical data stream;
second determining if at least one of the multiple physical interfaces of the receiving endpoint is also sending or receiving a time critical data stream or a near-time critical data stream;
in a case where at least one of the multiple physical interfaces of the receiving endpoint is determined to be sending or receiving a time critical data stream or a near-time critical data stream, notifying the sending endpoint of the ones of the multiple physical interfaces of the receiving endpoint also sending or receiving a time critical or a near-time critical data stream; and
adjusting the network bandwidth utilization of at least one of the multiple physical interfaces of the sending endpoint in accordance with the first determination and/or the notification.

22. A sending endpoint comprising:
a computer-readable memory constructed to store computer-executable process steps; and a processor constructed to execute the computer-executable process steps stored in the memory, wherein the process steps stored in the memory cause the processor to adjust network bandwidth utilized by a non-time critical data stream being sent from a sending endpoint to a receiving endpoint, wherein both of the sending endpoint and the receiving endpoint each have multiple physical interfaces connecting the sending endpoint and the receiving endpoint to multiple networks, respectively, wherein the non-time critical data stream is split into sub-streams and sent over multiple physical interfaces, and wherein the process steps stored in the memory include computer-executable process steps to:

determine if at least one of the multiple physical interfaces of the sending endpoint is also sending or receiving a time critical data stream or a near-time critical data stream;

receive a notification from the receiving endpoint in a case where at least one of the multiple physical interfaces of the receiving endpoint is determined to be sending or receiving a time critical data stream or a near-time critical data stream, wherein the notification includes the ones of the multiple physical interfaces of the receiving endpoint also sending or receiving a time critical or a near-time critical data stream; and adjust the network bandwidth utilization of at least one of the multiple physical interfaces of the sending endpoint in accordance with the determination and/or the notification.

23. A receiving endpoint comprising:

a computer-readable memory constructed to store computer-executable process steps; and a processor constructed to execute the computer-executable process steps stored in the memory, wherein the process steps stored in the memory cause the processor to adjust network bandwidth utilized by a non-time critical data stream being sent from a sending endpoint to a receiving endpoint, wherein both of the sending endpoint and the receiving endpoint each have multiple physical interfaces connecting the sending endpoint and the receiving endpoint to multiple networks, respectively, wherein the non-time critical data stream is split into sub-streams and sent over multiple physical interfaces, and wherein the process steps stored in the memory include computer-executable process steps to:

determine if at least one of the multiple physical interfaces of the receiving endpoint is also sending or receiving a time critical data stream or a near-time critical data stream; and in a case where at least one of the multiple physical interfaces of the receiving endpoint is determined to be sending or receiving a time critical data stream or a near-time critical data stream, notify the sending endpoint of the ones of the multiple physical interfaces of the receiving endpoint also sending or receiving a time critical or a near-time critical data stream, wherein the sending endpoint determines if at least one of the multiple physical interfaces of the sending endpoint is also sending or receiving a time critical data stream or a near-time critical data stream, and adjusts the network bandwidth utilization of at least one of the multiple physical interfaces of the sending endpoint in accordance with the determination and/or the notification.

24. A non-transitory computer-readable memory medium on which is stored computer-executable process steps for causing a processor to adjust network bandwidth utilized by a non-time critical data stream being sent from a sending endpoint to a receiving endpoint, wherein both of the sending endpoint and the receiving endpoint each have multiple physical interfaces connecting the sending endpoint and the receiving endpoint to multiple networks, respectively, wherein the non-time critical data stream is split into sub-streams and sent over multiple physical interfaces, said process steps comprising:

determining if at least one of the multiple physical interfaces of the sending endpoint is also sending or receiving a time critical data stream or a near-time critical data stream;

receiving a notification from the receiving endpoint in a case where at least one of the multiple physical interfaces of the receiving endpoint is determined to be sending or receiving a time critical data stream or a near-time critical data stream, wherein the notification includes the ones of the multiple physical interfaces of the receiving endpoint also sending or receiving a time critical or a near-time critical data stream; and adjusting the network bandwidth utilization of at least one of the multiple physical interfaces of the sending endpoint in accordance with the determination and/or the notification.

25. A non-transitory computer-readable memory medium on which is stored computer-executable process steps for causing a processor to adjust network bandwidth utilized by a non-time critical data stream being sent from a sending endpoint to a receiving endpoint, wherein both of the sending endpoint and the receiving endpoint each have multiple physical interfaces connecting the sending endpoint and the receiving endpoint to multiple networks, respectively, wherein the non-time critical data stream is split into sub-streams and sent over multiple physical interfaces, said process steps comprising:

determining if at least one of the multiple physical interfaces of the receiving endpoint is also sending or receiving a time critical data stream or a near-time critical data stream; and in a case where at least one of the multiple physical interfaces of the receiving endpoint is determined to be sending or receiving a time critical data stream or a near-time critical data stream, notifying the sending endpoint of the ones of the multiple physical interfaces of the receiving endpoint also sending or receiving a time critical or a near-time critical data stream, wherein the sending endpoint determines if at least one of the multiple physical interfaces of the sending endpoint is also sending or receiving a time critical data stream or a near-time critical data stream, and adjusts the network bandwidth utilization of at least one of the multiple physical interfaces of the sending endpoint in accordance with the determination and/or the notification.

* * * * *